United States Patent
Zhu et al.

(10) Patent No.: US 11,516,862 B2
(45) Date of Patent: Nov. 29, 2022

(54) COMMUNICATION METHOD AND APPARATUS

(71) Applicant: HUAWEI TECHNOLOGIES CO., LTD., Shenzhen (CN)

(72) Inventors: Yuanping Zhu, Shanghai (CN); Yada Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/926,711

(22) Filed: Jul. 12, 2020

(65) Prior Publication Data
US 2020/0374956 A1 Nov. 26, 2020

Related U.S. Application Data

(63) Continuation of application No. PCT/CN2019/071349, filed on Jan. 11, 2019.

(30) Foreign Application Priority Data

Jan. 12, 2018 (CN) .......................... 201810032695.X

(51) Int. Cl.
*H04W 76/15* (2018.01)
*H04W 76/12* (2018.01)
(Continued)

(52) U.S. Cl.
CPC .............. *H04W 76/15* (2018.02); *H04W 4/80* (2018.02); *H04W 28/0263* (2013.01);
(Continued)

(58) Field of Classification Search
None
See application file for complete search history.

(56) References Cited

U.S. PATENT DOCUMENTS

| | | | | |
|---|---|---|---|---|
| 2013/0016708 A1* | 1/2013 | Haba | ............... | H04W 48/16 370/338 |
| 2013/0329714 A1* | 12/2013 | Fan | ............... | H04W 48/00 370/338 |

(Continued)

FOREIGN PATENT DOCUMENTS

| | | |
|---|---|---|
| CN | 101207530 A | 6/2008 |
| CN | 101998304 A | 3/2011 |

(Continued)

OTHER PUBLICATIONS

3GPP TSG SA WG2 Meeting #84,TD S2-111362:"3G HNB BBAI support for CS service",ZTE,Apr. 11-15, 2011, Bratislava, Slovakia,total 10 pages.

(Continued)

*Primary Examiner* — German Viana Di Prisco
(74) *Attorney, Agent, or Firm* — Rimon PC

(57) ABSTRACT

This application provides a communication method and an apparatus. UE establishes a connection to a home access gateway by using CPE, the home access gateway sends configuration information of a first link and configuration information of a second link to the CPE, and sends the configuration information of the second link to the UE. The first link is a link between the CPE and the home access gateway, the second link is a link between the CPE and the UE, the configuration information of the first link is used to indicate quality of service QoS information of the first link, and the configuration information of the second link is used to indicate QoS information of the second link. The UE and the CPE ensure, based on respective configuration information, QoS of UE service data transmitted on the first link and the second link.

19 Claims, 6 Drawing Sheets

(51) Int. Cl.
*H04W 4/80* (2018.01)
*H04W 76/11* (2018.01)
*H04W 76/27* (2018.01)
*H04W 28/02* (2009.01)
*H04W 28/10* (2009.01)
*H04W 48/16* (2009.01)
*H04W 88/16* (2009.01)
*H04W 84/12* (2009.01)

(52) U.S. Cl.
CPC ....... *H04W 28/0268* (2013.01); *H04W 28/10* (2013.01); *H04W 48/16* (2013.01); *H04W 76/11* (2018.02); *H04W 76/12* (2018.02); *H04W 76/27* (2018.02); *H04W 88/16* (2013.01); *H04W 84/12* (2013.01)

(56) References Cited

U.S. PATENT DOCUMENTS

| | | | |
|---|---|---|---|
| 2014/0029421 A1* | 1/2014 | Rajagopalan | H04L 41/0816 370/230 |
| 2015/0237531 A1* | 8/2015 | Hao | H04W 24/10 370/328 |
| 2016/0234851 A1* | 8/2016 | Zhang | H04W 28/08 |
| 2016/0249247 A1* | 8/2016 | Zhao | H04W 28/0268 |
| 2016/0261430 A1* | 9/2016 | Lepp | H04W 80/02 |
| 2016/0295521 A1* | 10/2016 | Grayson | H04W 52/283 |
| 2017/0318501 A1* | 11/2017 | Vikberg | H04W 24/10 |
| 2019/0313248 A1* | 10/2019 | Middelesch | H04W 12/033 |
| 2021/0266915 A1* | 8/2021 | Sirotkin | H04L 47/41 |
| 2021/0289391 A1* | 9/2021 | Paladugu | H04W 28/24 |
| 2021/0360742 A1* | 11/2021 | Liao | H04W 88/04 |

FOREIGN PATENT DOCUMENTS

| | | |
|---|---|---|
| CN | 103220650 B | 4/2016 |
| CN | 107295575 A | 10/2017 |
| WO | 2016161915 A1 | 10/2016 |

OTHER PUBLICATIONS

3GPP TR 23.839 V12.0.0:"3rd Generation Partnership Project;Technical Specification Group Services and System Aspects;Study on support of Broadband Forum (BBF) access Interworking(Release 12)",2013-06,total 179 pages.

* cited by examiner

COMMUNICATION METHOD AND APPARATUS

CROSS-REFERENCE TO RELATED APPLICATIONS

This application a continuation of International Application No. PCT/CN2019/071349, filed on Jan. 11, 2019, which claims priority to Chinese Patent Application No. 201810032695.X, filed on Jan. 12, 2018, The disclosures of the aforementioned applications are hereby incorporated by reference in their entireties.

TECHNICAL FIELD

This application relates to communications technologies, and in particular, to a communication method and an apparatus.

BACKGROUND

In recent years, broadband access networks have been developing rapidly around the world, and a broadband penetration rate continuously increases. A current home broadband access technology mainly uses fixed broadband access, and wireless broadband (WBB) access or wireless to the x (WTTx) access is used as a supplement.

FIG. 1 is a schematic diagram of an existing home broadband access network. As shown in FIG. 1, user equipment (UE) establishes a connection to customer premises equipment (CPE)/a home gateway (RG) over a wired or wireless local area access link, then, the CPE/RG is connected to a broadband access network device over a wired or wireless broadband access link, and the broadband access network device is connected to a core network device. In the prior art, the CPE or the RG may be relay user equipment (UE). The relay UE may be used as a relay point for remote UE to access a wireless network. A device-to-device (D2D) connection is established between the remote UE and the relay UE, and the D2D connection may be used for communication performed through a PC5 interface defined in the 3rd generation partnership project (3GPP), or communication performed by using a short-range wireless communication protocol such as Bluetooth, Wi-Fi, or ZigBee. A radio link is established for communication between the relay UE and a radio access network (RAN) device, for example, an air interface link of a long term evolution (LTE) system/an evolved universal terrestrial radio access E-UTRA system.

However, in the prior art, a D2D link between the relay UE and the remote UE cannot provide an effective QoS guarantee for a service of the remote UE. In addition, in the foregoing method, the relay UE can access the radio access network device only through an air interface (namely, a Uu interface), and a scenario in which the CPE/RG accesses a network through fixed broadband access is not considered. If the UE accesses a fixed broadband network indoors through fixed broadband access, and accesses a wireless network outdoors through a radio air interface, when the UE moves indoors and outdoors, the UE is usually disconnected, and a service is discontinuous. In an existing fixed broadband access network, a best effort quality of service (QoS) policy is usually used, and this makes it difficult to ensure QoS of the UE.

SUMMARY

This application provides a communication method and an apparatus, to provide a QoS guarantee for UE.

A first aspect of this application provides a communication method, including:

receiving, by customer premises equipment (CPE) configuration information of a first link and configuration information of a second link that are sent by a home access gateway, where the first link is a link between the CPE and the home access gateway, the second link is a link between the CPE and UE, the configuration information of the first link is used to indicate quality of service QoS information of the first link, and the configuration information of the second link is used to indicate QoS information of the second link;

sending, by the CPE, the configuration information of the second link to the UE;

determining, by the CPE, a QoS parameter of a data packet of the UE based on the configuration information of the first link and the configuration information of the second link; and sending, by the CPE, the data packet based on the QoS parameter of the data packet.

In a possible implementation, when the first link is a first-type link and the second link is a second-type link, the configuration information of the first link includes at least one of the following information: an identifier of the UE, QoS configuration information of the UE, and QoS configuration information of the CPE, and the configuration information of the second link includes the QoS information of the second link;

the first-type link includes a communications link established based on any one of an LTE/E-UTRA system, an LTE in unlicensed spectrum (unlicensed LTE, LTE-U) system, new radio (NR), a universal mobile telecommunications system (UMTS) system, and a global system for mobile communications (GSM) system; and the second-type link is a communications link established based on any one of a wireless local area network (WLAN), Bluetooth (Bluetooth), ZigBee, the Ethernet, a point-to-point protocol (PPP), a point-to-point protocol over Ethernet (PPPoE), an asynchronous transfer mode (ATM), code division multiple access CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer of the UE and the QoS flow of the UE;

the QoS configuration information of the CPE includes at least one of the following information: an identifier of a radio bearer of the CPE, a QoS parameter of the radio bearer of the CPE, an identifier of QoS of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the QoS flow of the CPE and the radio bearer of the UE, and a mapping relationship between the radio bearer of the CPE and the QoS flow of the UE; and the QoS information of the second link includes at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, where the second QoS identifier is used to identify a QoS granularity of the second link.

In a possible implementation, the determining, by the CPE, a QoS parameter of a data packet of the UE based on the configuration information of the first link and the configuration information of the second link includes:

receiving, by the CPE, the data packet sent by the UE, where the data packet includes the identifier of the UE and the second QoS identifier;

determining, by the CPE, the radio bearer, of the UE, corresponding to the data packet, based on the second QoS identifier included in the data packet and the mapping relationship between the second QoS identifier and the radio bearer of the UE; or determining, by the CPE, the QoS flow, of the UE, corresponding to the data packet, based on the second QoS identifier included in the data packet and the mapping relationship between the second QoS identifier and the QoS flow of the UE, and determining the radio bearer, of the UE, corresponding to the data packet, based on the mapping relationship between the radio bearer of the UE and the QoS flow of the UE; and determining, by the CPE, the radio bearer, of the CPE, corresponding to the data packet, based on the radio bearer, of the UE, corresponding to the data packet and the mapping relationship between the radio bearer of the CPE and the radio bearer of the UE; or determining, by the CPE, the radio bearer or the QoS flow, of the CPE, corresponding to the data packet, based on the radio bearer, of the UE, corresponding to the data packet and the mapping relationship between the QoS flow of the CPE and the radio bearer of the UE, where a QoS parameter of the radio bearer or the QoS flow, of the CPE, corresponding to the data packet is the QoS parameter of the data packet.

In a possible implementation, the determining, by the CPE, a QoS parameter of a data packet of the UE based on the configuration information of the first link and the configuration information of the second link includes:

receiving, by the CPE, the data packet sent by the UE, where the data packet includes the identifier of the UE and the second QoS identifier; and determining, by the CPE, the radio bearer, of the CPE, corresponding to the data packet, based on the second QoS identifier included in the data packet and the mapping relationship between the second QoS identifier and the radio bearer of the CPE, where a QoS parameter of the radio bearer, of the CPE, corresponding to the data packet is the QoS parameter of the data packet; or determining, by the CPE, the QoS flow, of the CPE, corresponding to the data packet, based on the second QoS identifier included in the data packet and the mapping relationship between the second QoS identifier and the QoS flow of the CPE, where a QoS parameter of the QoS flow, of the CPE, corresponding to the data packet is the QoS parameter of the data packet.

In a possible implementation, the data packet sent by the CPE to the home access gateway includes at least one of the following information: the identifier of the radio bearer of the UE, the identifier of the UE, and the uplink endpoint information of the first connection transmission tunnel corresponding to the data radio bearer DRB of the UE, where the identifier of the radio bearer of the UE is added by the UE or the CPE, and the identifier of the UE and the uplink endpoint information of the first connection transmission tunnel corresponding to the DRB of the UE are added by the CPE.

In a possible implementation, the determining, by the CPE, a QoS parameter of a data packet of the UE based on the configuration information of the first link and the configuration information of the second link includes:

receiving, by the CPE, the data packet sent by the home access gateway, where the data packet includes the identifier of the UE, the identifier of the radio bearer of the UE, and/or the identifier of the QoS flow of the UE; and determining, by the CPE, the second QoS identifier corresponding to the data packet, based on the identifier that is of the radio bearer of the UE and that is included in the data packet and the mapping relationship between the second QoS identifier and the radio bearer of the UE; or determining, by the CPE, the second QoS identifier corresponding to the data packet, based on the identifier that is of the QoS flow of the UE and that is included in the data packet and the mapping relationship between the second QoS identifier and the QoS flow of the UE, where a QoS parameter corresponding to the second QoS identifier corresponding to the data packet is the QoS parameter of the data packet.

In a possible implementation, the determining, by the CPE, a QoS parameter of a data packet of the UE based on the configuration information of the first link and the configuration information of the second link includes:

receiving, by the CPE, the data packet sent by the home access gateway; and when the data packet includes the identifier of the UE, determining, by the CPE, the second QoS identifier corresponding to the data packet, based on the radio bearer of the CPE that carries the data packet and the mapping relationship between the second QoS identifier and the radio bearer of the CPE, where a QoS parameter corresponding to the second QoS identifier corresponding to the data packet is the QoS parameter of the data packet; or when the data packet includes the identifier of the UE, determining, by the CPE, the second QoS identifier corresponding to the data packet, based on the identifier that is of the QoS flow of the CPE and that is included in the data packet and the mapping relationship between the second QoS identifier and the QoS flow of the CPE, where a QoS parameter corresponding to the second QoS identifier corresponding to the data packet is the QoS parameter of the data packet; or when the data packet includes the identifier of the UE and the identifier of the radio bearer of the UE, determining, by the CPE, the second QoS identifier corresponding to the data packet, based on the identifier that is of the radio bearer of the UE and that is in the data packet and the mapping relationship between the second QoS identifier and the radio bearer of the UE, where a QoS parameter corresponding to the second QoS identifier corresponding to the data packet is the QoS parameter of the data packet; or when the data packet includes the identifier of the UE and the identifier of the QoS flow of the UE, determining, by the CPE, the second QoS identifier corresponding to the data packet, based on the identifier that is of the QoS flow of the UE and that is in the data packet and the mapping relationship between the second QoS identifier and the QoS flow of the UE, where a QoS parameter corresponding to the second QoS identifier corresponding to the data packet is the QoS parameter of the data packet; or when the data packet includes downlink endpoint information of the first connection transmission tunnel corresponding to the DRB of the UE, determining, by the CPE, the UE needing to receive the data packet and the DRB of the UE that carries the data packet, based on the downlink endpoint information of the first connection transmission tunnel corresponding to the DRB of the UE, and determining the second QoS identifier corresponding to the data packet, based on the mapping relationship between the second QoS identifier and the radio bearer of the UE, where a QoS parameter corresponding to the second QoS identifier corresponding to the data packet is the QoS parameter of the data packet.

In a possible implementation, when the first link and the second link each are a first-type link, the configuration information of the first link includes at least one of the following information: an identifier of the UE, QoS configuration information of the UE, and QoS configuration information of the CPE, and the configuration information of the second link includes the identifier of the UE and the QoS configuration information of the UE;

the first-type link includes a communications link established based on any one of an LTE system, an LTE-U system, new radio NR, a UMTS system, and a GSM system;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer of the UE and the QoS flow of the UE; and the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the radio bearer of the CPE and the QoS flow of the UE, and a mapping relationship between the QoS flow of the CPE and the radio bearer of the UE.

In a possible implementation, the determining, by the CPE, a QoS parameter of a data packet of the UE based on the configuration information of the first link and the configuration information of the second link includes:

receiving, by the CPE, the data packet sent by the UE, where the data packet includes the identifier of the UE;

determining, by the CPE, the radio bearer of the UE that carries the data packet;

determining, by the CPE, the radio bearer, of the CPE, corresponding to the data packet, based on the radio bearer of the UE that carries the data packet and the mapping relationship between the radio bearer of the CPE and the radio bearer of the UE; or when the data packet includes the identifier of the QoS flow of the UE, determining, by the CPE, the radio bearer, of the CPE, corresponding to the data packet, based on the identifier of the QoS flow of the UE and the mapping relationship between the radio bearer of the CPE and the QoS flow of the UE; or determining, by the CPE, the QoS flow, of the CPE, corresponding to the data packet, based on the radio bearer of the UE that carries the data packet and the mapping relationship between the QoS flow of the CPE and the radio bearer of the UE, and determining the radio bearer, of the CPE, corresponding to the data packet, based on the QoS flow, of the CPE, corresponding to the data packet and the mapping relationship between the radio bearer of the CPE and the QoS flow of the CPE, where a QoS parameter of the radio bearer, of the CPE, corresponding to the data packet is the QoS parameter of the data packet; and before the sending, by the CPE, the data packet based on the QoS parameter of the data packet, the method further includes: adding, by the CPE, at least one of the following information to the data packet: the identifier of the UE, the identifier of the radio bearer of the UE, and the uplink endpoint information of the first connection transmission tunnel corresponding to the DRB of the UE.

In a possible implementation, the determining, by the CPE, a QoS parameter of a data packet of the UE based on the configuration information of the first link and the configuration information of the second link includes:

receiving, by the CPE, the data packet sent by the home access gateway, where the data packet includes the identifier of the UE, and the identifier of the radio bearer of the UE; and determining, by the CPE, that a QoS parameter of the radio bearer corresponding to the identifier that is of the radio bearer of the UE and that is included in the data packet is the QoS parameter of the data packet.

In a possible implementation, the determining, by the CPE, a QoS parameter of a data packet of the UE based on the configuration information of the first link and the configuration information of the second link includes:

receiving, by the CPE, the data packet sent by the home access gateway; and when the data packet includes the identifier of the UE, determining, by the CPE, the radio bearer, of the UE, corresponding to the data packet, based on the radio bearer of the CPE that carries the data packet and the mapping relationship between the radio bearer of the CPE and the radio bearer of the UE.

In a possible implementation, the determining, by the CPE, the radio bearer of the UE that carries the data packet includes:

determining, by the CPE, the radio bearer of the UE that carries the data packet, based on a logical channel through which the data packet is received and a correspondence between the logical channel and the radio bearer of the UE; or determining, by the CPE, the radio bearer of the UE that carries the data packet, based on the identifier that is of the QoS flow of the UE and that is included in the data packet and the mapping relationship between the radio bearer of the UE and the QoS flow of the UE.

In a possible implementation, the determining, by the CPE, a QoS parameter of a data packet of the UE based on the configuration information of the first link and the configuration information of the second link includes:

receiving, by the CPE, the data packet sent by the home access gateway; and when the data packet includes the identifier of the UE and the identifier of the radio bearer of the UE, determining, by the CPE, the radio bearer, of the UE, corresponding to the data packet, based on the identifier of the UE and the identifier of the radio bearer of the UE; or when the data packet includes the identifier of the UE, determining, by the CPE, the radio bearer, of the UE, corresponding to the data packet, based on the radio bearer of the CPE that carries the data packet and the mapping relationship between the radio bearer of the CPE and the radio bearer of the UE; or when the data packet includes downlink endpoint information of the first connection transmission tunnel corresponding to the DRB of the UE, determining, by the CPE, the DRB of the UE that carries the data packet on the second link, based on the downlink endpoint information of the first connection transmission tunnel corresponding to the DRB of the UE; or when the data packet includes the identifier of the UE and the identifier of the QoS flow of the UE, determining, by the CPE, the radio bearer, of the UE, corresponding to the data packet, based on the identifier of the QoS flow of the UE and the mapping relationship between the QoS flow of the UE and the radio bearer of the UE, where a QoS parameter of the radio bearer, of the UE, corresponding to the data packet is the QoS parameter of the data packet.

In a possible implementation, the determining, by the CPE, a QoS parameter of a data packet of the UE based on the configuration information of the first link and the configuration information of the second link includes:

receiving, by the CPE, the data packet sent by the home access gateway, where the data packet includes the identifier of the UE;

determining, by the CPE, the radio bearer, of the UE, corresponding to the data packet, based on the radio bearer of the CPE that carries the data packet and the mapping relationship between the radio bearer of the CPE and the radio bearer of the UE; or determining, by the CPE, the radio bearer, of the CPE, corresponding to the data packet, based on the identifier that is of the QoS flow of the CPE and that is included in the data packet and the mapping relationship between the QoS flow of the CPE and the radio bearer of the CPE, and determining, by the CPE, the radio bearer, of the UE, corresponding to the data packet, based on the radio bearer, of the CPE, corresponding to the data packet and the mapping relationship between the radio bearer of the CPE and the radio bearer of the UE, where a QoS parameter of the radio bearer, of the UE, corresponding to the data packet is the QoS parameter of the data packet, or a QoS parameter of the QoS flow, of the UE, corresponding to the radio bearer of the UE is the QoS parameter of the data packet.

In a possible implementation, when the first link and the second link each are a second-type link, the configuration information of the first link includes at least one of the following information: an identifier of the UE, QoS configuration information of the UE, and QoS information of the first link;

the second-type link is a link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer and the QoS flow of the UE; and the QoS information of the first link includes at least one of the following information: a first QoS identifier, a QoS parameter corresponding to the first QoS identifier, a mapping relationship between the first QoS identifier and the radio bearer of the UE, a mapping relationship between the first QoS identifier and the QoS flow of the UE, and a mapping relationship between the first QoS identifier and a second QoS identifier, where the second QoS identifier is used to identify a QoS granularity of the second link, and the first QoS identifier is used to identify a QoS granularity of the first link; and the configuration information of the second link includes the QoS information of the second link, and the QoS information of the second link includes at least one of the following information: the second QoS identifier, a QoS parameter corresponding to the second QoS identifier, a mapping relationship between the second QoS identifier and the radio bearer of the UE, a mapping relationship between the second QoS identifier and the QoS flow of the UE, and the mapping relationship between the first QoS identifier and the second QoS identifier.

In a possible implementation, the determining, by the CPE, a QoS parameter of a data packet of the UE based on the configuration information of the first link and the configuration information of the second link includes:

receiving, by the CPE, the data packet sent by the UE, where the data packet includes the identifier of the UE and the second QoS identifier;

determining, by the CPE, the radio bearer, of the UE, corresponding to the data packet, based on the second QoS identifier included in the data packet and the mapping relationship between the second QoS identifier and the radio bearer of the UE, and determining the first QoS identifier corresponding to the data packet, based on the radio bearer, of the UE, corresponding to the data packet and the mapping relationship between the first QoS identifier and the radio bearer of the UE; or determining, by the CPE, the QoS flow, of the UE, corresponding to the data packet, based on the second QoS identifier included in the data packet and the mapping relationship between the second QoS identifier and the QoS flow of the UE, and determining the first QoS identifier corresponding to the data packet, based on the QoS flow, of the UE, corresponding to the data packet and the mapping relationship between the first QoS identifier and the QoS flow of the UE; or determining, by the CPE, the first QoS identifier corresponding to the data packet, based on the second QoS identifier included in the data packet and the mapping relationship between the first QoS identifier and the second QoS identifier, where a QoS parameter corresponding to the first QoS identifier corresponding to the data packet is the QoS parameter of the data packet; and before the sending, by the CPE, the data packet based on the QoS parameter of the data packet, the method further includes: adding, by the CPE to the data packet to the data packet, the first QoS identifier corresponding.

In a possible implementation, the determining, by the CPE, a QoS parameter of a data packet of the UE based on the configuration information of the first link and the configuration information of the second link includes:

receiving, by the CPE, the data packet sent by the home access gateway, where the data packet includes the identifier of the UE and the first QoS identifier;

determining, by the CPE, the radio bearer, of the UE, corresponding to the data packet, based on the first QoS identifier included in the data packet and the mapping relationship between the first QoS identifier and the radio bearer of the UE, and determining the second QoS identifier corresponding to the data packet, based on the radio bearer, of the UE, corresponding to the data packet and the mapping relationship between the second QoS identifier and the radio bearer of the UE; or determining, by the CPE, the QoS flow, of the UE, corresponding to the data packet, based on the first QoS identifier included in the data packet and the mapping relationship between the first QoS identifier and the QoS flow of the UE, and determining the second QoS identifier corresponding to the data packet, based on the QoS flow, of the UE, corresponding to the data packet and the mapping relationship between the second QoS identifier and the QoS flow of the UE; or determining, by the CPE, the second QoS identifier corresponding to the data packet, based on the first QoS identifier included in the data packet and the mapping relationship between the first QoS identifier and the second QoS identifier, where a QoS parameter corresponding to the second QoS identifier corresponding to the data packet is the QoS parameter of the data packet.

In a possible implementation, when the first link is a second-type link and the second link is a first-type link, the configuration information of the first link includes at least one of the following information: an identifier of the UE, QoS configuration information of the UE, and the QoS information of the first link, and the configuration information of the second link includes the QoS configuration information of the UE;

the first-type link includes a communications link established based on any one of an LTE system, an LTE-U system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS information of the first link includes at least one of the following information: a first QoS identifier, a QoS parameter corresponding to the first QoS identifier, a mapping relationship between the first QoS identifier and a radio bearer of the UE, and a mapping relationship between the first QoS identifier and a QoS flow of the UE, where the first QoS identifier is used to identify a QoS granularity of the first link; and the QoS configuration information of the UE includes at least one of the following information: an identifier of the radio bearer of the UE, a QoS parameter of the radio bearer of the UE, uplink endpoint information of a first connection transmission tunnel corresponding to a data radio bearer DRB of the UE, an identifier of the QoS flow of the UE, a QoS parameter of the QoS flow of the UE, and a mapping relationship between the radio bearer of the UE and the QoS flow of the UE.

In a possible implementation, the determining, by the CPE, a QoS parameter of a data packet of the UE based on the configuration information of the first link and the configuration information of the second link includes:

receiving, by the CPE, the data packet sent by the UE;

determining, by the CPE, the radio bearer of the UE that carries the data packet;

determining, by the CPE, the first QoS identifier corresponding to the data packet, based on the radio bearer of the UE that carries the data packet and the mapping relationship between the first QoS identifier and the radio bearer of the UE; or determining, by the CPE, the first QoS identifier corresponding to the data packet, based on the identifier that is of the QoS flow of the UE and that is included in the data packet and the mapping relationship between the first QoS identifier and the QoS flow of the UE, where a QoS parameter corresponding to the first QoS identifier corresponding to the data packet is the QoS parameter of the data packet; and before the sending, by the CPE, the data packet based on the QoS parameter of the data packet, the method further includes:

adding, by the CPE to the data packet, the first QoS identifier corresponding to the data packet.

In a possible implementation, the determining, by the CPE, a QoS parameter of a data packet of the UE based on the configuration information of the first link and the configuration information of the second link includes:

receiving, by the CPE, the data packet sent by the home access gateway, where the data packet includes the identifier of the UE and the first QoS identifier;

determining, by the CPE, the radio bearer, of the UE, corresponding to the data packet, based on the first QoS identifier included in the data packet and the mapping relationship between the first QoS identifier and the radio bearer of the UE, where a QoS parameter of the radio bearer, of the UE, corresponding to the data packet is the QoS parameter of the data packet; or determining, by the CPE, the QoS flow, of the UE, corresponding to the data packet, based on the first QoS identifier included in the data packet and the mapping relationship between the first QoS identifier and the QoS flow of the UE, where a QoS parameter of the QoS flow, of the UE, corresponding to the data packet is the QoS parameter of the data packet.

In a possible implementation, before the receiving, by CPE, configuration information of a first link and configuration information of a second link that are sent by a home access gateway, the method further includes:

sending, by the CPE, a first request message to the home access gateway, where the first request message is used to request to establish a first connection, the first connection is a connection between the CPE and the home access gateway, the first connection is carried on the first link, and the first request message includes an identifier of the CPE; and receiving, by the CPE, a first response message sent by the home access gateway, where the first response message includes an identifier of the home access gateway and an identifier of a cell needing to be activated.

In a possible implementation, the sending, by the CPE, a first request message to the home access gateway includes:

sending, by the CPE, the first request message to the home access gateway based on first configuration information obtained in advance, where the first configuration information is used to trigger establishment of the first connection; or sending, by the CPE, the first request message to the home access gateway when receiving information that is sent by the UE and that indicates that the UE has a requirement for connecting to the home access gateway; or sending, by the CPE, the first request message to the home access gateway when the CPE receives a specific tagged packet sent by the UE.

In a possible implementation, when the second link is a second-type link, the data packet that is sent by the UE and that is received by the CPE includes second indication information, and the second indication information is used to indicate that data included in the data packet is control plane signaling or user plane data.

In a possible implementation, the method further includes:

sending, by the CPE, a discovery signal to the UE, where the discovery signal is used by the UE to discover the CPE, the discovery signal includes first indication information, the first indication information is used to indicate that the CPE supports providing the UE with a connection to a first-type network, and supports providing the UE with mobility management and QoS management in the first-type network, and the first-type network includes any one of the LTE system, the LTE-U system, the NR, the UMTS system, and the GSM system.

A second aspect of this application provides a communication method, including:

establishing, by UE, an RRC connection to a home access gateway by using CPE;

receiving, by the UE, configuration information that is sent by the home access gateway and that is of a link between the CPE and the UE, where the configuration information is used to indicate quality of service QoS information of the link between the CPE and the UE;

determining, by the UE, a QoS parameter of a data packet based on the configuration information; and sending, by the UE, the data packet to the CPE based on the QoS parameter of the data packet.

In a possible implementation, when the link between the CPE and the UE is a first-type link, the configuration information includes an identifier of the UE and/or QoS configuration information of the UE, and the first-type link includes a link established based on any one of an LTE system, an LTE-U system, NR, a UMTS system, and a GSM system;

the QoS configuration information of the UE includes at least one of the following information: an identifier of a radio bearer of the UE, uplink endpoint information of a first connection transmission tunnel corresponding to a data radio bearer DRB of the UE, a QoS parameter of the radio bearer of the UE, an identifier of a QoS flow of the UE, a QoS parameter of the QoS flow of the UE, and a mapping relationship between the radio bearer of the UE and the QoS flow of the UE; and the determining, by the UE, a QoS parameter of a data packet based on the configuration information includes:

determining, by the UE, that a QoS parameter of the radio bearer or the QoS flow, of the UE, corresponding to the data packet is the QoS parameter of the data packet.

In a possible implementation, when the link between the CPE and the UE is a second-type link, the second-type link is a communications link established based on any one of a WLAN, Bluetooth, ZigBee, the Ethernet, a PPP, a PPPoE, an ATM, CDMA, and CDMA2000; and the configuration information includes the QoS information of the link between the CPE and the UE, and the QoS information of the link between the CPE and the UE includes at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, where the second QoS identifier is used to identify a QoS granularity of the second link;

the determining, by the UE, a QoS parameter of a data packet based on the configuration information includes:

determining, by the UE, the second QoS identifier corresponding to the data packet, based on the radio bearer, of the UE, corresponding to the data packet and the mapping relationship between the second QoS identifier and the radio bearer of the UE; or determining the second QoS identifier corresponding to the data packet, based on the QoS flow, of the UE, corresponding to the data packet and the mapping relationship between the second QoS identifier and the QoS flow of the UE; and determining, by the UE, that a QoS parameter corresponding to the second QoS identifier corresponding to the data packet is the QoS parameter of the data packet; and before the sending, by the UE, the data packet to the CPE based on the QoS parameter of the data packet, the method further includes:

adding, by the UE to the data packet, the second QoS identifier corresponding to the data packet.

In a possible implementation, before the establishing, by UE, an RRC connection to a home access gateway by using CPE, the method further includes:

receiving, by the UE, a discovery signal sent by the CPE, where the discovery signal is used by the UE to discover the CPE, the discovery signal includes first indication information, the first indication information is used to indicate that the CPE supports providing the UE with a connection to a first-type network, and supports providing the UE with mobility management and QoS management in the first-type network, and the first-type network includes any one of the LTE system, the LTE-U system, the NR, the UMTS system, and the GSM system.

In a possible implementation, the data packet sent by the UE includes second indication information, and the second indication information is used to indicate that data included in the data packet is control plane signaling or user plane data.

A third aspect of this application provides a communication method, including:

sending, by a home access gateway, configuration information of a first link and configuration information of a second link to CPE, where the first link is a link between the CPE and the home access gateway, the second link is a link between the CPE and UE, the configuration information of the first link is used to indicate quality of service QoS information of the first link, the configuration information of the second link is used to indicate QoS information of the second link, and the configuration information of the first link and the configuration information of the second link are used to determine a QoS parameter of a data packet sent to the UE.

In a possible implementation, when the first link is a first-type link and the second link is a second-type link, the configuration information of the first link includes at least one of the following information: an identifier of the UE, QoS configuration information of the UE, and QoS configuration information of the CPE, and the configuration information of the second link includes the QoS information of the second link;

the first-type link includes a communications link established based on any one of an LTE system, an LTE-U system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer of the UE and the QoS flow of the UE;

the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the QoS flow of the CPE and the radio bearer of the UE, and a mapping relationship between the radio bearer of the CPE and the QoS flow of the UE; and the QoS information of the second link includes at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, where the second QoS identifier is used to identify a QoS granularity of the second link.

In a possible implementation, when the first link and the second link each are a first-type link, the configuration information of the first link includes at least one of the following information: an identifier of the UE, QoS configuration information of the UE, and QoS configuration information of the CPE;

the first-type link includes a communications link established based on any one of a long term evolution LTE system, an LTE in unlicensed spectrum system, new radio NR, a universal mobile telecommunications system UMTS system, and a global system for mobile communications GSM system;

the configuration information of the second link includes the identifier of the UE and information about a radio bearer of the UE;

the QoS configuration information of the UE includes at least one of the following information: an identifier of the radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer and the QoS flow of the UE; and the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the radio bearer of the CPE and the QoS flow of the UE, and a mapping relationship between the QoS flow of the CPE and the radio bearer of the UE.

In a possible implementation, the method further includes:

determining, by the home access gateway, the QoS parameter of the data packet sent to the UE; and sending, by the home access gateway, the data packet to the CPE based on the QoS parameter of the data packet.

In a possible implementation, when the first link is a first-type link, the determining, by the home access gateway, the QoS parameter of the data packet of the UE includes:

receiving, by the home access gateway, the data packet sent by a core network device, and determining the identifier of the radio bearer, of the UE, corresponding to the data packet or the identifier of the QoS flow, of the UE, corresponding to the data packet, where the data packet includes the identifier of the UE; and determining, by the home access gateway, the radio bearer, of the CPE, corresponding to the data packet, based on the identifier of the radio bearer, of the UE, corresponding to the data packet and the mapping relationship between the radio bearer of the CPE and the radio bearer of the UE; or determining, by the home access gateway, the radio bearer, of the CPE, corresponding to the data packet based on the identifier of the QoS flow, of the UE, corresponding to the data packet and the mapping relationship between the QoS flow of the UE and the radio bearer of the CPE; or determining, by the home access gateway, the radio bearer, of the UE, corresponding to the data packet, based on the identifier of the QoS flow, of the UE, corresponding to the data packet and the mapping relationship between the radio bearer of the UE and the QoS flow of the UE, and determining the radio bearer, of the CPE, corresponding to the data packet, based on the mapping relationship between the radio bearer of the CPE and the radio bearer of the UE, where a QoS parameter of the radio bearer, of the CPE, corresponding to the data packet is the QoS parameter of the data packet.

In a possible implementation, when the first link and the second link each are a second-type link, the configuration information of the first link includes at least one of the following information: an identifier of the UE, QoS configuration information of the UE, and QoS information of the first link;

the second-type link is a communications link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer and the QoS flow of the UE; and the QoS information of the first link includes at least one of the following information: a first QoS identifier, a QoS parameter corresponding to the first QoS identifier, a mapping relationship between the first QoS identifier and the radio bearer of the UE, a mapping relationship between the first QoS identifier and the QoS flow of the UE, and a mapping relationship between the first QoS identifier and a second QoS identifier, where the second QoS identifier is used to identify a QoS granularity of the second link, and the first QoS identifier is used to identify a QoS granularity of the first link; and the configuration information of the second link includes the QoS information of the second link, and the QoS information of the second link includes at least one of the following information: the second QoS identifier, a QoS parameter corresponding to the second QoS identifier, a mapping relationship between the second QoS identifier and the radio bearer of the UE, a mapping relationship between the second QoS identifier and the QoS flow of the UE, and the mapping relationship between the first QoS identifier and the second QoS identifier.

In a possible implementation, when the first link is a second-type link and the second link is a first-type link, the configuration information of the first link includes at least one of the following information: an identifier of the UE, QoS configuration information of the UE, and QoS information of the first link, and the configuration information of the second link includes the QoS configuration information of the UE;

the first-type link includes a communications link established based on any one of an LTE system, an LTE-U system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS information of the first link includes at least one of the following information: a first QoS identifier, a QoS parameter corresponding to the first QoS identifier, a mapping relationship between the first QoS identifier and a radio bearer of the UE, and a mapping relationship between the first QoS identifier and a QoS flow of the UE, where the first QoS identifier is used to identify a QoS granularity of the first link; and the QoS configuration information of the UE includes at least one of the following information: an identifier of the radio bearer of the UE, a QoS parameter of the radio bearer of the UE, uplink endpoint information of a first connection transmission tunnel corresponding to a data radio bearer DRB of the UE, an identifier of the QoS flow of the UE, a QoS parameter of the QoS flow of the UE, and a mapping relationship between the radio bearer of the UE and the QoS flow of the UE.

In a possible implementation, when the first link is a second-type link, the determining, by the CPE, the QoS parameter of the data packet of the UE includes:

receiving, by the home access gateway, the data packet sent by a core network device, and determining the identifier of the radio bearer, of the UE, corresponding to the data packet or the identifier of the QoS flow, of the UE, corresponding to the data packet, where the data packet includes the identifier of the UE;

determining, by the home access gateway, the first QoS identifier corresponding to the data packet, based on the identifier of the radio bearer, of the UE, corresponding to the data packet and the mapping relationship between the first QoS identifier and the radio bearer of the UE; or determining, by the CPE, the first QoS identifier corresponding to the data packet, based on the identifier of the QoS flow, of the UE, corresponding to the data packet and the mapping relationship between the first QoS identifier and the QoS flow of the UE, where a QoS parameter corresponding to the first QoS identifier corresponding to the data packet is the QoS parameter of the data packet; and before the sending, by the CPE, the data packet based on the QoS parameter of the data packet, the method further includes:

adding, by the UE to the data packet, the first QoS identifier corresponding to the data packet.

A fourth aspect of this application provides CPE, including:

a receiver, configured to receive configuration information of a first link and configuration information of a second link that are sent by a home access gateway, where the first link is a link between the CPE and the home access gateway, the second link is a link between the CPE and UE, the configuration information of the first link is used to indicate quality of service QoS information of the first link, and the configuration information of the second link is used to indicate QoS information of the second link;

a transmitter, configured to send the configuration information of the second link to the UE; and a processor, configured to determine a QoS parameter of a data packet of the UE based on the configuration information of the first link and the configuration information of the second link, where the transmitter is further configured to send the data packet based on the QoS parameter of the data packet.

In a possible implementation, when the first link is a first-type link and the second link is a second-type link, the configuration information of the first link includes at least one of the following information: an identifier of the UE, QoS configuration information of the UE, and QoS configuration information of the CPE, and the configuration information of the second link includes QoS information of the second link;

the first-type link includes a communications link established based on any one of an LTE system, a U-LTE system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer of the UE and the QoS flow of the UE;

the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the QoS flow of the CPE and the radio bearer of the UE, and a mapping relationship between the radio bearer of the CPE and the QoS flow of the UE; and the QoS information of the second link includes at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, where the second QoS identifier is used to identify a QoS granularity of the second link.

In a possible implementation, the processor is specifically configured to:

receive the data packet sent by the UE, where the data packet includes the identifier of the UE and the second QoS identifier;

determine the radio bearer, of the UE, corresponding to the data packet, based on the second QoS identifier included in the data packet and the mapping relationship between the second QoS identifier and the radio bearer of the UE; or determine the QoS flow, of the UE, corresponding to the data packet, based on the second QoS identifier included in the data packet and the mapping relationship between the second QoS identifier and the QoS flow of the UE, and determine the radio bearer, of the UE, corresponding to the data packet, based on the mapping relationship between the radio bearer of the UE and the QoS flow of the UE; and determine the radio bearer or the QoS flow, of the CPE, corresponding to the data packet, based on the radio bearer, of the UE, corresponding to the data packet and the mapping relationship between the radio bearer of the CPE and the radio bearer of the UE; or determine the radio bearer or the QoS flow, of the CPE, corresponding to the data packet, based on the radio bearer, of the UE, corresponding to the data packet and the mapping relationship between the radio bearer of the CPE and the radio bearer of the UE, where a QoS parameter of the radio bearer or the QoS flow, of the CPE, corresponding to the data packet is the QoS parameter of the data packet.

In a possible implementation, the receiver is further configured to receive the data packet sent by the UE, where the data packet includes the identifier of the UE and a second QoS identifier; and the processor is specifically configured to:

determine the radio bearer, of the CPE, corresponding to the data packet, based on the second QoS identifier included in the data packet and the mapping relationship between the second QoS identifier and the radio bearer of the CPE, where a QoS parameter of the radio bearer, of the CPE, corresponding to the data packet is the QoS parameter of the data packet; or determine the QoS flow, of the CPE, corresponding to the data packet, based on the second QoS identifier included in the data packet and the mapping relationship between the second QoS identifier and the QoS flow of the CPE, where a QoS parameter of the QoS flow, of the CPE, corresponding to the data packet is the QoS parameter of the data packet.

In a possible implementation, the data packet sent by the CPE to the home access gateway includes at least one of the following information: the identifier of the radio bearer of the UE, the identifier of the UE, and the uplink endpoint information of the first connection transmission tunnel corresponding to the data radio bearer DRB of the UE, where the identifier of the radio bearer of the UE is added by the UE or the CPE, and the identifier of the UE and the uplink endpoint information of the first connection transmission tunnel corresponding to the DRB of the UE are added by the CPE.

In a possible implementation, the receiver is further configured to receive the data packet sent by the home access gateway, where the data packet includes the identifier of the UE, the identifier of the radio bearer of the UE, and/or the identifier of the QoS flow of the UE; and the processor is specifically configured to:

determine the second QoS identifier corresponding to the data packet, based on the identifier that is of the radio bearer of the UE and that is included in the data packet and the mapping relationship between the second QoS identifier and the radio bearer of the UE; or determine the second QoS identifier corresponding to the data packet, based on the identifier that is of the QoS flow of the UE and that is included in the data packet and the mapping relationship between the second QoS identifier and the QoS flow of the UE, where a QoS parameter corresponding to the second QoS identifier corresponding to the data packet is the QoS parameter of the data packet.

In a possible implementation, the receiver is further configured to receive the data packet sent by the home access gateway; and the processor is specifically configured to:

when the data packet includes the identifier of the UE, determine the second QoS identifier corresponding to the data packet, based on the radio bearer of the CPE that carries the data packet and the mapping relationship between the second QoS identifier and the radio bearer of the CPE, where a QoS parameter corresponding to the second QoS identifier corresponding to the data packet is the QoS parameter of the data packet; or when the data packet includes the identifier of the UE, determine the second QoS identifier corresponding to the data packet, based on the identifier that is of the QoS flow of the CPE and that is included in the data packet and the mapping relationship between the second QoS identifier and the QoS of the CPE, where a QoS parameter corresponding to the second QoS identifier corresponding to the data packet is the QoS parameter of the data packet; or when the data packet includes the identifier of the UE and the identifier of the radio bearer of the UE, determine the second QoS identifier corresponding to the data packet, based on the identifier that is of the radio bearer of the UE and that is in the data packet and the mapping relationship between the second QoS identifier and the radio bearer of the UE, where a QoS parameter corresponding to the second QoS identifier corresponding to the data packet is the QoS parameter of the data packet; or when the data packet includes the identifier of the UE and the identifier of the QoS flow of the UE, determine the second QoS identifier corresponding to the data packet, based on the identifier that is of the QoS flow of the UE and that is in the data packet and the mapping relationship between the second QoS identifier and the QoS flow of the UE, where a QoS parameter corresponding to the second QoS identifier corresponding to the data packet is the QoS parameter of the data packet; or when the data packet includes downlink endpoint information of the first connection transmission tunnel corresponding to the DRB of the UE, determine the UE needing to receive the data packet and the DRB of the UE that carries the data packet, based on the downlink endpoint information of the first connection transmission tunnel corresponding to the DRB of the UE, and determine the second QoS identifier corresponding to the data packet, based on the mapping relationship between the second QoS identifier and the radio bearer of the UE, where a QoS parameter corresponding to the second QoS identifier corresponding to the data packet is the QoS parameter of the data packet.

In a possible implementation, when the first link and the second link each are a first-type link, the configuration information of the first link includes at least one of the following information: an identifier of the UE, QoS configuration information of the UE, and QoS configuration information of the CPE, and the configuration information of the second link includes the identifier of the UE and the QoS configuration information of the UE; and the first-type link includes a communications link established based on any one of an LTE system, an LTE-U system, new radio NR, a UMTS system, and a GSM system, where the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer of the UE and the QoS flow of the UE; and the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the radio bearer of the CPE and the QoS flow of the UE, and a mapping relationship between the QoS flow of the CPE and the radio bearer of the UE.

In a possible implementation, the receiver is further configured to receive the data packet sent by the UE, where the data packet includes the identifier of the UE;

the processor is specifically configured to:

determine the radio bearer of the UE that carries the data packet;

determine the radio bearer, of the CPE, corresponding to the data packet, based on the radio bearer of the UE that carries the data packet and the mapping relationship between the radio bearer of the CPE and the radio bearer of the UE; or when the data packet includes the identifier of the QoS flow of the UE, determine the radio bearer, of the CPE, corresponding to the data packet, based on the identifier of the QoS flow of the UE and the mapping relationship between the radio bearer of the CPE and the QoS flow of the UE; or determine the QoS flow, of the CPE, corresponding to the data packet, based on a radio bearer of the UE that carries the data packet and the mapping relationship between the QoS flow of the CPE and the radio bearer of the UE, and determine the radio bearer, of the CPE, corresponding to the data packet, based on the QoS flow, of the CPE, corresponding to the data packet and the mapping relationship between the radio bearer of the CPE and the QoS flow of the CPE, where a QoS parameter of the radio bearer, of the CPE, corresponding to the data packet is the QoS parameter of the data packet; and before the sending, by the transmitter, the data packet based on the QoS parameter of the data packet, the processor is further configured to add at least one of the following information to the data packet: the identifier of the UE, the identifier of the radio bearer of the UE, and the uplink endpoint information of the first connection transmission tunnel corresponding to the DRB of the UE.

In a possible implementation, the determining, by the processor, the radio bearer of the UE that carries the data packet includes:

determining the radio bearer of the UE that carries the data packet, based on a logical channel through which the data packet is received and a correspondence between the logical channel and the radio bearer of the UE.

In a possible implementation, the receiver is further configured to receive the data packet sent by the home access gateway, where the data packet includes the identifier of the UE, the identifier of the radio bearer of the UE, and/or the identifier of the QoS flow of the UE; and the processor is specifically configured to:

determine that a QoS parameter of the radio bearer corresponding to the identifier that is of the radio bearer of the UE and that is included in the data packet is the QoS parameter of the data packet, or determine that a QoS parameter of the QoS flow corresponding to the identifier that is of the QoS flow of the UE and that is included in the data packet is the QoS parameter of the data packet.

In a possible implementation, the receiver is further configured to receive the data packet sent by the home access gateway; and the processor is specifically configured to:

when the data packet includes the identifier of the UE and the identifier of the radio bearer of the UE, determine, the radio bearer, of the UE, corresponding to the data packet, based on the identifier of the UE and the identifier of the radio bearer of the UE; or when the data packet includes the identifier of the UE, determine the radio bearer, of the UE, corresponding to the data packet, based on a radio bearer of the CPE that carries the data packet and the mapping relationship between the radio bearer of the CPE and the radio bearer of the UE; or when the data packet includes downlink endpoint information of the first connection transmission tunnel corresponding to the DRB of the UE, determine the DRB of the UE that carries the data packet on the second link, based on the downlink endpoint information of the first connection transmission tunnel corresponding to the DRB of the UE; or when the data packet includes the identifier of the UE and the identifier of the QoS flow of the UE, determine, by the CPE, the radio bearer, of the UE, corresponding to the data packet, based on the identifier of the QoS flow of the UE and the mapping relationship between the QoS flow of the UE and the radio bearer of the UE, where a QoS parameter of the radio bearer, of the UE, corresponding to the data packet is the QoS parameter of the data packet.

In a possible implementation, when the first link and the second link each are a second-type link, the configuration information of the first link includes at least one of the following information: an identifier of the UE, QoS configuration information of the UE, and QoS information of the first link;

the second-type link is a link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer and the QoS flow of the UE;

the QoS information of the first link includes at least one of the following information: a first QoS identifier, a QoS parameter corresponding to the first QoS identifier, a mapping relationship between the first QoS identifier and the radio bearer of the UE, a mapping relationship between the first QoS identifier and the QoS flow of the UE, and a mapping relationship between the first QoS identifier and a second QoS identifier, where the second QoS identifier is used to identify a QoS granularity of the second link, and the first QoS identifier is used to identify a QoS granularity of the first link; and the configuration information of the second link includes the QoS information of the second link, and the QoS information of the second link includes at least one of the following information: the second QoS identifier, a QoS parameter corresponding to the second QoS identifier, a mapping relationship between the second QoS identifier and the radio bearer of the UE, a mapping relationship between the second QoS identifier and the QoS flow of the UE, and the mapping relationship between the first QoS identifier and the second QoS identifier.

In a possible implementation, the receiver is further configured to receive the data packet sent by the UE, where the data packet includes the identifier of the UE and the second QoS identifier;

the processor is specifically configured to:

determine the radio bearer, of the UE, corresponding to the data packet, based on the second QoS identifier included in the data packet and the mapping relationship between the second QoS identifier and the radio bearer of the UE, and determine the first QoS identifier corresponding to the data packet, based on the radio bearer, of the UE, corresponding to the data packet and the mapping relationship between the first QoS identifier and the radio bearer of the UE; or determine the QoS flow, of the UE, corresponding to the data packet, based on the second QoS identifier included in the data packet and the mapping relationship between the second QoS identifier and the QoS flow of the UE, and determine the first QoS identifier corresponding to the data packet, based on the QoS flow, of the UE, corresponding to the data packet and the mapping relationship between the first QoS identifier and the QoS flow of the UE; or determine the first QoS identifier corresponding to the data packet, based on the second QoS identifier included in the data packet and the mapping relationship between the first QoS identifier and the second QoS identifier, where a QoS parameter corresponding to the first QoS identifier corresponding to the data packet is the QoS parameter of the data packet; and before the sending, by the transmitter, the data packet based on the QoS parameter of the data packet, the processor is further configured to: add, to the data packet, the first QoS identifier corresponding to the data packet.

In a possible implementation, the receiver is further configured to receive the data packet sent by the home access gateway, where the data packet includes the identifier of the UE and the first QoS identifier; and the processor is specifically configured to:

determine the radio bearer, of the UE, corresponding to the data packet, based on the first QoS identifier included in the data packet and the mapping relationship between the first QoS identifier and the radio bearer of the UE, and determine the second QoS identifier corresponding to the data packet, based on the radio bearer, of the UE, corresponding to the data packet and the mapping relationship between the second QoS identifier and the radio bearer of the UE; or determine the QoS flow, of the UE, corresponding to the data packet, based on the first QoS identifier included in the data packet and the mapping relationship between the first QoS identifier and the QoS flow of the UE, and determine the second QoS identifier corresponding to the data packet, based on the QoS flow, of the UE, corresponding to the data packet and the mapping relationship between the second QoS identifier and the QoS flow of the UE; or determine the second QoS identifier corresponding to the data packet, based on the first QoS identifier included in the data packet and the mapping relationship between the first QoS identifier and the second QoS identifier, where a QoS parameter corresponding to the second QoS identifier corresponding to the data packet is the QoS parameter of the data packet.

In a possible implementation, when the first link is a second-type link and the second link is a first-type link, the configuration information of the first link includes at least one of the following information: an identifier of the UE, QoS configuration information of the UE, and the QoS information of the first link, and the configuration information of the second link includes the QoS configuration information of the UE;

the first-type link includes a communications link established based on any one of an LTE system, an LTE-U system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS information of the first link includes at least one of the following information: a first QoS identifier, a QoS parameter corresponding to the first QoS identifier, a mapping relationship between the first QoS identifier and a radio bearer of the UE, and a mapping relationship between the first QoS identifier and a QoS flow of the UE, where the first QoS identifier is used to identify a QoS granularity of the first link; and the QoS configuration information of the UE includes at least one of the following information: an identifier of the radio bearer of the UE, a QoS parameter of the radio bearer of the UE, uplink endpoint information of a first connection transmission tunnel corresponding to a data radio bearer DRB of the UE, an identifier of the QoS flow of the UE, a QoS parameter of the QoS flow of the UE, and a mapping relationship between the radio bearer of the UE and the QoS flow of the UE.

In a possible implementation, the receiver is further configured to receive the data packet sent by the UE;

the processor is specifically configured to:

determine the radio bearer of the UE that carries the data packet;

determine the first QoS identifier corresponding to the data packet, based on the radio bearer of the UE that carries the data packet and the mapping relationship between the first QoS identifier and the radio bearer of the UE; or determine the first QoS identifier corresponding to the data packet, based on the identifier that is of the QoS flow of the UE and that is included in the data packet and the mapping relationship between the first QoS identifier and the QoS flow of the UE, where a QoS parameter corresponding to the first QoS identifier corresponding to the data packet is the QoS parameter of the data packet; and before the sending, by the transmitter, the data packet based on the QoS parameter of the data packet, the processor is further configured to:

add, to the data packet, the first QoS identifier corresponding to the data packet.

In a possible implementation, the receiver is further configured to receive the data packet sent by the home access gateway, where the data packet includes the identifier of the UE and a first QoS identifier; and the processor is specifically configured to:

determine the radio bearer, of the UE, corresponding to the data packet, based on the first QoS identifier included in the data packet and the mapping relationship between the first QoS identifier and the radio bearer of the UE, where a QoS parameter of the radio bearer, of the UE, corresponding to the data packet is the QoS parameter of the data packet; or determine the QoS flow, of the UE, corresponding to the data packet, based on the first QoS identifier included in the data packet and the mapping relationship between the first QoS identifier and the QoS flow of the UE, where a QoS parameter of the QoS flow, of the UE, corresponding to the data packet is the QoS parameter of the data packet.

In a possible implementation, before the receiving, by the receiver, configuration information of a first link and configuration information of a second link that are sent by a home access gateway, the transmitter is further configured to:

send a first request message to the home access gateway, where the first request message is used to request to establish a first connection, the first connection is a connection between the CPE and the home access gateway, the first connection is carried on the first link, and the first request message includes an identifier of the CPE; and the receiver is further configured to receive a first response message sent by the home access gateway, where the first response message includes an identifier of the home access gateway and an identifier of a cell needing to be activated.

In a possible implementation, the sending, by the transmitter, a first request message to the home access gateway includes:

sending the first request message to the home access gateway based on first configuration information obtained in advance, where the first configuration information is used to trigger establishment of the first connection; or sending the first request message to the home access gateway when the receiver receives information that is sent by the UE and that indicates that the UE has a requirement for connecting to the home access gateway; or sending, by the CPE, the first request message to the home access gateway when the receiver receives a specific tagged packet sent by the UE.

In a possible implementation, when the second link is the second-type link, the data packet that is sent by the UE and that is received by the receiver includes second indication information, and the second indication information is used to indicate that data included in the data packet is control plane signaling or user plane data.

In a possible implementation, the transmitter is further configured to:

send a discovery signal to the UE, where the discovery signal is used by the UE to discover the CPE, the discovery signal includes first indication information, the first indication information is used to indicate that the CPE supports providing the UE with a connection to a first-type network, and supports providing the UE with mobility management and QoS management in the first-type network, and the first-type network includes any one of the LTE system, the LTE-U system, the NR, the UMTS system, and the GSM system.

A fifth aspect of this application provides UE, including:

a processor, configured to establish an RRC connection to a home access gateway by using CPE;

a receiver, configured to receive configuration information that is sent by the home access gateway and that is of a link between the CPE and the UE, where the configuration information is used to indicate quality of service QoS information of the link between the CPE and the UE, where the processor is further configured to determine a QoS parameter of a data packet based on the configuration information; and a transmitter, configured to send the data packet to the CPE based on the QoS parameter of the data packet.

In a possible implementation, when the link between the CPE and the UE is a first-type link, the configuration information includes an identifier of the UE and/or QoS configuration information of the UE, and the first-type link includes a communications link established based on any one of an LTE system, an LTE-U system, NR, a UMTS system, and a GSM system;

the QoS configuration information of the UE includes at least one of the following information: an identifier of a radio bearer of the UE, uplink endpoint information of a first connection transmission tunnel corresponding to a data radio bearer DRB of the UE, a QoS parameter of the radio bearer of the UE, an identifier of a QoS flow of the UE, a QoS parameter of the QoS flow of the UE, and a mapping relationship between the radio bearer of the UE and the QoS flow of the UE; and the processor is specifically configured to determine that a QoS parameter of the radio bearer or the QoS flow, of the UE, corresponding to the data packet is the QoS parameter of the data packet.

In a possible implementation, when the link between the CPE and the UE is a second-type link, the second-type link is a communications link established based on any one of a WLAN, Bluetooth, ZigBee, the Ethernet, a PPP, a PPPoE, an ATM, CDMA, and CDMA2000; and the configuration information includes the QoS information of the link between the CPE and the UE, and the QoS information of the link between the CPE and the UE includes at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, where the second QoS identifier is used to identify a QoS granularity of the second link;

the processor is specifically configured to:

determine the second QoS identifier corresponding to the data packet, based on the radio bearer, of the UE, corresponding to the data packet and the mapping relationship between the second QoS identifier and the radio bearer of the UE; or determine the second QoS identifier corresponding to the data packet, based on a QoS flow, of the UE, corresponding to the data packet and the mapping relationship between the second QoS identifier and the QoS flow of the UE; and before the sending, by the transmitter, the data packet to the CPE based on the QoS parameter of the data packet, the processor is further configured to: add, to the data packet, the second QoS identifier corresponding to the data packet.

In a possible implementation, before the establishing, by processor, an RRC connection to a home access gateway by using CPE, the receiver is further configured to:

receive a discovery signal sent by the CPE, where the discovery signal is used by the UE to discover the CPE, the discovery signal includes first indication information, the first indication information is used to indicate that the CPE supports providing the UE with a connection to a first-type network, and supports providing the UE with mobility management and QoS management in the first-type network, and the first-type network includes any one of the LTE system, the LTE-U system, the NR, the UMTS system, and the GSM system.

In a possible implementation, the data packet sent by the transmitter includes second indication information, and the second indication information is used to indicate that data included in the data packet is control plane signaling or user plane data.

A sixth aspect of this application provides a home access gateway, including:

a transmitter, configured to send configuration information of a first link and configuration information of a second link to CPE, where the first link is a link between the CPE and the home access gateway, the second link is a link between the CPE and UE, the configuration information of the first link is used to indicate quality of service QoS information of the first link, the configuration information of the second link is used to indicate QoS information of the second link, and the configuration information of the first link and the configuration information of the second link are used to determine a QoS parameter of a data packet sent to the UE.

In a possible implementation, when the first link is a first-type link and the second link is a second-type link, the configuration information of the first link includes at least one of the following information: an identifier of the UE, QoS configuration information of the UE, and QoS configuration information of the CPE, and the configuration information of the second link includes the QoS information of the second link;

the first-type link includes a communications link established based on any one of an LTE system, an LTE-U system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer of the UE and the QoS flow of the UE;

the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the QoS flow of the CPE and the radio bearer of the UE, and a mapping relationship between the radio bearer of the CPE and the QoS flow of the UE; and the QoS information of the second link includes at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, where the second QoS identifier is used to identify a QoS granularity of the second link.

In a possible implementation, when the first link and the second link each are a first-type link, the configuration information of the first link includes at least one of the following information: an identifier of the UE, QoS configuration information of the UE, and QoS configuration information of the CPE;

the first-type link includes a communications link established based on any one of an LTE system, an LTE-U system, new radio NR, a UMTS system, and a GSM system, where the configuration information of the second link includes the identifier of the UE and information about a radio bearer of the UE;

the QoS configuration information of the UE includes at least one of the following information: an identifier of the radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer and the QoS flow of the UE; and the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the radio bearer of the CPE and the QoS flow of the UE, and a mapping relationship between the QoS flow of the CPE and the radio bearer of the UE.

In a possible implementation, the home access gateway further includes:

a processor, configured to determine a QoS parameter of a data packet, where the transmitter is further configured to send the data packet based on the QoS parameter of the data packet.

In a possible implementation, when the first link is the first-type link, the processor is specifically configured to:

receive the data packet sent by a core network device, and determine the identifier of the radio bearer, of the UE, corresponding to the data packet or the identifier of the QoS flow, of the UE, corresponding to the data packet, where the data packet includes the identifier of the UE;

determine the radio bearer, of the CPE, corresponding to the data packet, based on the identifier of the radio bearer, of the UE, corresponding to the data packet and the mapping relationship between the radio bearer of the CPE and the radio bearer of the UE; or determine the radio bearer, of the CPE, corresponding to the data packet based on the identifier of the QoS flow, of the UE, corresponding to the data packet and the mapping relationship between the QoS flow of the UE and the radio bearer of the CPE; or determine the radio bearer, of the UE, corresponding to the data packet, based on the identifier of the QoS flow, of the UE, corresponding to the data packet and the mapping relationship between the radio bearer of the UE and the QoS flow of the UE, and determine the radio bearer, of the CPE, corresponding to the data packet, based on the mapping relationship between the radio bearer of the CPE and the radio bearer of the UE, where a QoS parameter of the radio bearer, of the CPE, corresponding to the data packet is the QoS parameter of the data packet.

In a possible implementation, when the first link and the second link each are a second-type link, the configuration information of the first link includes at least one of the following information: an identifier of the UE, QoS configuration information of the UE, and QoS information of the first link;

the second-type link is a communications link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer and the QoS flow of the UE;

the QoS information of the first link includes at least one of the following information: a first QoS identifier, a QoS parameter corresponding to the first QoS identifier, a mapping relationship between the first QoS identifier and the radio bearer of the UE, a mapping relationship between the first QoS identifier and the QoS flow of the UE, and a mapping relationship between the first QoS identifier and a second QoS identifier, where the second QoS identifier is used to identify a QoS granularity of the second link, and the first QoS identifier is used to identify a QoS granularity of the first link; and the configuration information of the second link includes QoS information of the second link, and the QoS information of the second link includes at least one of the following information: the second QoS identifier, a QoS parameter corresponding to the second QoS identifier, a mapping relationship between the second QoS identifier and the radio bearer of the UE, a mapping relationship between the second QoS identifier and the QoS flow of the UE, and the mapping relationship between the first QoS identifier and the second QoS identifier.

In a possible implementation, when the first link is a second-type link and the second link is a first-type link, the configuration information of the first link includes at least one of the following information: an identifier of the UE, QoS configuration information of the UE, and QoS information of the first link, and the configuration information of the second link includes the QoS configuration information of the UE;

the first-type link includes a communications link established based on any one of an LTE system, an LTE-U system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS information of the first link includes at least one of the following information: a first QoS identifier, a QoS parameter corresponding to the first QoS identifier, a mapping relationship between the first QoS identifier and a radio bearer of the UE, and a mapping relationship between the first QoS identifier and a QoS flow of the UE, where the first QoS identifier is used to identify a QoS granularity of the first link; and the QoS configuration information of the UE includes at least one of the following information: an identifier of the radio bearer of the UE, a QoS parameter of the radio bearer of the UE, uplink endpoint information of a first connection transmission tunnel corresponding to a data radio bearer DRB of the UE, an identifier of the QoS flow of the UE, a QoS parameter of the QoS flow of the UE, and a mapping relationship between the radio bearer of the UE and the QoS flow of the UE.

In a possible implementation, when the first link is the second-type link, the processor is specifically configured to:

receive the data packet sent by a core network device, and determine the identifier of the radio bearer, of the UE, corresponding to the data packet or the identifier of the QoS flow, of the UE, corresponding to the data packet, where the data packet includes the identifier of the UE;

determine the first QoS identifier corresponding to the data packet, based on the identifier of the radio bearer, of the UE, corresponding to the data packet and the mapping relationship between the first QoS identifier and the radio bearer of the UE; or determine the first QoS identifier corresponding to the data packet, based on the identifier of the QoS flow, of the UE, corresponding to the data packet and the mapping relationship between the first QoS identifier and the QoS flow of the UE, where a QoS parameter corresponding to the first QoS identifier corresponding to the data packet is the QoS parameter of the data packet; and before the sending, by the transmitter, the data packet based on the QoS parameter of the data packet, the processor is further configured to: add, to the data packet, the first QoS identifier corresponding to the data packet.

A seventh aspect of this application provides CPE, including:

a receive module, configured to receive configuration information of a first link and configuration information of a second link that are sent by a home access gateway, where the first link is a link between the CPE and the home access gateway, the second link is a link between the CPE and UE, the configuration information of the first link is used to indicate quality of service QoS information of the first link, and the configuration information of the second link is used to indicate QoS information of the second link;

a transmit module, configured to send the configuration information of the second link to the UE; and a processing module, configured to determine a QoS parameter of a data packet of the UE based on the configuration information of the first link and the configuration information of the second link, where the transmit module is further configured to send the data packet based on the QoS parameter of the data packet.

In a possible implementation, when the first link is a first-type link and the second link is a second-type link, the configuration information of the first link includes at least one of the following information: an identifier of the UE, QoS configuration information of the UE, and QoS configuration information of the CPE, and the configuration information of the second link includes QoS information of the second link;

the first-type link includes a communications link established based on any one of an LTE system, a U-LTE system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer of the UE and the QoS flow of the UE;

the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the QoS flow of the CPE and the radio bearer of the UE, and a mapping relationship between the radio bearer of the CPE and the QoS flow of the UE; and the QoS information of the second link includes at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, where the second QoS identifier is used to identify a QoS granularity of the second link.

In a possible implementation, the processing module is specifically configured to:

receive the data packet sent by the UE, where the data packet includes the identifier of the UE and the second QoS identifier;

determine the radio bearer, of the UE, corresponding to the data packet, based on the second QoS identifier included in the data packet and the mapping relationship between the second QoS identifier and the radio bearer of the UE; or determine the QoS flow, of the UE, corresponding to the data packet, based on the second QoS identifier included in the data packet and the mapping relationship between the second QoS identifier and the QoS flow of the UE, and determine the radio bearer, of the UE, corresponding to the data packet, based on the mapping relationship between the radio bearer of the UE and the QoS flow of the UE; and determine the radio bearer or the QoS flow, of the CPE, corresponding to the data packet, based on the radio bearer, of the UE, corresponding to the data packet and the mapping relationship between the radio bearer of the CPE and the radio bearer of the UE; or determine the radio bearer, of the CPE, corresponding to the data packet, based on the radio bearer, of the UE, corresponding to the data packet and the mapping relationship between the QoS flow of the CPE and the radio bearer of the UE, where a QoS parameter of the radio bearer or the QoS flow, of the CPE, corresponding to the data packet is the QoS parameter of the data packet.

In a possible implementation, the receive module is further configured to receive the data packet sent by the UE, where the data packet includes the identifier of the UE and the second QoS identifier; and the processing module is specifically configured to:

determine the radio bearer, of the CPE, corresponding to the data packet, based on the second QoS identifier included in the data packet and the mapping relationship between the second QoS identifier and the radio bearer of the CPE, where a QoS parameter of the radio bearer, of the CPE, corresponding to the data packet is the QoS parameter of the data packet; or determine the QoS flow, of the CPE, corresponding to the data packet, based on the second QoS identifier included in the data packet and the mapping relationship between the second QoS identifier and the QoS flow of the CPE, where a QoS parameter of the QoS flow, of the CPE, corresponding to the data packet is the QoS parameter of the data packet.

In a possible implementation, the data packet sent by the CPE to the home access gateway includes at least one of the following information: the identifier of the radio bearer of the UE, the identifier of the UE, and the uplink endpoint information of the first connection transmission tunnel corresponding to the data radio bearer DRB of the UE, where the identifier of the radio bearer of the UE is added by the UE or the CPE, and the identifier of the UE and the uplink endpoint information of the first connection transmission tunnel corresponding to the DRB of the UE are added by the CPE.

In a possible implementation, the receive module is further configured to receive the data packet sent by the home access gateway, where the data packet includes the identifier of the UE, the identifier of the radio bearer of the UE, and/or the identifier of the QoS flow of the UE; and the processing module is specifically configured to:

determine the second QoS identifier corresponding to the data packet, based on the identifier that is of the radio bearer of the UE and that is included in the data packet and the mapping relationship between the second QoS identifier and the radio bearer of the UE; or determine the second QoS identifier corresponding to the data packet, based on the identifier that is of the QoS flow of the UE and that is included in the data packet and the mapping relationship between the second QoS identifier and the QoS flow of the UE, where a QoS parameter corresponding to the second QoS identifier corresponding to the data packet is the QoS parameter of the data packet.

In a possible implementation, the receive module is further configured to receive the data packet sent by the home access gateway; and the processing module is specifically configured to:

when the data packet includes the identifier of the UE, determine the second QoS identifier corresponding to the data packet, based on the radio bearer of the CPE that carries the data packet and the mapping relationship between the second QoS identifier and the radio bearer of the CPE, where a QoS parameter corresponding to the second QoS identifier corresponding to the data packet is the QoS parameter of the data packet; or when the data packet includes the identifier of the UE, determine the second QoS identifier corresponding to the data packet, based on the identifier that is of the QoS flow of the CPE and that is included in the data packet and the mapping relationship between the second QoS identifier and the QoS of the CPE, where a QoS parameter corresponding to the second QoS identifier corresponding to the data packet is the QoS parameter of the data packet; or when the data packet includes the identifier of the UE and the identifier of the radio bearer of the UE, determine the second QoS identifier corresponding to the data packet, based on the identifier that is of the radio bearer of the UE and that is in the data packet and the mapping relationship between the second QoS identifier and the radio bearer of the UE, where a QoS parameter corresponding to the second QoS identifier corresponding to the data packet is the QoS parameter of the data packet; or when the data packet includes the identifier of the UE and the identifier of the QoS flow of the UE, determine the second QoS identifier corresponding to the data packet, based on the identifier that is of the QoS flow of the UE and that is in the data packet and the mapping relationship between the second QoS identifier and the QoS flow of the UE, where a QoS parameter corresponding to the second QoS identifier corresponding to the data packet is the QoS parameter of the data packet; or when the data packet includes downlink endpoint information of the first connection transmission tunnel corresponding to the DRB of the UE, determine the UE needing to receive the data packet and the DRB of the UE that carries the data packet, based on the downlink endpoint information of the first connection transmission tunnel corresponding to the DRB of the UE, and determine the second QoS identifier corresponding to the data packet, based on the mapping relationship between the second QoS identifier and the radio bearer of the UE, where a QoS parameter corresponding to the second QoS identifier corresponding to the data packet is the QoS parameter of the data packet.

In a possible implementation, when the first link and the second link each are a first-type link, the configuration information of the first link includes at least one of the following information: an identifier of the UE, QoS configuration information of the UE, and QoS configuration information of the CPE, and the configuration information of the second link includes the identifier of the UE and the QoS configuration information of the UE; and the first-type link includes a communications link established based on any one of an LTE system, an LTE-U system, new radio NR, a UMTS system, and a GSM system, where the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer of the UE and the QoS flow of the UE; and the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the radio bearer of the CPE and the QoS flow of the UE, and a mapping relationship between the QoS flow of the CPE and the radio bearer of the UE.

In a possible implementation, the receive module is further configured to receive the data packet sent by the UE, where the data packet includes the identifier of the UE;

the processing module is specifically configured to:
determine the radio bearer of the UE that carries the data packet;
determine the radio bearer, of the CPE, corresponding to the data packet, based on the radio bearer of the UE that carries the data packet and the mapping relationship between the radio bearer of the CPE and the radio bearer of the UE; or when the data packet includes the identifier of the QoS flow of the UE, determine the radio bearer, of the CPE, corresponding to the data packet, based on the identifier of the QoS flow of the UE and the mapping relationship between the radio bearer of the CPE and the QoS flow of the UE; or determine, by the CPE, the QoS flow, of the CPE, corresponding to the data packet, based on the radio bearer of the UE that carries the data packet and the mapping relationship between the QoS flow of the CPE and the radio bearer of the UE, and determine the radio bearer, of the CPE, corresponding to the data packet, based on the QoS flow, of the CPE, corresponding to the data packet and the mapping relationship between the radio bearer of the CPE and the QoS flow of the CPE, where a QoS parameter of the radio bearer, of the CPE, corresponding to the data packet is the QoS parameter of the data packet; and before the sending, by the transmit module, the data packet based on the QoS parameter of the data packet, the processing module is further configured to add at least one of the following information to the data packet: the identifier of the UE, the identifier of the radio bearer of the UE, and the uplink endpoint information of the first connection transmission tunnel corresponding to the DRB of the UE.

In a possible implementation, the determining, by the processing module, the radio bearer of the UE that carries the data packet includes:

determining the radio bearer of the UE that carries the data packet, based on a logical channel through which the data packet is received and a correspondence between the logical channel and the radio bearer of the UE.

In a possible implementation, the receive module is further configured to receive the data packet sent by the home access gateway, where the data packet includes the identifier of the UE, the identifier of the radio bearer of the UE, or the identifier of the QoS flow of the UE; and the processing module is specifically configured to:
determine that a QoS parameter of the radio bearer corresponding to the identifier that is of the radio bearer of the UE and that is included in the data packet is the QoS parameter of the data packet, or determine that a QoS parameter of the QoS flow corresponding to the identifier that is of the QoS flow of the UE and that is included in the data packet is the QoS parameter of the data packet.

In a possible implementation, the receive module is further configured to receive the data packet sent by the home access gateway; and the processing module is specifically configured to:
when the data packet includes the identifier of the UE and the identifier of the radio bearer of the UE, determine the radio bearer, of the UE, corresponding to the data packet, based on the identifier of the UE and the identifier of the radio bearer of the UE; or when the data packet includes the identifier of the UE, determine the radio bearer, of the UE, corresponding to the data packet, based on the radio bearer of the CPE that carries the data packet and the mapping relationship between the radio bearer of the CPE and the radio bearer of the UE; or when the data packet includes downlink endpoint information of the first connection transmission tunnel corresponding to the DRB of the UE, determine the DRB of the UE that carries the data packet on the second link, based on the downlink endpoint information of the first connection transmission tunnel corresponding to the DRB of the UE; or when the data packet includes the identifier of the UE and the identifier of the QoS flow of the UE, determine the radio bearer, of the UE, corresponding to the data packet, based on the identifier of the QoS flow of the UE and the mapping relationship between the QoS flow of the UE and the radio bearer of the UE, where a QoS parameter of the radio bearer, of the UE, corresponding to the data packet is the QoS parameter of the data packet.

In a possible implementation, when the first link and the second link each are a second-type link, the configuration information of the first link includes at least one of the following information: an identifier of the UE, QoS configuration information of the UE, and QoS information of the first link;

the second-type link is a link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer and the QoS flow of the UE; and the QoS information of the first link includes at least one of the following information: a first QoS identifier, a QoS parameter corresponding to the first QoS identifier, a mapping relationship between the first QoS identifier and the radio bearer of the UE, a mapping relationship between the first QoS identifier and the QoS flow of the UE, and a mapping relationship between the first QoS identifier and a second QoS identifier, where the second QoS identifier is used to identify a QoS granularity of the second link, and the first QoS identifier is used to identify a QoS granularity of the first link; and the configuration information of the second link includes the QoS information of the second link, and the QoS information of the second link includes at least one of the following information: the second QoS identifier, a QoS parameter corresponding to the second QoS identifier, a mapping relationship between the second QoS identifier and the radio bearer of the UE, a mapping relationship between the second QoS identifier and the QoS flow of the UE, and the mapping relationship between the first QoS identifier and the second QoS identifier.

In a possible implementation, the receive module is further configured to receive the data packet sent by the UE, where the data packet includes the identifier of the UE and the second QoS identifier;

the processing module is specifically configured to:

determine the radio bearer, of the UE, corresponding to the data packet, based on the second QoS identifier included in the data packet and the mapping relationship between the second QoS identifier and the radio bearer of the UE, and determine the first QoS identifier corresponding to the data packet, based on the radio bearer, of the UE, corresponding to the data packet and the mapping relationship between the first QoS identifier and the radio bearer of the UE; or determine the QoS flow, of the UE, corresponding to the data packet, based on the second QoS identifier included in the data packet and the mapping relationship between the second QoS identifier and the QoS flow of the UE, and determine the first QoS identifier corresponding to the data packet, based on the QoS flow, of the UE, corresponding to the data packet and the mapping relationship between the first QoS identifier and the QoS flow of the UE; or determine the first QoS identifier corresponding to the data packet, based on the second QoS identifier included in the data packet and the mapping relationship between the first QoS identifier and the second QoS identifier, where a QoS parameter corresponding to the first QoS identifier corresponding to the data packet is the QoS parameter of the data packet; and before the sending, by the transmit module, the data packet based on the QoS parameter of the data packet, the processor is further configured to: add, to the data packet, the first QoS identifier corresponding to the data packet.

In a possible implementation, the receive module is further configured to receive the data packet sent by the home access gateway, where the data packet includes the identifier of the UE and the first QoS identifier; and the processing module is specifically configured to:

determine the radio bearer, of the UE, corresponding to the data packet, based on the first QoS identifier included in the data packet and the mapping relationship between the first QoS identifier and the radio bearer of the UE, and determine the second QoS identifier corresponding to the data packet, based on the radio bearer, of the UE, corresponding to the data packet and the mapping relationship between the second QoS identifier and the radio bearer of the UE; or determine the QoS flow, of the UE, corresponding to the data packet, based on the first QoS identifier included in the data packet and the mapping relationship between the first QoS identifier and the QoS flow of the UE, and determine the second QoS identifier corresponding to the data packet, based on the QoS flow, of the UE, corresponding to the data packet and the mapping relationship between the second QoS identifier and the QoS flow of the UE; or determine the second QoS identifier corresponding to the data packet, based on the first QoS identifier included in the data packet and the mapping relationship between the first QoS identifier and the second QoS identifier, where a QoS parameter corresponding to the second QoS identifier corresponding to the data packet is the QoS parameter of the data packet.

In a possible implementation, when the first link is a second-type link and the second link is a first-type link, the configuration information of the first link includes at least one of the following information: an identifier of the UE, QoS configuration information of the UE, and QoS information of the first link, and the configuration information of the second link includes the QoS configuration information of the UE;

the first-type link includes a communications link established based on any one of an LTE system, an LTE-U system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS information of the first link includes at least one of the following information: a first QoS identifier, a QoS parameter corresponding to the first QoS identifier, a mapping relationship between the first QoS identifier and a radio bearer of the UE, and a mapping relationship between the first QoS identifier and a QoS flow of the UE, where the first QoS identifier is used to identify a QoS granularity of the first link; and the QoS configuration information of the UE includes at least one of the following information: an identifier of the radio bearer of the UE, a QoS parameter of the radio bearer of the UE, uplink endpoint information of a first connection transmission tunnel corresponding to a data radio bearer DRB of the UE, an identifier of the QoS flow of the UE, a QoS parameter of the QoS flow of the UE, and a mapping relationship between the radio bearer of the UE and the QoS flow of the UE.

In a possible implementation, the receive module is further configured to receive the data packet sent by the UE;

the processing module is specifically configured to:

determine the radio bearer of the UE that carries the data packet;

determine the first QoS identifier corresponding to the data packet, based on the radio bearer of the UE that carries the data packet and the mapping relationship between the first QoS identifier and the radio bearer of the UE; or determine the first QoS identifier corresponding to the data packet, based on the identifier that is of the QoS flow of the UE and that is included in the data packet and the mapping relationship between the first QoS identifier and the QoS flow of the UE, where a QoS parameter corresponding to the first QoS identifier corresponding to the data packet is the QoS parameter of the data packet; and before the sending, by the transmit module, the data packet based on the QoS parameter of the data packet, the processing module is further configured to:

add, to the data packet, the first QoS identifier corresponding to the data packet.

In a possible implementation, the receive module is further configured to receive the data packet sent by the home access gateway, where the data packet includes the identifier of the UE and the first QoS identifier; and the processing module is specifically configured to:

determine the radio bearer, of the UE, corresponding to the data packet, based on the first QoS identifier included in the data packet and the mapping relationship between the first QoS identifier and the radio bearer of the UE, where a QoS parameter of the radio bearer, of the UE, corresponding to the data packet is the QoS parameter of the data packet; or determine the QoS flow, of the UE, corresponding to the data packet, based on the first QoS identifier included in the data packet and the mapping relationship between the first QoS identifier and the QoS flow of the UE, where a QoS parameter of the QoS flow, of the UE, corresponding to the data packet is the QoS parameter of the data packet.

In a possible implementation, before the receiving, by the receive module, configuration information of a first link and configuration information of a second link that are sent by a home access gateway, the transmit module is further configured to:

send a first request message to the home access gateway, where the first request message is used to request to establish a first connection, the first connection is a connection between the CPE and the home access gateway, the first connection is carried on the first link, and the first request message includes an identifier of the CPE; and the receive module is further configured to receive a first response message sent by the home access gateway, where the first response message includes an identifier of the home access gateway and an identifier of a cell needing to be activated.

In a possible implementation, the sending, by the transmit module, a first request message to the home access gateway includes:

sending the first request message to the home access gateway based on first configuration information obtained in advance, where the first configuration information is used to trigger establishment of the first connection; or sending the first request message to the home access gateway when the receive module receives information that is sent by the UE and that indicates that the UE has a requirement for connecting to the home access gateway; or send, by the CPE, the first request message to the home access gateway when the receive module receives a specific tagged packet sent by the UE.

In a possible implementation, when the second link is the second-type link, the data packet that is sent by the UE and that is received by the receive module includes second indication information, and the second indication information is used to indicate that data included in the data packet is control plane signaling or user plane data.

In a possible implementation, the transmit module is further configured to:

send a discovery signal to the UE, where the discovery signal is used by the UE to discover the CPE, the discovery signal includes first indication information, the first indication information is used to indicate that the CPE supports providing the UE with a connection to a first-type network, and supports providing the UE with mobility management and QoS management in the first-type network, and the first-type network includes any one of the LTE system, the LTE-U system, the NR, the UMTS system, and the GSM system.

An eighth aspect of this application provides UE, including:

a processing module, configured to establish an RRC connection to a home access gateway by using CPE;

a receive module, configured to receive configuration information that is sent by the home access gateway and that is of a link between the CPE and the UE, where the configuration information is used to indicate quality of service QoS information of the link between the CPE and the UE, where the processing module is further configured to determine a QoS parameter of a data packet based on the configuration information; and a transmit module, configured to send the data packet to the CPE based on the QoS parameter of the data packet.

In a possible implementation, when the link between the CPE and the UE is a first-type link, the configuration information includes an identifier of the UE and/or QoS configuration information of the UE, and the first-type link includes a communications link established based on any one of an LTE system, an LTE-U system, NR, a UMTS system, and a GSM system;

the QoS configuration information of the UE includes at least one of the following information: an identifier of a radio bearer of the UE, uplink endpoint information of a first connection transmission tunnel corresponding to a data radio bearer DRB of the UE, a QoS parameter of the radio bearer of the UE, an identifier of a QoS flow of the UE, a QoS parameter of the QoS flow of the UE, and a mapping relationship between the radio bearer of the UE and the QoS flow of the UE; and the processing module is specifically configured to determine that a QoS parameter of the radio bearer or the QoS flow, of the UE, corresponding to the data packet is the QoS parameter of the data packet.

In a possible implementation, when the link between the CPE and the UE is a second-type link, the second-type link is a communications link established based on any one of a WLAN, Bluetooth, ZigBee, the Ethernet, a PPP, a PPPoE, an ATM, CDMA, and CDMA2000; and the configuration information includes the QoS information of the link between the CPE and the UE, and the QoS information of the link between the CPE and the UE includes at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, where the second QoS identifier is used to identify a QoS granularity of the second link;

the processing module is specifically configured to:

determine the second QoS identifier corresponding to the data packet, based on the radio bearer, of the UE, corresponding to the data packet and the mapping relationship between the second QoS identifier and the radio bearer of the UE; or determine the second QoS identifier corresponding to the data packet, based on the QoS flow, of the UE, corresponding to the data packet and the mapping relationship between the second QoS identifier and the QoS flow of the UE;

determine that a QoS parameter corresponding to the second QoS identifier corresponding to the data packet is the QoS parameter of the data packet; and before the sending, by a transmit module, the data packet to the CPE based on the QoS parameter of the data packet, the processing module is further configured to: add, to the data packet, the second QoS identifier corresponding to the data packet.

In a possible implementation, before the establishing, by a processing module, an RRC connection to a home access gateway by using CPE, the receive module is further configured to:

receive a discovery signal sent by the CPE, where the discovery signal is used by the UE to discover the CPE, the discovery signal includes first indication information, the first indication information is used to indicate that the CPE supports providing the UE with a connection to a first-type network, and supports providing the UE with mobility management and QoS management in the first-type network, and the first-type network includes any one of the LTE system, the LTE-U system, the NR, the UMTS system, and the GSM system.

In a possible implementation, the data packet sent by the transmit module includes second indication information, and the second indication information is used to indicate that data included in the data packet is control plane signaling or user plane data.

A ninth aspect of this application provides a home access gateway, including:

a transmit module, configured to send configuration information of a first link and configuration information of a second link to CPE, where the first link is a link between the CPE and the home access gateway, the second link is a link between the CPE and UE, the configuration information of the first link is used to indicate quality of service QoS information of the first link, the configuration information of the second link is used to indicate QoS information of the second link, and the configuration information of the first link and the configuration information of the second link are used to determine a QoS parameter of a data packet sent to the UE.

In a possible implementation, when the first link is a first-type link and the second link is a second-type link, the configuration information of the first link includes at least one of the following information: an identifier of the UE, QoS configuration information of the UE, and QoS configuration information of the CPE, and the configuration information of the second link includes the QoS information of the second link;

the first-type link includes a communications link established based on any one of an LTE system, an LTE-U system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer of the UE and the QoS flow of the UE;

the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the QoS flow of the CPE and the radio bearer of the UE, and a mapping relationship between the radio bearer of the CPE and the QoS flow of the UE; and the QoS information of the second link includes at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, where the second QoS identifier is used to identify a QoS granularity of the second link.

In a possible implementation, when the first link and the second link each are a first-type link, the configuration information of the first link includes at least one of the following information: an identifier of the UE, QoS configuration information of the UE, and QoS configuration information of the CPE;

the first-type link includes a communications link established based on any one of an LTE system, an LTE-U system, new radio NR, a UMTS system, and a GSM system, where the configuration information of the second link includes the identifier of the UE and information about a radio bearer of the UE;

the QoS configuration information of the UE includes at least one of the following information: an identifier of the radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer and the QoS flow of the UE; and the QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the radio bearer of the CPE and the QoS flow of the UE, and a mapping relationship between the QoS flow of the CPE and the radio bearer of the UE.

In a possible implementation, the home access gateway further includes:

a processing module, configured to determine a QoS parameter of a data packet, where the transmit module is further configured to send the data packet based on the QoS parameter of the data packet.

In a possible implementation, when the first link is the first-type link, the processing module is specifically configured to:

receive the data packet sent by a core network device, and determine the identifier of the radio bearer, of the UE, corresponding to the data packet or the identifier of the QoS flow, of the UE, corresponding to the data packet, where the data packet includes the identifier of the UE;

determine the radio bearer, of the CPE, corresponding to the data packet, based on the identifier of the radio bearer, of the UE, corresponding to the data packet and the mapping relationship between the radio bearer of the CPE and the radio bearer of the UE; or determine the radio bearer, of the CPE, corresponding to the data packet based on the identifier of the QoS flow, of the UE, corresponding to the data packet and the mapping relationship between the QoS flow of the UE and the radio bearer of the CPE; or determine the radio bearer, of the UE, corresponding to the data packet, based on the identifier of the QoS flow, of the UE, corresponding to the data packet and the mapping relationship between the radio bearer of the UE and the QoS flow of the UE, and determine the radio bearer, of the CPE, corresponding to the data packet, based on the mapping relationship between the radio bearer of the CPE and the radio bearer of the UE, where a QoS parameter of the radio bearer, of the CPE, corresponding to the data packet is the QoS parameter of the data packet.

In a possible implementation, when the first link and the second link each are a second-type link, the configuration information of the first link includes at least one of the following information: an identifier of the UE, QoS configuration information of the UE, and QoS information of the first link;

the second-type link is a communications link established based on any one of a WLAN, Bluetooth, ZigBee, the Ethernet, a PPP, a PPPoE, an ATM, CDMA, and CDMA2000;

the QoS configuration information of the UE includes at least one of the following information: an identifier of a radio bearer of the UE, a QoS parameter of the radio bearer of the UE, uplink endpoint information of a first connection transmission tunnel corresponding to a data radio bearer DRB of the UE, an identifier of a QoS flow of the UE, a QoS parameter of the QoS flow of the UE, and a mapping relationship between the radio bearer and the QoS flow of the UE;

the QoS information of the first link includes at least one of the following information: a first QoS identifier, a QoS parameter corresponding to the first QoS identifier, a mapping relationship between the first QoS identifier and the radio bearer of the UE, a mapping relationship between the first QoS identifier and the QoS flow of the UE, and a mapping relationship between the first QoS identifier and a second QoS identifier, where the second QoS identifier is used to identify a QoS granularity of the second link, and the first QoS identifier is used to identify a QoS granularity of the first link; and the configuration information of the second link includes the QoS information of the second link, and the QoS information of the second link includes at least one of the following information: the second QoS identifier, a QoS parameter corresponding to the second QoS identifier, a mapping relationship between the second QoS identifier and the radio bearer of the UE, a mapping relationship between the second QoS identifier and the QoS flow of the UE, and the mapping relationship between the first QoS identifier and the second QoS identifier.

In a possible implementation, when the first link is a second-type link and the second link is a first-type link, the configuration information of the first link includes at least one of the following information: an identifier of the UE, QoS configuration information of the UE, and QoS information of the first link, and the configuration information of the second link includes the QoS configuration information of the UE;

the first-type link includes a communications link established based on any one of an LTE system, an LTE-U system, NR, a UMTS system, and a GSM system, and the second-type link is a communications link established based on any one of a WLAN, Bluetooth, ZigBee, the Ethernet, a PPP, a PPPoE, an ATM, CDMA, and CDMA2000;

the QoS information of the first link includes at least one of the following information: a first QoS identifier, a QoS parameter corresponding to the first QoS identifier, a mapping relationship between the first QoS identifier and a radio bearer of the UE, and a mapping relationship between the first QoS identifier and a QoS flow of the UE, where the first QoS identifier is used to identify a QoS granularity of the first link; and the QoS configuration information of the UE includes at least one of the following information: an identifier of the radio bearer of the UE, a QoS parameter of the radio bearer of the UE, uplink endpoint information of a first connection transmission tunnel corresponding to a data radio bearer DRB of the UE, an identifier of the QoS flow of the UE, a QoS parameter of the QoS flow of the UE, and a mapping relationship between the radio bearer of the UE and the QoS flow of the UE.

In a possible implementation, when the first link is the second-type link, the processing module is specifically configured to:

receive the data packet sent by a core network device, and determine the identifier of the radio bearer, of the UE, corresponding to the data packet or the identifier of the QoS flow, of the UE, corresponding to the data packet, where the data packet includes the identifier of the UE;

determine the first QoS identifier corresponding to the data packet, based on the identifier of the radio bearer, of the UE, corresponding to the data packet and the mapping relationship between the first QoS identifier and the radio bearer of the UE; or determine the first QoS identifier corresponding to the data packet, based on the identifier of the QoS flow, of the UE, corresponding to the data packet and the mapping relationship between the first QoS identifier and the QoS flow of the UE, where a QoS parameter corresponding to the first QoS identifier corresponding to the data packet is the QoS parameter of the data packet; and before the sending, by the transmit module, the data packet based on the QoS parameter of the data packet, the processing module is further configured to: add, to the data packet, the first QoS identifier corresponding to the data packet.

A tenth aspect of this application provides a computer-readable storage medium. The computer-readable storage medium stores an instruction, and when the instruction is executed, a computer is enabled to perform the communication method provided in the first aspect of this application.

An eleventh aspect of this application provides a computer-readable storage medium. The computer-readable storage medium stores an instruction, and when the instruction is executed, a computer is enabled to perform the communication method provided in the second aspect of this application.

A twelfth aspect of this application provides a computer-readable storage medium. The computer-readable storage medium stores an instruction, and when the instruction is executed, a computer is enabled to perform the communication method provided in the third aspect of this application.

A thirteenth aspect of this application provides a computer program product. The computer program product includes an instruction, and when the instruction is executed, a computer is enabled to perform the communication method according to the first aspect of this application.

A fourteenth aspect of this application provides a computer program product. The computer program product includes an instruction, and when the instruction is executed, a computer is enabled to perform the communication method according to the second aspect of this application.

A fifteenth aspect of this application provides a computer program product. The computer program product includes an instruction, and when the instruction is executed, a computer is enabled to perform the communication method according to the third aspect of this application.

According to the communication method and the apparatus provided in this application, the UE establishes the connection to the home access gateway by using the CPE, the home access gateway sends the configuration information of the first link and the configuration information of the second link to the CPE, and sends the configuration information of the second link to the UE. The first link is a link between the CPE and the home access gateway, the second link is a link between the CPE and the UE, the configuration information of the first link is used to indicate the quality of service QoS information of the first link, and the configuration information of the second link is used to indicate the QoS information of the second link. The UE and the CPE ensure, based on respective configuration information, QoS of UE service data transmitted on the first link and the second link, and therefore can provide a QoS guarantee to the UE.

DESCRIPTION OF EMBODIMENTS

Figure 1:
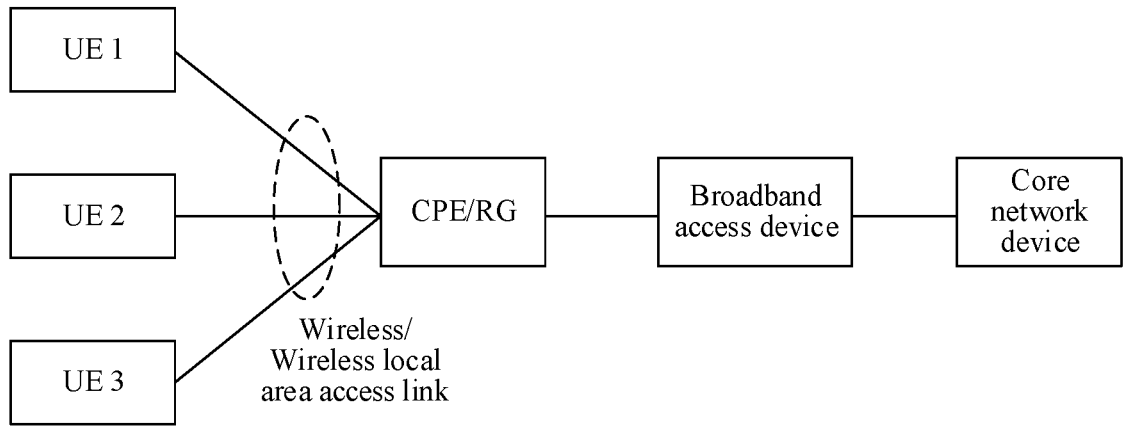
FIG. 1 is a schematic diagram of an existing home broadband access network.
Figure 2:
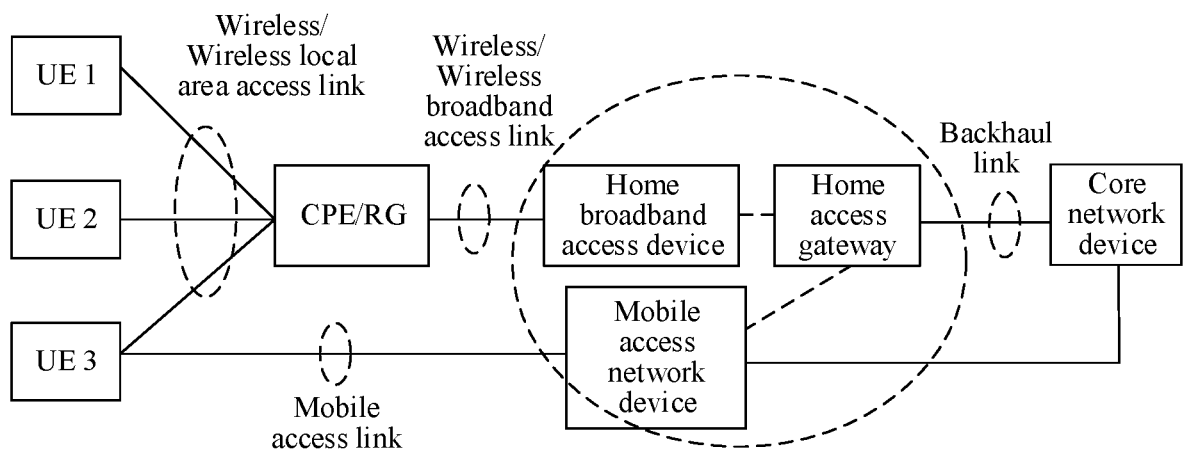
FIG. 2 is a schematic diagram of a network architecture to which this application is applicable.

This application provides a communication method of UE. FIG. 2 is a schematic diagram of a network architecture to which this application is applicable. As shown in FIG. 2, the network architecture includes a UE side, a (radio) access network ((R)AN), and a core network (CN). The UE side includes UE, CPE, or a home gateway (residential gateway, RG). The UE connects to the CPE/RG by using a wired access link (such as a wired LAN link) or a radio access link, for example, a link based on various technical protocols such as a wireless local area network WLAN, Bluetooth, and ZigBee, or an air interface link (including a Uu interface, a PC5 interface, or the like) in a standard such as NR or LTE in a radio access technology standard formulated by the 3rd generation partnership project (3GPP) organization. The CPE/RG may be an optical modem or a wireless router. It should be noted that the CPE/RG may be considered as a UE side device, or may be considered as an access network side device. That is, the CPE is considered as an access network device. For example, the CPE/RG is used as a home access point (hAP) or a relay node (RN) to provide an access service to a terminal device. In this application, for ease of description, the following mainly uses the CPE as an example for description.

The access network side includes a broadband access device, a mobile access network device, and a home access gateway (HA GW). The broadband access device includes a wired access network (AN) device and a mobile access network device. The wired access network device is, for example, a digital subscriber line access multiplexer (DSLAM). The mobile access network device may be an evolved NodeB (eNB), an AP, or a relay station in an LTE system, or may be a radio access network (RAN) device in a 5G mobile communications (5G) system. The RAN device in the 5G system may include a plurality of 5G-RAN nodes, and the 5G-RAN node may be an AP, a next-generation base station (including a new radio NodeB (NR NodeB, gNB), a new-generation evolved NodeB (NG-eNB), and a gNB in which a central unit (central unit) and a distributed unit (DU) are separated, which may be collectively referred to as a new-generation radio access network node (NG-RAN node)), a transmission receive point (TRP), a transmission point (TP), or another node. The 5G system is also referred to as a new wireless communications system, a new radio access technology, or a next-generation mobile communications system. Alternatively, the mobile access network device may be a base transceiver station (BTS) in a GSM system or a CDMA system, or a NodeB (NB) in a wideband code division multiple access (WCDMA) system. In the example shown in FIG. 2, there are two types of UEs in total.

One type of UE (for example, UE 1 and UE 2) is connected to the home broadband access device by using the CPE, where the CPE may be connected to the home broadband access device by using a wired broadband access link or a wireless broadband access link. The other type of UE (for example, UE 3) is directly connected to the mobile access network device. Both the home broadband access device and the mobile access network device may be connected to the home access gateway, and are connected to a core network device by using the home access gateway. Alternatively, the mobile access network device may be directly connected to the core network device.

The home access gateway is also referred to as a home access central unit (HA CU). The home access gateway provides a connection management service to the UE, and a link between the home access gateway and the core network device is referred to as a backhaul link. The home broadband access device may be connected to the home access gateway, or the home broadband access device and the home access gateway are a same physical device. Similarly, the mobile access network device may also establish a connection to the home access gateway, or the mobile access network device and the home access gateway are a same physical device.

Figure 3:
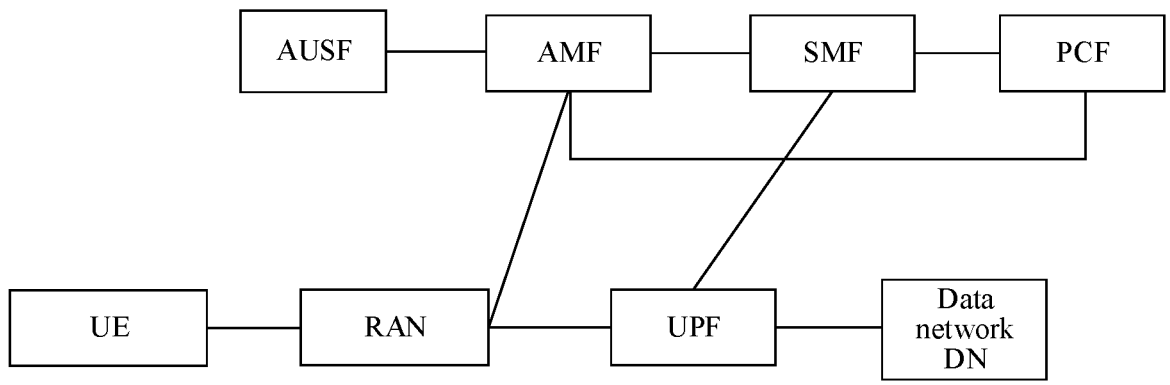
FIG. 3 is a schematic diagram of a 5G core network.

In this application, the core network may be a core network in an LTE system, that is, an evolved packet core (EPC) network, or may be a core network (5G core/new generation core, 5GC/NGC) in a 5G system. FIG. 3 is a schematic diagram of a 5G core network. The 5G core network includes a plurality of functional units such as an access and mobility management function (AMF), a session management function (SMF), a user plane function (UPF), an authentication server function (AUSF), and a policy control function (PCF).

The AMF is mainly responsible for services such as mobility management, and access management. The SMF is mainly responsible for session management, UE address management and assignment, a dynamic host configuration protocol function, selection and control of a user plane function, and the like. The UPF is mainly responsible for functions related to external connection to a data network (DN), user plane data packet routing and forwarding, packet filtering, quality of service (QoS) control, and the like. The AUSF is mainly responsible for a function of performing authentication on a terminal device, and the like. The PCF is mainly responsible for providing a unified policy framework for network behavior management, providing a policy rule of a control plane function, obtaining registration information related to a policy decision, and the like. It should be noted that these functional units may work independently, or may be combined together to implement some control functions, for example, access control and mobility management functions such as access authentication, security encryption, and location registration for the terminal device, and session management functions such as establishment, release, and change of a user plane transmission path.

The functional units in the 5GC may communicate with each other by using a next-generation (NG) network interface. For example, the UE may transmit a control plane message to the AMF by using an NG interface 1 (N1 for short), a RAN device may establish a user plane data transmission channel to the UPF by using an NG interface 3 (N3 for short), an AN/RAN device may establish a control plane signaling connection to the AMF by using an NG interface 2 (N2 for short), the UPF may exchange information with the SMF by using an NG interface 4 (N4 for short), the UPF may exchange user plane data with a data network DN by using an NG interface 6 (N6 for short), the AMF may exchange information with the SMF by using an NG interface 11 (N11 for short), the SMF may exchange information with the PCF by using an NG interface 7 (N7 for short), and the AMF may exchange information with the AUSF by using an NG interface 12 (N12 for short). It should be noted that FIG. 3 is merely an example of an architectural diagram. In addition to the functional units shown in FIG. 3, the network architecture may further include another functional unit. For example, the core network device may further include a unified data management (UDM) function, or the like. This is not limited in this application.

When a method in this application is applied to an LTE system, the core network is an evolved packet core network EPC, and includes: a mobility management entity (MME), a packet data network gateway (P-GW), a serving gateway (S-GW), a home network server (HSS), and the like. The HSS is configured to store user subscription information, including user service information, authentication information, location management information, and the like. The MME is responsible for function such as terminal access control, mobility management, session management, and network element selection (such as S-GW/P-GW selection). The SGW is a mobility anchor for handover between eNBs, and is responsible for functions such as routing and forwarding of user plane data. The PGW is responsible for functions such as IP address assignment, packet data filtering, rate control, charging rule execution, and lawful interception.

The UE mentioned in this application may be a mobile phone or a computer, or may be a cellular phone, a cordless phone, a session initiation protocol (SIP) phone, a smartphone, a wireless local loop (WLL) station, a personal digital assistant (PDA), a computer, a laptop computer, a handheld communications device, a handheld computing device, a satellite wireless device, a wireless modem card, a set top box (STB), a vehicle-mounted device, a wearable device, a smart household device, another device configured to perform communication in a wireless system, or the like.

Figure 4:
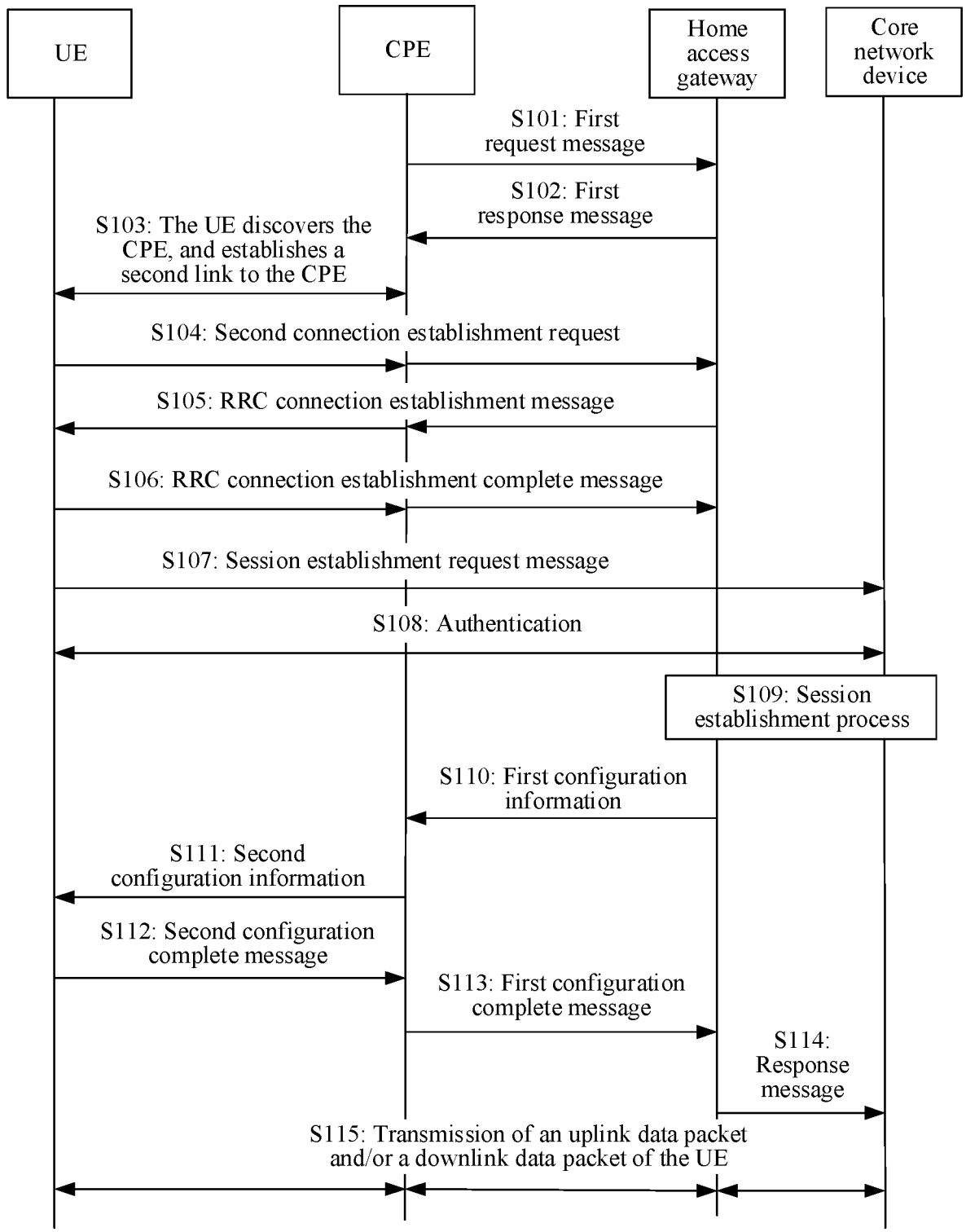
FIG. 4 is a signaling flowchart of a communications method according to Embodiment 1 of this application.

Different from a network architecture in the prior art, in this application, the home access gateway is added to the access network. Therefore, a procedure in which the UE accesses a network by using the access network (also referred to as a home broadband network) is different from that in the prior art. FIG. 4 is a signaling flowchart of a communications method according to Embodiment 1 of this application. As shown in FIG. 4, the method provided in this embodiment includes the following steps.

Step S101: CPE sends a first request message to a home access gateway.

The first request message is used to request to establish a first connection, and the first connection is a connection between the CPE and the home access gateway. The first connection between the CPE and the home access gateway is a logical connection carried on a first link, and the first connection is, for example, an F1 connection, an F1-like connection, or an F1' connection, or may have another name. The first connection may be used to perform configuration management on the CPE and a cell served by the CPE, and perform management on context information of a terminal device served by the CPE. Alternatively, the first connection may be an RRC connection between the CPE and the home access gateway. In this embodiment of this application, an example in which the first connection is an F1 connection is mainly used for description, but a type and a specific naming manner of the first connection are not limited.

The first request message includes an identifier of the CPE. One home access gateway may manage a plurality of CPEs. The identifier of the CPE is added to the first request message to notify the home access gateway of the CPE that requests to establish the connection. Optionally, the first request message further includes information about the cell served by the CPE.

In this application, the CPE refers to a device that is connected to an AN/RAN device by using a wired/wireless link and that provides an access link for UE to enable the UE to access a network by using the CPE. The CPE in this application may be customer premises equipment or a home gateway in wired broadband access, and may be considered as UE (for a network side), or may be considered as a network device, for example, a home access point or a relay node (RN). For example, when the CPE is a wireless RN, the RN is connected to a network device 1 (which is a parent node of the relay and may be another RN or a donor gNodeB Donor gNB) by using wireless backhaul, and provides a network access service for the UE by using a wireless access link.

Optionally, the identifier of the CPE may include but is not limited to an Internet Protocol (IP) address, a medium access control (MAC) address, a link layer identifier (Link Layer ID), a cell radio network temporary identifier (C-RNTI), an international mobile subscriber identity (IMSI), an international mobile station equipment identity (IMEI), a temporary mobile subscriber identity (TMSI), a cell radio network temporary identifier (a C-RNTI), a Prose UE ID, a UE identifier (for example, an AMF UE NGAP ID, a gNB UE NGAP ID, an eNB UE S1AP ID, an MME UE S1AP ID, a gNB-DU UE F1AP ID, or a gNB-CU UE F1AP ID) allocated by the RAN device or the core network device to the CPE on a specific interface (for example, an N2 interface between a gNB and an AMF, an S1 interface between an eNB and an MME, or an F1 interface between a gNB-DU and a gNB-CU), a readable CPE name that is manually set, or the like. This is not limited in this application.

Optionally, the information about the cell served by the CPE may include at least one of the following information: an identifier of the cell served by the CPE, tracking area information (including a tracking area code (TAC), a tracking area identity (TAI), and the like), information about a PLMN, information about an antenna port, and configuration information of a physical random access channel (PRACH), system information of the cell served by the CPE, and the like.

The identifier of the cell served by the CPE may be an identifier in a WLAN, for example, a basic service set identifier (BSSID), a service set identifier (SSID), or a homogenous extended service set identifier (HESSID). The identifier of the cell served by the CPE may alternatively be a common cell identifier in a mobile network, for example, an evolved universal mobile telecommunications system terrestrial radio access network cell global identifier (ECGI), a physical cell identifier (PCI), or a new radio cell global identifier (NCGI), a locally unique (local) cell identifier (cell ID), or the like. A form of the cell identifier is not limited in this application.

Optionally, before sending the first request message to the home access gateway, the CPE needs to obtain a transmission address (for example, an IP address of the home access gateway) of the home access gateway in advance. An obtaining manner may be preconfigured in the CPE, or may be included in a UE policy and is sent by a PCF to the CPE by using the AMF and the AN/RAN device. In a possible manner, the transmission address of the home access gateway that is obtained by the CPE in advance is an address of a default home access gateway. After receiving the first request message of the CPE, the default home access gateway may select a more proper home access gateway (for example, select a home access gateway closer to the CPE based on location information of CPEs), and then send an address of the selected home access gateway to the CPE. Then, the CPE performs step S101 to send a first request message to the more appropriate home access gateway.

In this embodiment of this application, the first link is a link between the CPE and the home access gateway, and a second link is a link between the UE and the CPE. The first link is also referred to as a backhaul link (BL), and the second link is also referred to as an access link (AL). In this application, the first link and the backhaul link may be interchanged, and the second link and the access link may also be interchanged.

Optionally, the first link is a first-type link or a second-type link, and the second link may also be the first-type link or the second-type link. The first-type link is a link based on 3GPP connection, or is referred to as a 3GPP standard link (which is referred to as a "3GPP link" for short below). The second-type link is a link based on non-3GPP connection, and is referred to as a non-3GPP standard link (which is referred to as a "non-3GPP link" for short below). The link based on the 3GPP connection is an air interface link in a radio access technology (RAT) corresponding to a mobile communication standard formulated by the 3GPP organization, for example, an air interface link in a communications technology such as LTE, LTE-U, NR, UMTS, or GSM. Alternatively, the link based on the 3GPP connection may be a PC5 interface link corresponding to device-to-device communication. The link based on the non-3GPP connection is a communications link in an access technology corresponding to another communication standard other than the foregoing air interface link in the RAT corresponding to the mobile communication standard formulated by the 3GPP organization, for example, a wireless or wired communications link in a standard such as a WLAN, Bluetooth, ZigBee, the Ethernet, a PPP, a PPPoE, an ATM, CDMA, or CDMA2000.

Optionally, a manner for triggering the CPE to establish the first connection to the home access gateway may include the following several manners:

(1) The CPE sends the first request message to the home access gateway based on first configuration information obtained in advance, where the first configuration information is used to trigger establishment of the first connection. The first configuration information may be included in the UE policy sent to the CPE and is sent by the PCF to the CPE by using the AMF, or is carried in configuration information sent by a management server (for example, a TR-069 server) of the CPE to the CPE, or is statically configured in the CPE.

(2) The CPE sends the first request message to the home access gateway when receiving, over the second link, information that is sent by the UE and that indicates that the UE has a requirement for connecting to the home access gateway. The information indicating that the UE has a requirement for connecting to the home access gateway is, for example, that a type of the UE is a mobile network terminal. It should be noted that a sequence of establishing the first connection and the second link is not limited in this application. The first connection may be established after the second link is established, or may be established before the second link is established. Therefore, for example, the UE may send, to the CPE in a process of establishing the second link to the CPE or after the second link is established, the information indicating the type of the UE. The CPE determines, based on the type of the UE, whether to establish the first connection.

(3) The CPE sends the first request message to the home access gateway when the CPE receives a specific tagged packet sent by the UE. For example, when the UE sends an RRC connection request message to the network, the UE adds a specific tag to a packet sent to the CPE. When receiving the packet including the specific tag for the first time, the CPE sends the first request message to the home access gateway.

Step S102: The home access gateway sends a first response message to the CPE, where the first response message includes an identifier of the home access gateway and identifier information of a cell needing to be activated.

The cell needing to be activated is a cell served by the CPE. A list of cells served by the CPE may be sent by the CPE to the home access gateway by using the first request message, or may be preconfigured in the home access gateway. The cell needing to be activated is a subset of the cells served by the CPE. If the list of the cells served by the CPE is preconfigured in the home access gateway, after receiving the first request message, the home access gateway finds, based on the identifier of the CPE that is included in the first request message, information about the cells served by the CPE, and then determines an identifier of the cell needing to be activated.

Step S103: The UE discovers the CPE and establishes the second link to the CPE.

For example, the CPE sends a discovery signal to the UE, and the discovery signal is used by the UE to discover the CPE. A manner in which the CPE sends the discovery signal depends on a connection manner between the CPE and the UE. For example, when the CPE serves the UE by using an access technology of a 3GPP standard (for example, LTE, NR, LTE-U, or NR-U, where "-U" indicates that an unlicensed spectrum is used), the CPE sends a system broadcast message, and the UE discovers, by receiving the system broadcast message, the cells served by the CPE. When the CPE serves the UE by using an access technology of a non-3GPP standard, for example, when a WLAN connection is established between the CPE and the UE, the CPE sends a beaconmessage, and the UE discovers, by receiving the beacon message, the cells served by the CPE. Alternatively, when a device to device (D2D) link (sidelink) is established between the CPE and the UE, the CPE may send a discover signal (model A) or a solicitation signal (model B), so that the CPE and the UE discover each other. Specifically, for a specific discovery process and a specific connection establishment process related to access technologies of various standards, refer to the prior art. For example, if the link between the UE and the CPE is a 3GPP link, the UE initiates random access to establish a connection to the CPE. For a process in which the UE establishes the non-3GPP link to the CPE, refer to the prior art.

Optionally, in this application, the discovery signal sent by the CPE includes first indication information, and the first indication information is used to indicate that the CPE supports providing the UE with a connection to a first-type network, and supports providing the UE with functions such as mobility management and QoS management in the first-type network, so that the UE preferably accesses the network by using the CPE. The first-type network is, for example, an access network RAN and/or a core network (for example, EPC/5GC) of the 3GPP standard, and a network of the 3GPP standard includes any one of an LTE system, an LTE-U system, NR, a UMTS system, and a GSM system.

It should be noted that the process in which the UE discovers the CPE may include a plurality messages. FIG. 4 is only a schematic diagram, and does not indicate that the discovery process and the establishment process of the second link include only one message. The first indication information may alternatively be configured in the UE, for example, statically configured in a SIM card of the UE, or is sent by a specific server to the UE by using configuration information.

Step S104: The UE sends a second connection establishment request to the home access gateway.

The UE sends the second connection establishment request to the home access gateway by using the CPE, the second connection establishment request is used to request to establish a second connection, the second connection is a connection between the UE and the home access gateway, and the second connection is a logical connection carried on the first link and the second link. For example, the second connection establishment request is an RRC connection establishment request. The UE first sends the RRC connection establishment request to the CPE, and then the CPE sends, to the home access gateway, an RRC message transfer message that includes the RRC connection establishment request of the UE, where the RRC connection establishment request may be carried in the RRC message transfer message by using an RRC message container. Optionally, the RRC message transfer message is a first connection application message (for example, when the first connection is named as an F1 connection, the first connection application message is an F1AP message), and a specific type of the RRC message transfer message may be an initial uplink RRC message transfer message.

The initial uplink RRC message transfer message (that is, the RRC message transfer message including the RRC connection request of the UE) sent by the CPE to the home access gateway may include the RRC connection establishment request of the UE, and may further include the following identifier of the UE and/or an identifier of a cell in which the UE is located.

The identifier of the UE includes: an identifier of the UE on the first connection between the CPE and the home access gateway, and an identifier of the UE in the cell. The identifier of the UE on the first connection between the CPE and the home access gateway includes at least one of the following: an identifier 1 of the UE on the first connection between the CPE and the home access gateway, that is, a CPE UE F1AP ID (which is allocated by the CPE to the UE and is used to uniquely identify the UE in UEs served by the CPE, or which may also be referred to as a home AP/DU UE F1AP ID), and an identifier 2 of the UE on the first connection between the CPE and the HA GW, that is, an HA GW UE F1AP ID (which is allocated by the HA GW to the UE, and is used to uniquely identify the UE in UEs served by the HA GW, or which may also be referred to as a home-CU UE F1AP ID). For example, in this step, the identifier of the UE that is included in the RRC message transfer message that is sent by the CPE to the home access gateway and that includes the RRC connection request of the UE may be the CPE UE F1AP ID.

The identifier of the UE in the cell may include but is not limited to at least one of the following: a C-RNTI, a MAC address, an IP address, a physical interface identifier (for example, the CPE is connected to the UE by using a wired interface), a virtual local access network (VLAN) ID (if different VLANs are demarcated), and the like of the UE.

For content of an identifier of the cell in which the UE is located, refer to the descriptions of "the identifier of the cell served by the CPE" in step S101. Details are not described again.

It should be noted that if the link between the UE and the CPE is a non-3GPP link, a data packet sent by the UE to the CPE needs to carry second indication information, where the second indication information is used to indicate that content in the data packet is control plane signaling or user plane data, or the second indication information is used to indicate an identifier of a radio bearer corresponding to the data packet. For example, before performing link layer encapsulation on the data packet, the UE adds the second indication information to the data packet. This is because in the non-3GPP link, there is no concept of a bearer or a logical channel. Therefore, the CPE cannot distinguish, by using a radio bearer or a logical channel that carries the data packet, whether the content of the data packet is control plane signaling or user plane data. The CPE processes the user plane data and the control plane signaling of the UE at different protocol layers. To enable the CPE to deliver the data packet of the UE to a proper protocol layer for processing, the second indication information needs to be carried to distinguish between the two types of data packets. Optionally, the second indication information is added at a newly added adaptation protocol layer on an interface between the UE and the CPE, or added at any existing protocol layer on the interface between the UE and the CPE.

Specifically, the second indication information may be a data type field. When a value of the data type field is a specific value or a group of specific values, it indicates that the content of the data packet is control plane signaling; or when a value of the data type field is another specific value or another group of specific values, it indicates that the content of the data packet is user plane data. Alternatively, the second indication information may be a signaling radio bearer (SRB) identifier (ID) or a data radio bearer (DRB) ID of the UE.

Similarly, the data packet sent by the CPE to the HA GW may also include the second indication information, so that the HA GW delivers the data packet of the UE to a proper protocol layer for processing.

When the first connection between the CPE and the HA GW is the F1 connection, optionally, the data packet that is sent by the CPE to the HA GW and that includes the first connection application message may further include third indication information. The third indication information is used to indicate that the data packet is control plane signaling or user plane data, and further, indicate that the content of the control plane data packet is an RRC message of the CPE or an F1 connection application message.

When the first connection between the CPE and the HA GW is the F1 connection, the data packet that is sent by the CPE to the HA GW and that includes the first connection application message may include only the third indication message, and does not include the second indication message.

Step S105: The home access gateway sends an RRC connection establishment message to the UE.

The home access gateway needs to send the RRC connection establishment message to the UE by using the CPE. For example, the home access gateway first sends a first connection application message (for example, an F1AP message) to the CPE, where the first connection application message includes the RRC connection establishment message, and the identifier and the SRB ID of the UE. A type of the first connection application message is, for example, a downlink RRC message transfer (DL RRC message transfer) message.

Content of the identifier of the UE may be understood with reference to corresponding descriptions in step S104.

Optionally, the first connection application message further includes at least one of the following information: the identifier of the cell in which the UE is located and indication information used to indicate that a type of the message is an RRC message. After receiving the first connection application message, the CPE may send, by using an SRB identified by the SRB ID, the RRC connection establishment message in the first connection application message to the UE corresponding to the identifier of the UE. If the second link between the CPE and the UE is a non-3GPP link, the CPE needs to add second indication information before performing link layer encapsulation on the RRC connection establishment message sent to the UE. In this step, in the F1AP message sent by the home access gateway to the CPE, the identifier of the UE may be the HA GW UE F1AP ID. For specific descriptions of the second indication information and the identifier of the cell in which the UE is located in this step, refer to related descriptions in step S104. Details are not described herein again.

Optionally, the first connection application message sent by the home access gateway to the CPE includes an RRC message container, and the RRC connection establishment message is carried in the RRC message container.

Step S106: The UE sends an RRC connection establishment complete message to the home access gateway.

Optionally, the RRC connection establishment complete message is first sent by the UE to the CPE, and then the CPE adds the RRC connection establishment complete message to a first connection application message and sends the first connection application message to the home access gateway. A type of the first connection application message may be, for example, an uplink RRC message transfer (UL RRC message transfer) message.

The first connection application message includes the identifier of the UE, the RRC connection establishment complete message, and the SRB ID. Optionally, the first connection application message may further include the identifier of the cell in which the UE is located and/or indication information used to indicate that a type of the message is an uplink RRC message.

After the home access gateway receives the RRC connection establishment complete message of the UE, it means that establishment of an RRC connection between the home access gateway and the UE is completed. Then, uplink and downlink RRC messages can be sent between the home access gateway and the UE by using the CPE.

For the uplink RRC message of the UE, if the non-3GPP standard connection is used between the UE and the CPE, the UE may add the second indication information to a packet in which the RRC message is encapsulated, for example, add the second indication information to an adaptation layer packet header. The CPE reads the second indication information, and learns that a type of the message is an RRC message of the UE, or further learns an ID of an SRB that carries the RRC message; or if the link between the CPE and the UE is the 3GPP link, logical channels between the UE and the CPE are in a one-to-one correspondence with radio bearers of the UE, and the radio bearers include an SRB and a DRB. The CPE may determine, based on a logical channel on which the RRC message is received, that the received message is the RRC message and a corresponding SRB ID. Then, the CPE may add the uplink RRC message of the UE to a first connection application message and send the first connection application message to the HA GW. When the first connection between the CPE and the HA GW is an F1 connection, optionally, a data packet that is sent by the CPE to the HA GW and that includes the first connection application message may further include the third indication information. The third indication information is used to indicate that the data packet is control plane signaling or user plane data, and further, indicate that content of the data packet is an RRC message of the CPE or an F1 connection application message. When the first connection between the CPE and the HA GW is an F1 connection, the data packet that is sent by the CPE to the HA GW and that includes the first connection application message may include only the third indication message, and does not include the second indication message.

For a downlink RRC message generated by the HA GW and sent to the UE, the HA GW adds the downlink RRC message to a first connection application message and sends the first connection application message to the CPE. After receiving the first connection application message, the CPE sends the RRC message included in the first connection application message to the UE. Optionally, if the first connection application message includes the SRB ID, the CPE may send the RRC message to the UE by using the SRB indicated by the SRB ID, or send the RRC message to the UE by using the logical channel corresponding to the SRB. If the link between the CPE and the UE is a non-3GPP link, the CPE adds the second indication information to a data packet that is sent to the UE and that includes the downlink RRC message, to indicate that a type of the message is the RRC message sent to the UE, and may further indicate the SRB ID corresponding to the message. The second indication information may be added in a processing process at a newly added adaptation layer on the interface between the UE and the CPE (for example, added to an adaptation layer packet header), or may be added in a processing process at any existing protocol layer (for example, added to a packet header corresponding to the existing protocol layer). When the first connection between the CPE and the HA GW is the F1 connection, optionally, the data packet that is sent by the HA GW to the CPE and that includes the first connection application message may further include third indication information. The third indication information is used to indicate that the data packet is control plane signaling or user plane data, and further, indicate that content of the data packet is an RRC message of the CPE or an F1 connection application message. When the first connection between the CPE and the HA GW is the F1 connection, the data packet that is sent by the HA GW to the CPE and that includes the first connection application message may include only the third indication message, and does not include the second indication message.

Step S107: The home access gateway sends a second request message to a core network element.

The second request message may include a session establishment request message of the UE. The session establishment request message is used to request to establish a packet data unit (PDU) session. The session establishment request message may be a non-access stratum (NAS) message, the UE adds the session establishment request message to an uplink RRC message, and sends the uplink RRC message to the home access gateway by using the CPE. The home access gateway sends the session establishment request message to the core network element (for example, the AMF). Optionally, the second request message may further include a registration request of the UE, and the registration request is used to initiate registration to the network. The second request message may be an NGAP message, for example, initial UE message or another type of NGAP message.

Step 108: Authentication is performed between the UE and the network.

Authentication may be performed between the UE and a core network element such as an AUSF or a UDM, to complete a registration process, or the UE may interact with a device (such as an AAA server) that has an authentication function in a data network (DN) to complete authentication. There are a plurality pieces of signaling exchanged in the authentication process. For the authentication process, refer to the prior art. Details are not described herein. In the authentication process, the CPE and the home access gateway serve as intermediate transmission points to transmit messages involved in the authentication process.

Step S109: A session establishment process.

After receiving the session establishment request message of the UE, the AMF interacts with another core network element (such as a PCF, a UPF, or the UDM) to complete establishment of the PDU session. In a session establishment process, the home access gateway receives an initial context establishment message sent by the AMF, and the initial context establishment message includes context information of the UE. For example, the initial context establishment message includes at least one of the following information: N2 interface session management information corresponding to the PDU session of the UE, and a NAS message sent to the UE. The N2 interface session management information corresponding to the PDU session of the UE includes CN tunnel info, configuration information (such as QoS profiles and a QoS flow identifier) corresponding to a QoS flow, a PDU session ID, and the like. The NAS message sent to the UE is added by the home access gateway to a downlink RRC message sent to the UE, and then the NAS message is sent to the UE by using the CPE. For a specific session establishment process, refer to the prior art. Details are not described herein.

Step S110: The home access gateway sends first configuration information to the CPE.

The first configuration information may include configuration information of the first link, configuration information of the second link, and the like. Optionally, the first configuration information may further include an RRC message sent by the home access gateway to the UE. The configuration information of the first link is used to indicate QoS information of the first link, and the configuration information of the second link is used to indicate QoS information of the second link.

The QoS information of the first link is used to ensure QoS of a service data packet or a service flow transmitted on the first link, the QoS information of the second link is used to ensure QoS of a service data packet or a service flow transmitted on the second link, and the QoS is used to ensure a service transmission requirement and ensure efficient network operation. In this embodiment, the configuration information of the first link and the configuration information of the second link are related to types of the first link and the second link, and are specifically as follows:

(1) When the first link is a 3GPP link (the first-type link), and the second link is a non-3GPP link (the second-type link), the configuration information of the first link includes at least one of the following information: the identifier of the UE, QoS configuration information of the UE, and QoS configuration information of the CPE; and the configuration information of the second link includes QoS information of the second link.

The QoS configuration information of the UE includes at least one of the following information: an identifier of a radio bearer of the UE, a QoS parameter of the radio bearer of the UE, uplink endpoint information of a first connection transmission tunnel corresponding to a DRB of the UE, an identifier of a QoS flow of the UE, a QoS parameter of the QoS flow of the UE, or a mapping relationship between the radio bearer and the QoS flow of the UE. In this application, the first connection transmission tunnel may be, for example, a GTP tunneling protocol (GPRS tunneling protocol)-based transmission tunnel carried on the first connection, and the uplink endpoint information of the first connection transmission tunnel corresponding to the DRB of the UE includes at least one of the following: a transport layer address (for example, an IP address) of the HA GW that serves as an uplink endpoint of the first connection transmission tunnel, and a tunnel endpoint identifier (TEID) allocated by the HA GW to the first connection transmission tunnel corresponding to the DRB of the UE. In this application, the QoS parameter of the radio bearer may be a QoS parameter of the DRB, and the QoS parameter of the radio bearer may include, for example, a QCI (QoS class identifier, QoS class identifier), an ARP (allocation and retention priority, allocation and retention priority), an MBR (maximum bit rate, maximum bit rate), a GBR (Guaranteed bit rate, guaranteed bit rate), and other parameters. The QoS parameter of the QoS flow may include, for example, a 5QI (5G QoS identifier), an ARP, a GFBR (guaranteed flow bit rate), an MFBR (maximum flow bit rate), and other parameters. For specific parameter content included in the QoS parameter of the radio bearer and the QoS parameter of the QoS flow, refer to the prior art. This is not limited in this application.

The QoS configuration information of the CPE includes at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the QoS flow of the CPE and the radio bearer of the UE, and a mapping relationship between the QoS flow of the UE and the radio bearer of the CPE.

The QoS information of the second link includes a second QoS identifier and a QoS parameter corresponding to the second QoS identifier, and the second QoS identifier is used to identify a QoS granularity of the second link. Optionally, the QoS information of the second link further includes at least one of the following information: a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE.

In this application, the radio bearer includes a signaling radio bearer SRB and a data radio bearer DRB. In a next-generation mobile communications system (5G), a flow-based quality of service (QoS) architecture is proposed. The QoS flow is a specific granularity of QoS differentiation in a PDU session, different QoS flows may correspond to different QoS parameter requirements, and data packets mapped to a same QoS flow are processed based on a same QoS requirement. A downlink data packet is mapped to a QoS flow at the core network element UPF, and an uplink data packet is mapped to a QoS flow at the UE. The QoS flows may be identified by using QoS flow identifiers. In the mapping relationship between a radio bearer and a QoS flow of the UE, one QoS flow may be mapped to one or more radio bearers, and one radio bearer may carry a plurality of different QoS flows.

(2) When the first link and the second link each are a non-3GPP link (the second-type link), the configuration information of the first link includes at least one of the following information: the identifier of the UE, QoS configuration information of the UE, and QoS information of the first link.

The QoS configuration information of the UE includes at least one of the following information: an identifier of a radio bearer of the UE, a QoS parameter of the radio bearer of the UE, uplink endpoint information of a first connection transmission tunnel corresponding to a DRB of the UE, an identifier of a QoS flow of the UE, a QoS parameter of the QoS flow of the UE, and a mapping relationship between the radio bearer and the QoS flow of the UE.

The QoS information of the first link includes a first QoS identifier and a QoS parameter corresponding to the first QoS identifier, and the first QoS identifier is used to identify a QoS granularity of the first link. Optionally, the QoS information of the first link further includes at least one of the following information: a mapping relationship between the first QoS identifier and the radio bearer of the UE, a mapping relationship between the first QoS identifier and the QoS flow of the UE, and a mapping relationship between the first QoS identifier and the second QoS identifier.

The configuration information of the second link includes QoS information of the second link, and the QoS information of the second link includes a second QoS identifier and a QoS parameter corresponding to the second QoS identifier. Optionally, the QoS information of the second link further includes at least one of the following information: a mapping relationship between the second QoS identifier and the radio bearer of the UE, a mapping relationship between the second QoS identifier and the QoS flow of the UE, and the mapping relationship between the first QoS identifier and the second QoS identifier.

(3) When the first link and the second link each are a 3GPP link (the first-type link), the configuration information of the first link includes at least one of the following information: the identifier of the UE, QoS configuration information of the UE, and QoS configuration information of the CPE; and the configuration information of the second link includes the identifier of the UE and the QoS configuration information of the UE.

The QoS configuration information of the UE includes at least one of the following information: an identifier of a radio bearer of the UE, a QoS parameter of the radio bearer of the UE, uplink endpoint information of a first connection transmission tunnel corresponding to a DRB of the UE, an identifier of a QoS flow of the UE, a QoS parameter corresponding to the QoS flow of the UE, and a mapping relationship between the radio bearer of the UE and the QoS flow of the UE.

The QoS configuration information of the CPE includes at least one of the following information: an identifier of a radio bearer of the CPE, a QoS parameter of the radio bearer of the CPE, an identifier of a QoS flow of the CPE, a QoS parameter corresponding to the QoS flow of the CPE, a mapping relationship between the QoS flow of the CPE and the radio bearer of the CPE, a mapping relationship between the radio bearer of the CPE and the radio bearer of the UE, a mapping relationship between the radio bearer of the CPE and the QoS flow of the UE, and a mapping relationship between the QoS flow of the CPE and the radio bearer of the UE.

(4) When the first link is a non-3GPP link (the second-type link), and the second link is a 3GPP link (the first-type link), the configuration information of the first link includes at least one of the following information: the identifier of the UE, QoS configuration information of the UE, and QoS information of the first link; and the configuration information of the second link includes the QoS configuration information of the UE.

The QoS information of the first link includes at least one of the following information: a first QoS identifier, a QoS parameter corresponding to the first QoS identifier, a mapping relationship between the first QoS identifier and a radio bearer of the UE, and a mapping relationship between the first QoS identifier and a QoS flow of the UE.

The QoS configuration information of the UE includes at least one of the following information: an identifier of the radio bearer of the UE, a QoS parameter of the radio bearer of the UE, uplink endpoint information of a first connection transmission tunnel corresponding to a DRB of the UE, an identifier of the QoS flow of the UE, a QoS parameter of the QoS flow of the UE, a mapping relationship between the radio bearer of the UE and the QoS flow of the UE.

For example, the first QoS identifier and the second QoS identifier each may be, for example, at least one of the following: a PCP (payload compression protocol) field of a VLAN label, a VLAN ID, and an EtherType (Ethernet type), a DSCP (differentiated services code point), an IP precedence, an AC (access category) in a WLAN, and an EXP field in MPLS (multi-protocol label switching), IP 5-tuple information (a protocol type, a source IP address, a destination IP address, a source port number, a destination port number), source or destination MAC address information, or another additional label that can be used to indicate a QoS requirement. Optionally, the first QoS identifier may include a group of QoS identifiers, and the second QoS identifier includes a group of QoS identifiers.

It should be noted that, in the foregoing four different cases, if content of the configuration information of the first link and content of the configuration information of the second link have a same part, only one copy of content of the same part needs to be retained in the first configuration information sent by the home access gateway to the CPE, and does not need to be retained repeatedly.

Step S111: The CPE sends second configuration information to the UE.

Optionally, the second configuration information sent by the CPE to the UE is an RRC message, and the RRC message is an RRC message that is included in a first connection application message received by the CPE from the home access gateway and that is sent to the UE. In another optional manner, the CPE may generate the second configuration information based on a part or all of content of the first configuration information received in the previous step. The second configuration information includes the configuration information of the second link. For content related to the configuration information of the second link, refer to the descriptions in step S110.

Step S112: The UE sends a second configuration complete message to the CPE.

The second configuration complete message is used to indicate that configuration on the terminal side is completed.

Step S113: The CPE sends a first configuration complete message to the home access gateway.

The first configuration complete message is used to notify the home access gateway that configuration on the access network (R)AN side is completed. Optionally, the first configuration complete message carries downlink tunnel endpoint information that is of the first connection transmission tunnel allocated by the CPE and that corresponds to the DRB of the UE. In this application, the downlink endpoint information of the first connection transmission tunnel corresponding to the DRB of the UE includes at least one of the following: a transport layer address of the CPE that serves as a downlink endpoint of the first connection transmission tunnel (for example, an IP address of the CPE), and a TEID allocated by the CPE to the first connection transmission tunnel corresponding to the DRB of the UE.

Step S114: The home access gateway sends a response message to the core network element, to acknowledge that the context information of the UE is established/modified.

Step S115: Transmit an uplink service data packet and/or a downlink service data packet of the UE.

In this embodiment, a path between the UE and the home access gateway includes two segments of connections: the first link and the second link. QoS on either of the first link or the second link needs to be ensured. Specifically, in a process of transmitting the uplink data packet of the UE, the UE ensures the QoS, of the uplink data packet of the UE, on the second link based on the configuration information of the second link, and the CPE ensures the QoS, of the uplink data packet of the UE, on the first link based on the configuration information of the first link and/or the configuration information of the second link. In a process of transmitting the downlink data packet of the UE, the home access gateway ensures QoS, of the downlink data packet of the UE, on the first link based on the configuration information of the first link, and the CPE ensures QoS of the downlink data packet of the UE on the second link based on the configuration information of the first link and/or the configuration information of the second link.

In this embodiment, the UE establishes the connection to the home access gateway by using the CPE, the link between the CPE and the home access gateway is the first link, and the link between the CPE and the UE is the second link. The home access gateway sends the configuration information of the first link and the configuration information of the second link to the CPE, and the CPE sends the configuration information of the second link to the UE. The configuration information of the first link is used to indicate the QoS information of the first link, and the configuration information of the second link is used to indicate the QoS information of the second link. The UE and the CPE ensure, based on respective configuration information, QoS of UE service data transmitted on the first link and the second link, and therefore can provide a QoS guarantee for service transmission of the UE.

Based on Embodiment 1, Embodiment 2 of this application mainly describes step S115 in Embodiment 1. The following separately describes transmission methods of an uplink service and a downlink service on a user plane of the UE in different scenarios. It should be noted that the solutions of Embodiment 2 may be based on the procedure of Embodiment 1, or may be independent of the procedure of Embodiment 1. In other words, the method in Embodiment 2 of this application may not depend on establishment processes of the first link and the second link in Embodiment 1, and configuration processes of the configuration information of the first link and the configuration information of the second link. In other words, regardless of how the link between the UE and the CPE and the link between the CPE and the home access gateway are established, and regardless of a manner in which the home access gateway sends the configuration information of the first link and the configuration information of the second link to the UE and the CPE, the method in Embodiment 2 of this application may be used to ensure QoS on the first link and the second link.

In a first scenario, the first link is a first-type link, and a second link is a second-type link.

QoS, of uplink data of the UE, on the second link is ensured in the following manner: The UE determines the second QoS identifier corresponding to the data packet, based on the radio bearer, of the UE, corresponding to the data packet and the mapping relationship between the second QoS identifier and the radio bearer of the UE. Alternatively, the UE determines the second QoS identifier corresponding to the data packet, based on the QoS flow corresponding to the data packet and the mapping relationship between the second QoS identifier and the QoS flow of the UE. A QoS parameter corresponding to the second QoS identifier is a QoS parameter of the data packet. The UE sends, based on the QoS parameter of the data packet, the data packet to the CPE over the second link, to ensure the QoS, of the uplink data of the UE, on the second link. Optionally, the UE adds, to the data packet, the second QoS identifier corresponding to the data packet, and then sends the data packet to the CPE.

QoS, of the uplink data of the UE, on the first link may be ensured in the following two manners:

In a first manner, the CPE receives the data packet sent by the UE, and the data packet includes the identifier of the UE and the second QoS identifier. Optionally, the data packet further includes at least one of the identifier of the radio bearer of the UE and the identifier of the QoS flow of the UE. Optionally, the identifier of the UE that is included in the data packet is an identifier that is allocated by the CPE to the UE and that uniquely identifies the UE at the CPE. The CPE determines, the radio bearer, of the UE, corresponding to the data packet, based on the mapping relationship between the second QoS identifier and the radio bearer of the UE. Alternatively, the CPE directly determines the radio bearer of the UE corresponding to the data packet, based on the identifier of the radio bearer of the UE that is carried in the data packet. Alternatively, the CPE directly determines the QoS flow, of the UE, corresponding to the data packet, based on the identifier that is of the QoS flow of the UE and that is carried in the data packet. Further, optionally, the CPE may further determine the radio bearer, of the UE, corresponding to the data packet, based on the mapping relationship between the radio bearer of the UE and the QoS flow of the UE. Alternatively, the CPE determines the QoS flow, of the UE, corresponding to the data packet, based on the mapping relationship between the second QoS identifier and the QoS flow of the UE. Further, optionally, the CPE may further determine the radio bearer, of the UE, corresponding to the data packet, based on the mapping relationship between the radio bearer and the QoS flow of the UE.

Then, the CPE determines the radio bearer or the QoS flow, of the CPE, corresponding to the data packet, based on the radio bearer, of the UE, corresponding to the data packet and the mapping relationship between the radio bearer of the CPE and the radio bearer of the UE or the mapping relationship between the QoS flow of the CPE and the radio bearer of the UE. Alternatively, the CPE determines the radio bearer or the QoS flow, of the CPE, corresponding to the data packet, based on the QoS flow, of the UE, corresponding to the data packet and the mapping relationship between the radio bearer of the CPE and the QoS flow of the UE or the mapping relationship between the QoS flow of the CPE and the QoS flow of the UE. In this application, the radio bearer, of the CPE, corresponding to the data packet is the radio bearer of the CPE that is used to carry the data packet on the first link. The CPE sends the data packet to the home access gateway by using the first link based on a QoS parameter of the radio bearer or the QoS flow, of the CPE, corresponding to the data packet, to ensure the QoS, of the uplink data of the UE, on the first link. The QoS parameter of the radio bearer, of the CPE, corresponding to the data packet or the QoS parameter, of the QoS flow, of the CPE corresponding to the data packet is the QoS parameter of the data packet.

In a second manner, the CPE receives the data packet sent by the UE, and the data packet includes the identifier of the UE and the second QoS identifier. The CPE determines the radio bearer, of the CPE, corresponding to the data packet, based on the mapping relationship between the second QoS identifier and the radio bearer of the CPE. Alternatively, the CPE determines the QoS flow, of the CPE, corresponding to the data packet, based on the mapping relationship between the second QoS identifier and the QoS flow of the CPE. Further, optionally, the CPE determines the radio bearer, of the CPE, corresponding to the data packet, based on the mapping relationship between the QoS flow of the CPE and the radio bearer of the CPE. The CPE sends the data packet to the home access gateway over the first link based on a QoS parameter of the radio bearer or the QoS flow, of the CPE, corresponding to the data packet, to ensure the QoS, of the uplink data of the UE, on the first link. The QoS parameter of the radio bearer, of the CPE, corresponding to the data packet or the QoS parameter of the QoS flow, of the CPE, corresponding to the data packet is the QoS parameter of the data packet.

In the foregoing two manners, the data packet sent by the CPE to the home access gateway includes at least one of the following information: the identifier of the UE, the identifier of the radio bearer of the UE, and the uplink endpoint information of the first connection transmission tunnel corresponding to the DRB of the UE. The identifier of the radio bearer of the UE may be added by the UE or the CPE, and the identifier of the UE and the uplink endpoint information of the first connection transmission tunnel corresponding to the DRB of the UE may be added by the CPE. Optionally, the identifier of the UE that is added by the CPE is allocated by the home access gateway, and can uniquely identify the UE at the home access gateway. The identifier of the radio bearer of the UE that is added by the CPE may be determined by the CPE based on the mapping relationship between the second QoS identifier and the radio bearer of the UE, or may be determined by the CPE based on the mapping relationship between the second QoS identifier and the QoS flow of the UE and the mapping relationship between the radio bearer of the UE and the QoS flow of the UE.

QoS, of downlink data of the UE, on the first link is ensured in the following manner: The home access gateway receives a data packet sent by the core network device, and the home access gateway identifies, based on information carried in the data packet, the target UE needing to receive the data packet, and the identifier of the QoS flow of the UE or an EPS bearer of the UE. The EPS bearer of the UE may be in a one-to-one correspondence with the radio bearer of the UE. The home access gateway determines the radio bearer, of the CPE, corresponding to the data packet, based on the identifier of the QoS flow that is included in the data packet and the mapping relationship between the QoS flow of the UE and the radio bearer of the CPE. Alternatively, the home access gateway determines the radio bearer, of the UE, corresponding to the data packet, based on the identifier of the QoS flow that is included in the data packet and the mapping relationship between the radio bearer of the UE and the QoS flow of the UE, and then determines the radio bearer, of the CPE, corresponding to the data packet, based on the mapping relationship between the radio bearer of the CPE and the radio bearer of the UE. Alternatively, the home access gateway determines the radio bearer of the UE based on the EPS bearer of the UE, and further determines the radio bearer, of the CPE, corresponding to the data packet, based on the mapping relationship between the radio bearer of the UE and the radio bearer of the CPE. The home access gateway sends the data packet to the CPE over the first link based on a QoS parameter of the radio bearer, of the CPE, corresponding to the data packet, to ensure the QoS, of the downlink data of the UE, on the first link. The QoS parameter of the radio bearer, of the CPE, corresponding to the data packet is a QoS parameter corresponding to the data packet.

The data packet sent by the home access gateway to the CPE includes at least one of the following information: the identifier of the UE, the identifier of the radio bearer of the UE, the identifier of the QoS flow of the UE, and downlink endpoint information of the first connection transmission tunnel corresponding to the DRB of the UE. Correspondingly, QoS, of downlink data of the UE, on the second link is ensured in the following several manners:

In a first manner, the CPE receives a data packet sent by the home access gateway, and the data packet includes the identifier of the UE, the identifier of the radio bearer of the UE, and/or the identifier of the QoS flow of the UE. The CPE determines the second QoS identifier corresponding to the data packet, based on the identifier of the radio bearer of the UE that is in the data packet and the mapping relationship between the second QoS identifier and the radio bearer of the UE. Alternatively, the CPE determines the second QoS identifier corresponding to the data packet, based on the identifier of the QoS flow of the UE that is in the data packet and the mapping relationship between the second QoS identifier and the QoS flow of the UE. The CPE sends the data packet to the UE over the second link based on a QoS parameter of the second QoS identifier corresponding to the data packet, to ensure the QoS, of the downlink data of the UE, on the second link. The QoS parameter of the second QoS identifier is a QoS parameter of the data packet.

In a second manner, the CPE receives a data packet sent by the home access gateway, and the data packet includes the identifier of the UE. The CPE determines the second QoS identifier corresponding to the data packet, based on the radio bearer of the CPE that carries the data packet and the mapping relationship between the second QoS identifier and the radio bearer of the CPE. Alternatively, the CPE determines the second QoS identifier corresponding to the data packet, based on the identifier of the QoS flow of the CPE that is included in the data packet and the mapping relationship between the second QoS identifier and the QoS flow of the CPE. The CPE sends the data packet to the UE over the second link based on a QoS parameter of the second QoS identifier, to ensure the QoS, of the downlink data of the UE, on the second link. The QoS parameter of the second QoS identifier is a QoS parameter of the data packet.

In a third manner, the CPE receives a data packet sent by the home access gateway, and the data packet includes downlink endpoint information of the first connection transmission tunnel corresponding to the UE DRB, and the CPE determines the UE needing to receive the data packet and the DRB of the UE that carries the data packet, based on the downlink endpoint information of the first connection transmission tunnel corresponding to the UE DRB. Further, the CPE may determine the second QoS identifier corresponding to the data packet, based on the mapping relationship between the second QoS identifier and the radio bearer of the UE. The CPE sends the data packet to the UE by using the second link based on a QoS parameter of the second QoS identifier corresponding to the data packet, to ensure the QoS, of the downlink data of the UE, on the second link. The QoS parameter of the second QoS identifier is a QoS parameter of the data packet.

Optionally, the data packet sent by the CPE to the UE over the second link includes the identifier of the radio bearer of the UE, and the identifier of the radio bearer of the UE may be added by the CPE or added by the HA GW. The UE may deliver, based on the identifier of the radio bearer, the received downlink data packet to a PDCP entity corresponding to the radio bearer for receiving processing.

In a second scenario, the first link and the second link each are a second-type link.

Because the second link is the second-type link in either the second scenario or the first scenario, processing performed, on the second link, by the UE on the uplink data of the UE is the same in the two scenarios. Details are not described herein again.

QoS, of the uplink data of the UE, on the first link is ensured in the following manner:

The CPE receives a data packet sent by the UE, and the data packet includes the identifier of the UE and the second QoS identifier. The CPE determines the radio bearer, of the UE, corresponding to the data packet, based on the second QoS identifier included in the data packet and the mapping relationship between the second QoS identifier and the radio bearer of the UE. Alternatively, the data packet that is sent by the UE and that is received by the CPE further includes the identifier of the radio bearer of the UE, and the CPE may directly determine the radio bearer, of the UE, corresponding to the data packet, based on the identifier, of the radio bearer of the UE that is included in the data packet. Then, the CPE determines the first QoS identifier corresponding to the data packet, based on the radio bearer, of the UE, corresponding to the data packet and the mapping relationship between the first QoS identifier and the radio bearer of the UE.

Alternatively, the CPE determines the QoS flow, of the UE, corresponding to the data packet, based on the second QoS identifier included in the data packet and the mapping relationship between the second QoS identifier and the QoS flow of the UE. Then, the CPE determines the first QoS identifier corresponding to the data packet, based on the QoS flow, of the UE, corresponding to the data packet and the mapping relationship between the first QoS identifier and the QoS flow of the UE.

The CPE determines the first QoS identifier corresponding to the data packet, based on the second QoS identifier included in the data packet and the mapping relationship between first QoS identifier and the second QoS identifier.

Then, the CPE sends the data packet to the home access gateway over the first link based on a QoS parameter corresponding to the first QoS identifier corresponding to the data packet, to ensure the QoS, of the uplink data of the UE, on the first link. The QoS parameter corresponding to the first QoS identifier is a QoS parameter of the data packet. Optionally, before sending the data packet to the home access gateway, the CPE adds the first QoS identifier corresponding to the data packet to the data packet, so that another node on the first link determines, when sending the data packet, the QoS parameter of the data packet based on the first QoS identifier.

Optionally, the CPE may further add the identifier of the radio bearer of the UE to the data packet, or add the uplink endpoint information of the first connection transmission tunnel corresponding to the DRB of the UE, so that after receiving the data packet, the home access gateway delivers the data packet to a PDCP entity corresponding to the radio bearer of the UE for receiving processing.

In this scenario, QoS, of downlink data of the UE, on the first link is ensured in the following manner: The home access gateway receives a data packet sent by the core network device, identifies the target UE needing to receive the data packet, and the radio bearer of the UE or the QoS flow of the UE. The home access gateway determines the first QoS identifier corresponding to the data packet, based on the radio bearer of the UE and the mapping relationship between the first QoS identifier and the radio bearer of the UE. Alternatively, the home access gateway determines the first QoS identifier corresponding to the data packet, based on the QoS flow of the UE and the mapping relationship between the first QoS identifier and the QoS flow of the UE. Then, the home access gateway sends the data packet to the CPE over the first link based on a QoS parameter corresponding to the first QoS identifier, to ensure the QoS, of the downlink data of the UE, on the first link. The QoS parameter corresponding to the first QoS identifier is a QoS parameter of the data packet. Optionally, before sending the downlink data packet of the UE to the CPE over the first link, the home access gateway may add at least one of the following information to the data packet: the identifier of the UE, the identifier of the radio bearer of the UE, the identifier of the QoS flow of the UE, the first QoS identifier, and downlink endpoint information of the first connection transmission tunnel corresponding to the DRB of the UE.

In this scenario, QoS, of the downlink data of the UE, on the second link is ensured in the following manner: The CPE receives the data packet sent by the home access gateway. The CPE determines the radio bearer, of the UE, corresponding to the data packet, based on the first QoS identifier included in the data packet and the mapping relationship between the first QoS identifier and the radio bearer of the UE, and then, determines the second QoS identifier corresponding to the data packet, based on the radio bearer, of the UE, corresponding to the data packet and the mapping relationship between the second QoS identifier and the radio bearer of the UE.

Alternatively, the CPE determines the QoS flow, of the UE, corresponding to the data packet, based on the first QoS identifier included in the data packet and the mapping relationship between the first QoS identifier and the QoS flow of the UE, and then determines the second QoS identifier corresponding to the data packet, based on the QoS flow, of the UE, corresponding to the data packet and the mapping relationship between the second QoS identifier and the QoS flow of the UE.

Alternatively, the CPE determines the second QoS identifier corresponding to the data packet, based on the first QoS identifier included in the data packet and the mapping relationship between the first QoS identifier and the second QoS identifier.

Alternatively, the CPE determines the second QoS identifier corresponding to the data packet, based on the identifier of the UE and the identifier of the radio bearer of the UE that are included in the data packet, and the mapping relationship between the radio bearer of the UE and the second QoS identifier.

Alternatively, the CPE determines the second QoS identifier corresponding to the data packet, based on the identifier of the UE and the identifier of the QoS flow of the UE that are included in the data packet, and the mapping relationship between the QoS flow of the UE and the second QoS identifier.

Alternatively, the CPE determines the radio bearer of the UE (that is, determines the DRB of the UE) based on the downlink endpoint information that is of the first connection transmission tunnel corresponding to the DRB of the UE and that is included in the data packet, and then determines the second QoS identifier corresponding to the data packet, based on the mapping relationship between the radio bearer of the UE and the second QoS identifier.

Then, the CPE sends the data packet to the UE over the second link based on a QoS parameter corresponding to the second QoS identifier corresponding to the data packet, to ensure the QoS, of the downlink data of the UE, on the second link. The QoS parameter of the second QoS identifier is a QoS parameter of the data packet. Optionally, after adding, to the data packet, the second QoS identifier and/or the identifier of the radio bearer of the UE that corresponds to the data packet, the CPE sends the data packet to the UE.

In a third scenario, the first link and the second link each are a first-type link.

QoS, of the uplink data of the UE, on the second link is ensured in the following manner: The UE determines the QoS flow corresponding to the data packet, and then maps the QoS flow to the radio bearer of the UE, or directly determines the radio bearer of the UE that is used to send the data packet or a logical channel that is in a one-to-one correspondence with the radio bearer of the UE, and then, sends the data packet to the CPE based on a QoS parameter of the determined radio bearer of the UE, to ensure the QoS, of the uplink data of the UE, on the second link.

QoS, of the uplink data of the UE, on the first link is ensured in the following manners:

The CPE receives the data packet sent by the UE, and the data packet includes the identifier of the UE.

In a manner, the CPE determines the radio bearer of the UE that carries the data packet, and then determines the radio bearer of the CPE that is used to carry the data packet on the first link, based on the mapping relationship between the radio bearer of the CPE and the radio bearer of the UE.

In another manner, the data packet includes the identifier of the QoS flow of the UE, and the CPE determines the radio bearer of the CPE that is used to carry the data packet on the first link, based on the identifier of the QoS flow of the UE that is included in the data packet and the mapping relationship between the radio bearer of the CPE and the QoS flow of the UE.

In still another manner, the CPE determines the QoS flow, of the CPE, corresponding to the data packet, based on the radio bearer of the UE that carries the data packet and the mapping relationship between the QoS flow of the CPE and the radio bearer of the UE, and then determines the radio bearer of the CPE that is used to carry the data packet on the first link, based on the QoS flow, of the CPE, corresponding to the data packet and the mapping relationship between the radio bearer of the CPE and the QoS flow of the CPE.

Then, the CPE sends the uplink data packet of the UE to the home access gateway over the first link based on a QoS parameter of the radio bearer of the CPE, and the QoS parameter of the radio bearer of the CPE is a QoS parameter of the data packet.

Optionally, the CPE adds at least one of the following information to the uplink data packet: the identifier of the UE, the identifier of the radio bearer of the UE, and the uplink endpoint information of the first connection transmission tunnel corresponding to the DRB of the UE. The home access gateway delivers, based on the foregoing information added by the CPE, the received uplink data packet of the UE to a PDCP entity corresponding to the radio bearer of the UE for receiving processing.

Optionally, the CPE may determine the radio bearer of the UE that carries the data packet, based on a logical channel through which the uplink data packet of the UE is received on the second link and a correspondence between the logical channel and the radio bearer of the UE.

Because the first link is the first-type link in either the third scenario or the first scenario, processing performed, on the second link, by the home access gateway on the downlink data of the UE is the same in the two scenarios. For details, refer to the related descriptions in the first scenario. Details are not described herein again.

In this scenario, QoS, of downlink data of the UE, on the second link is ensured in the following manner: The CPE receives a data packet sent by the home access gateway, and the data packet includes the identifier of the UE and the identifier of the radio bearer of the UE. In this way, the CPE can directly determine the radio bearer of the UE that carries the data packet on the second link, based on the two identifiers.

Alternatively, the CPE receives a data packet sent by the home access gateway, and the data packet includes the identifier of the UE. The CPE determines the radio bearer, of the UE, corresponding to the data packet, based on the radio bearer of the CPE that carries the data packet on the first link and the mapping relationship between the radio bearer of the CPE and the radio bearer of the UE. In this application, the radio bearer, of the UE, corresponding to the data packet is the radio bearer of the UE that carries the data packet on the second link.

Alternatively, the CPE receives a data packet sent by the home access gateway, and the data packet includes downlink endpoint information of the first connection transmission tunnel corresponding to the DRB of the UE. The CPE determines the DRB of the UE that carries the data packet on the second link, based on the downlink endpoint information of the first connection transmission tunnel corresponding to the DRB of the UE.

Alternatively, the CPE receives the data packet sent by the home access gateway, and the data packet includes the identifier of the UE and the identifier of the QoS flow of the UE. The CPE determines the radio bearer of the UE that carries the data packet on the second link, based on the mapping relationship between the QoS flow of the UE and the radio bearer of the UE.

Then, the CPE sends the data packet to the UE over the second link based on a QoS parameter of the radio bearer of the UE that carries the data packet on the second link, to ensure the QoS, of the downlink data of the UE, on the second link. The QoS parameter of the radio bearer of the UE is a QoS parameter of the data packet.

In a fourth scenario, the first link is a second-type link, and the second link is a first-type link.

Because the second link is the first-type link in either the fourth scenario or the third scenario, processing performed, on the second link, on the uplink data of the UE is the same in the two scenarios. Therefore, for a manner for ensuring QoS, of the uplink data of the UE, on the second link, refer to the related descriptions in the third scenario. Details are not described herein again.

In this scenario, QoS, of the uplink data of the UE, on the first link is ensured in the following manner: The CPE receives a data packet sent by the UE, determines the radio bearer of the UE that carries the data packet, and then determines the first QoS identifier corresponding to the data packet, based on the mapping relationship between the first QoS identifier and the radio bearer of the UE.

Alternatively, the CPE determines the first QoS identifier corresponding to the data packet, based on the identifier that is of the QoS flow of the UE and that is included in the data packet and the mapping relationship between the first QoS identifier and the QoS flow of the UE.

Then, the CPE sends the uplink data packet of the UE to the home access gateway over the first link based on a QoS parameter corresponding to the first QoS identifier, and the QoS parameter corresponding to the first QoS identifier is a QoS parameter of the data packet.

Optionally, before sending the uplink data packet of the UE to the home access gateway, the CPE adds at least one of the following information: the identifier of the UE, the identifier of the radio bearer of the UE, the uplink endpoint information of the first connection transmission tunnel corresponding to the DRB of the UE, and the first QoS identifier. The home access gateway may deliver, based on the information added by the CPE, the received uplink data packet of the UE to a PDCP entity corresponding to the radio bearer of the UE for receiving processing. In addition, if another intermediate transmission node exists on the first link between the CPE and the home access gateway, the intermediate transmission node may perform proper forwarding processing on the data packet based on the information (for example, the first QoS identifier) added by the CPE, to ensure a QoS requirement of the data of the UE.

Because the first link is the second-type link in either the fourth scenario or the second scenario, processing performed, on the second link, by the home access gateway on downlink data of the UE is the same in the two scenarios. Therefore, for a manner in which the home access gateway ensures QoS, of the downlink data of the UE, on the first link, refer to the related descriptions in the second scenario. Details are not described herein again.

In this scenario, the QoS, of the downlink data of the UE, on the second link is ensured in the following manner: The CPE receives a data packet sent by the home access gateway, and the data packet includes the identifier of the UE and the first QoS identifier. The CPE determines the radio bearer of the UE that carries the data packet on the second link, based on the mapping relationship between the first QoS identifier and the radio bearer of the UE.

Alternatively, the CPE receives a data packet sent by the home access gateway, and the data packet includes the identifier of the UE and the first QoS identifier. The CPE determines the QoS flow, of the UE, corresponding to the data packet, based on the mapping relationship between the first QoS identifier and the QoS flow of the UE, and then determines the radio bearer of the UE that carries the data packet on the second link, based on the mapping relationship between the QoS flow of the UE and the radio bearer of the UE.

Alternatively, the CPE receives a data packet sent by the home access gateway, and the data packet includes the identifier of the UE and the identifier of the QoS flow of the UE. The CPE determines the radio bearer of the UE that carries the data packet on the second link, based on the mapping relationship between the QoS flow of the UE and the radio bearer of the UE.

Alternatively, the CPE receives a data packet sent by the home access gateway, where the data packet includes downlink endpoint information of the first connection transmission tunnel corresponding to the DRB of the UE, and the CPE accordingly determines the radio bearer of the UE that carries the data packet on the second link (that is, determines the DRB of the UE).

Then, the CPE sends the data packet to the UE over the second link based on a QoS parameter of the radio bearer of the UE that carries the data packet on the second link, to ensure the QoS, of the downlink data of the UE, on the second link. The QoS parameter of the radio bearer of the UE is a QoS parameter of the data packet.

Figure 5:
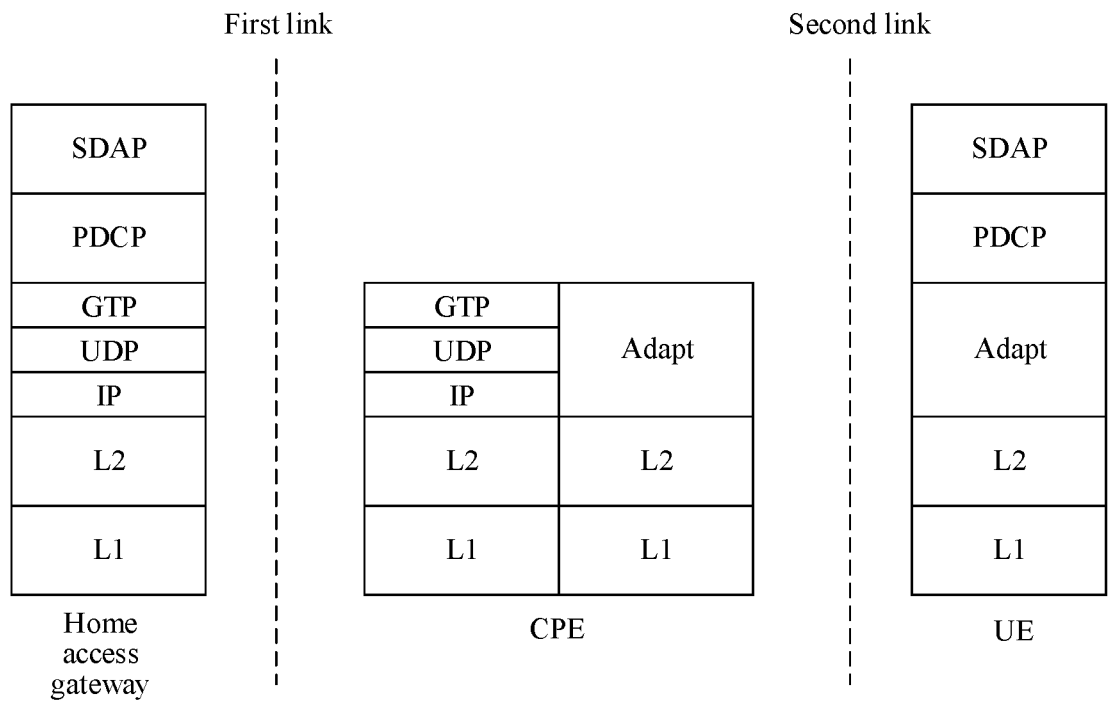
FIG. 5 is a schematic diagram of a user plane protocol architecture.
Figure 6:
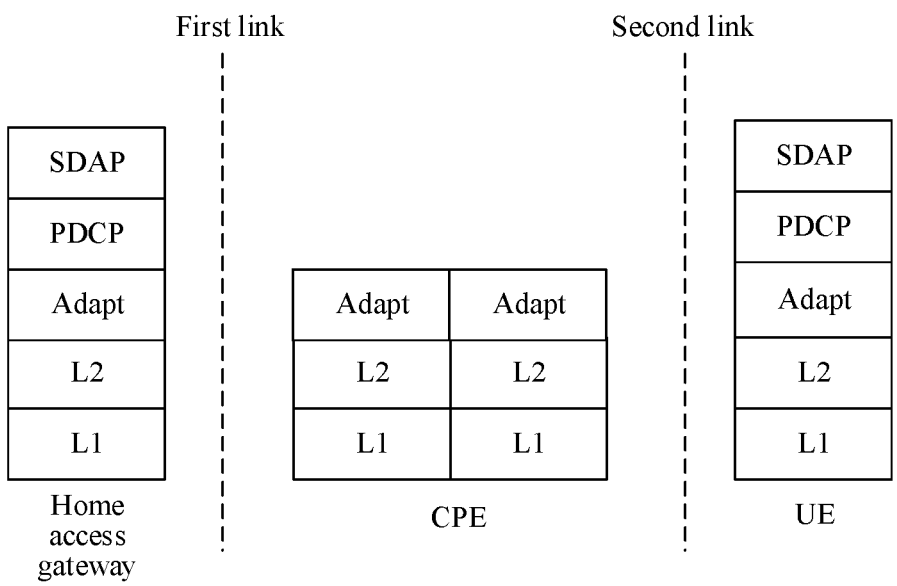
FIG. 6 is a schematic diagram of another user plane protocol architecture.

In this application, protocol stack architectures of the two connections between the home access gateway and the UE need to be defined. Two options for the protocol architectures between the home access gateway and the UE are shown in FIG. 5 and FIG. 6. FIG. 5 is a schematic diagram of a user plane protocol architecture in which the first link between the CPE and the home access gateway is a general packet radio service (GPRS) tunneling protocol (GTP) tunnel link. FIG. 6 is a schematic diagram of another user plane protocol architecture in which the first link between the CPE and the home access gateway is an adaptation (Adapt for short below) layer-based link.

Referring to FIG. 5, a protocol stack of the UE includes the following from top to bottom: a service data adaptation protocol (SDAP) layer, a packet data convergence protocol (PDCP) layer, an adaptation protocol layer oriented to the second link, a link layer (Layer 2, L2) oriented to the second link, and a physical layer (Layer 1, L1) oriented to the second link. A protocol stack on an interface corresponding to the second link between the CPE and the UE includes the following from top to bottom: an Adapt layer oriented to the second link, L2 oriented to the second link, and L1 oriented to the second link. A protocol stack on an interface corresponding to the first link between the CPE and the home access gateway includes the following from top to bottom: a GTP layer, a user datagram protocol (UDP) layer, an IP layer, a link layer (L2) oriented to the first link, and a physical layer (L1) oriented to the first link that are peering to those of the home access gateway. A protocol stack, of the home access gateway, on a corresponding interface oriented to the first link includes the following from top to bottom: an SDAP layer and a PDCP layer that are peering to those of the UE, and a GTP layer, a UDP layer, an IP layer, a link layer L2 oriented to the first link, and a physical layer L1 oriented to the first link that are peering to those of the CPE.

Specific protocol layers corresponding to the link layer L2 and the physical layer L1 may be determined based on a communications technology protocol on which the first link and the second link are based. The specific protocol layers included in L1 and L2 are not limited in this embodiment of this application. For example, when the first/second link is an LTE/NR-based 3GPP link, L2 includes, for example, a radio link control (RLC) layer and a MAC layer, and the physical layer L1 is a PHY layer. For functions of these protocol layers, refer to specific descriptions of these protocol layers in LTE/NR technology specifications. Details are not described. For another example, when the first/second link is a non-3GPP link, L2 may include, for example, at least one of a logical link control (LLC) layer, a MAC layer, an Ethernet layer, a point-to-point protocol (PPP) layer, a point-to-point protocol layer over Ethernet (PPPoE), and the like.

On the second link between the UE and the CPE, for a transmit end (where the transmit end in an uplink direction is the UE, and the transmit end in a downlink direction is the CPE), a function of the adaptation layer (Adapt) oriented to the second link includes adding adaptation information. The adaptation information includes information about the radio bearer of the UE (for example, a radio bearer identifier, namely, an SRB ID or a DRB ID is added). Optionally, the adaptation information further includes at least one of the following information: the identifier of the UE, the second indication information, and the third indication information. A receive end of the second link (where the receive end in the uplink direction is the CPE, and the receive end in the downlink direction is the UE) reads the adaptation information added at the adaptation layer by the transmit end, to determine the specific UE and information about a bearer, of the UE, corresponding to a data packet. It should be noted that configuring the adaptation layer on the communication peer ends of the second link is optional, and the function of the adaptation layer may alternatively be implemented by using another existing protocol layer. For example, the adaptation information is added at the existing link layer L2 (where if the link layer includes a plurality of protocol layers, the adaptation information may be added at any one of the protocol layers) or physical layer L1. Alternatively, if the second link is the first-type link, the Adapt layer may not be required, and the receive end of the second link may determine the UE based on a C-RNTI of the UE, and determine a radio bearer, of the UE, corresponding to a logical channel, based on the logical channel through which the data packet is received.

Based on the user plane protocol stack shown in FIG. 5, on the first link, based on the first connection, a GTP tunnel in a one-to-one correspondence with a DRB of the UE is established between the CPE and the home access gateway. The UE and the DRB of the UE may be determined by using a TEID of the GTP tunnel. Correspondingly, processing on a downlink data packet of the UE is as follows: After performing SDAP layer processing (for example, adding a quality of service flow identifier (QFI), and performing mapping from a QoS flow to a DRB of the UE) and PDCP layer processing, the home access gateway sequentially performs GTP layer processing (for example, adding a downlink TEID that is allocated by the CPE to the GTP tunnel corresponding to the DRB of the UE), UDP layer processing, and IP layer processing, and performs adaptation processing. The adaptation processing includes QoS mapping processing and/or adding of the adaptation information. For the SDAP layer processing and the PDCP layer processing performed by the home access gateway, refer to the prior art. Details are not described herein.

For example, the QoS mapping processing is: When the first link is the first-type link, the home access gateway performs mapping from the QoS flow of the UE to a radio bearer of the CPE, or performs mapping from the radio bearer of the UE to a radio bearer of the CPE. When the first link is the second-type link, the home access gateway performs mapping from the QoS flow of the UE to a first QoS identifier, or performs mapping from the radio bearer of the UE to a first QoS identifier. For a specific mapping process, refer to the related descriptions in the foregoing embodiment. Details are not described herein again. The adding of the adaptation information includes adding at least one of the following information: the first QoS identifier, the second indication information, and the third indication information. Then, the home access gateway performs processing of the link layer L2 oriented to the first link on the data packet, delivers the data packet for processing of the physical layer L1 oriented to the first link, and sends the data packet to the CPE over the first link. Optionally, some or all of the processes during the adaptation processing may be performed during processing at any one or more of the following protocol layers: the adaptation layer oriented to the first link, L2 oriented to the first link (where if the link layer includes a plurality of protocol layers, some or all of the processes may be performed at any one of the protocol layers), and L1 oriented to the first link. The adaptation layer oriented to the first link may be located above L2 (for example, between the IP layer and L2), and is not shown in FIG. 5.

The CPE receives the downlink data packet from the home access gateway, obtains a PDCP PDU of the UE after layer-by-layer processing in the protocol stack (namely, the protocol stack of the interface between the CPE and the HA GW) on a receive side of the CPE, and determines the UE corresponding to the data packet and the radio bearer of the UE, based on GTP layer header information (for example, the TEID). Optionally, if the GTP header information further includes the information about the QoS flow of the UE, the CPE may further learn of the QoS flow, of the UE, corresponding to the data packet, and then send the PDCP PDU of the UE to a transmit side of the CPE for processing. For example, the processing on the transmit side of the CPE includes: When the second link between the CPE and the UE is the first-type link, the CPE sends the downlink data packet of the UE to the UE by using the radio bearer of the UE, and does not need to add additional adaptation information. That is, the PDCP PDU of the UE is sent to the UE after being sequentially processed at the RLC layer, the MAC layer, and the PHY layer. For processing processes of the RLC layer, the MAC layer, and the PHY layer, refer to the prior art. When the second link between the CPE and the UE is the second-type link, the CPE performs adaptation processing on the downlink data packet: The CPE adds the adaptation information (for example, adds the adaptation information to a header corresponding to the adaptation layer, or adds the adaptation information to a header corresponding to any existing protocol layer of the second link) to the downlink data packet. Then, the CPE performs, based on the configuration information of the first link and/or the configuration information of the second link that are/is sent by the home access gateway, mapping from the QoS flow of the UE to the second QoS identifier of the second link, or mapping from the radio bearer of the UE to the second QoS identifier of the second link, or mapping from the first QoS identifier of the first link to the second QoS identifier of the second link. For a specific mapping process, refer to the related descriptions in the foregoing embodiment. Details are not described herein again. Optionally, that the CPE performs adaptation processing on the downlink data packet further includes: adding the second QoS identifier during processing of the adaptation layer oriented to the second link or the link layer oriented to the second link. The adaptation processing performed by the CPE may be performed at a newly added adaptation layer oriented to the second link, or may be performed at the link layer (L2) oriented to the second link.

The CPE sends, to the UE, the data packet on which sending processing of the link layer and the physical layer that are oriented to the second link is performed. After receiving the data packet, the UE performs receiving processing of the physical layer and the link layer on the data packet, and then determines the radio bearer, of the UE, corresponding to the data packet, based on the logical channel of the data packet (when the second link is the first-type link); or determines the radio bearer, of the UE, corresponding to the data packet, based on the identifier that is of the radio bearer of the UE and that is carried in the data packet, and delivers the data packet to a PDCP entity corresponding to the radio bearer of the UE for PDCP layer receiving processing. Then, the UE performs SDAP layer receiving processing. For processing processes of the PDCP layer and the SDAP layer, refer to the prior art. Details are not described herein.

Corresponding to the protocol architecture shown in FIG. 5, for example, processing and sending of an uplink data packet of the UE are as follows:

If the second link is the first-type link, for a process in which the UE processes the uplink data packet, refer to corresponding descriptions in the prior art. For example, if the first link is an NR-based air interface link, the UE sequentially performs SDAP layer processing, PDCP layer processing, RLC layer processing, MAC layer processing, and PHY layer processing on the data packet, and then, sends the processed uplink data packet to the CPE on the determined radio bearer of the UE. For specific processing processes related to the protocol layers, refer to the prior art. Details are not described. For a process in which the UE determines the radio bearer of the UE that is used to send the uplink data packet, refer to the prior art. For example, mapping from the QoS flow of the UE to the radio bearer of the UE is performed at the SDAP layer.

If the second link is the second type of link, the UE performs, on the data packet, SDAP layer processing and PDCP layer processing, performs adaptation processing and processing of the link layer oriented to the second link, submits the data packet to the physical layer (PHY) oriented to the second link for processing, and sends the data packet to the CPE over the second link. The adaptation processing includes QoS mapping processing and/or adding of the adaptation information. The QoS mapping processing includes at least one of the following processing: mapping from the QoS flow of the UE to the second QoS identifier, mapping from the radio bearer of the UE to the second QoS identifier, and mapping from the QoS flow of the UE to the radio bearer of the UE. For a specific mapping process, refer to the related descriptions in the foregoing embodiment. Details are not described herein again. The adding of the adaptation information includes adding at least one of the following identifiers: the identifier of the QoS flow of the UE, the identifier of the radio bearer of the UE, the second QoS identifier, the second indication information, and the third indication information. Optionally, some or all of the processes during the adaptation processing may be performed during processing of any one or more of the following protocol layers: the adaptation layer oriented to the second link, the SDAP layer, the PDCP layer, L2 oriented to the second link (where if the link layer includes a plurality of protocol layers, some or all of the processes may be performed at any one of the protocol layers), and L1 oriented to the second link. For example, the UE may add the identifier of the QoS flow at the SDAP layer, and performs mapping from the QoS flow of the UE to the radio bearer of the UE; adds the identifier of the radio bearer of the UE at the adaptation layer oriented to the second link, and performs mapping from the radio bearer of the UE to the second QoS identifier; adds the second QoS identifier to the link layer oriented to the second link; and so on. Optionally, if some or all of the processes in the adaptation processing are performed by the UE at L2 oriented to the second link (where if the link layer includes a plurality of protocol layers, some or all of the processes may be performed at any one of the protocol layers) and/or L1 oriented to the second link, functions of L2 and/or L1 of a transmission technology actually used by the second link need to be extended.

The CPE receives the uplink data packet sent by the UE, and obtains a PDCP PDU of the UE after layer-by-layer processing at the protocol stack (namely, the protocol stack oriented to the second link between the CPE and the UE) on a receive side of the CPE. In the layer-by-layer processing process, the CPE may determine the radio bearer, of the UE, corresponding to the data packet, based on a logical channel through which the data packet is received or the identifier that is of the radio bearer of the UE and that is carried in the data packet (for example, carried in an adaptation layer header). Optionally, if the data packet further carries the identifier of the QoS flow of the UE (where for example, the identifier is carried in the adaptation layer header), the CPE may further determine the QoS flow of the data packet. The CPE sequentially performs, on the PDCP PDU of the UE, GTP layer processing (for example, adds an uplink TEID that is allocated by the HA GW to the GTP tunnel corresponding to the DRB of the UE), UDP layer processing, and IP layer processing. Then, the CPE performs, on the data packet, QoS mapping processing, processing of the link layer oriented to the first link, and processing of the physical layer oriented to the first link, and sends the data packet to the home access gateway over the first link. The QoS mapping processing may include but is not limited to: When the first link is the first-type link, the CPE performs mapping from the QoS flow of the UE, the radio bearer of the UE, or the second QoS identifier to the DRB of the CPE. When the first link is the second-type link, the CPE performs mapping from the QoS flow of the UE, the radio bearer of the UE, or the second QoS identifier to the first QoS identifier. For a specific process of the QoS mapping processing, refer to the related descriptions in the foregoing embodiment. Details are not described herein again. Optionally, the QoS mapping processing further includes: adding, by the CPE, the first QoS identifier before sending the uplink data packet of the UE to the home access gateway. If another intermediate transmission node exists on the first link between the CPE and the home access gateway, the intermediate transmission node may perform proper forwarding processing on the data packet based on the first QoS identifier, to ensure a QoS requirement of the data of the UE.

Optionally, the QoS mapping processing performed by the CPE may be performed at the link layer L2 oriented to the first link (where if the link layer includes a plurality of protocol layers, the QoS mapping processing may be performed at any one of the protocol layers). Alternatively, in another optional manner, the QoS mapping processing is performed at the adaptation layer oriented to the first link. The adaptation layer may be located above L2 (for example, between the IP layer and L2), and is not shown in FIG. 5. Optionally, during processing at the adaptation layer, the CPE may further add at least one of the second indication information and the third indication information, to indicate that the data packet carries user plane data of the UE.

The home access gateway receives the uplink data packet from the CPE, and sequentially performs, on the uplink data packet, L1 layer processing, L2 layer processing, IP layer processing, UDP layer processing, and GTP layer processing on a receive side. Because the user plane data packet of the UE is transmitted between the CPE and the home access gateway by using the GTP tunnel that is in a one-to-one correspondence with the DRB of the UE, the home access gateway may determine the UE and the DRB of the UE by using the TEID of the GTP tunnel. Then, the data packet (for example, the uplink PDCP PDU of the UE) is delivered, for processing, to a PDCP entity that corresponds to the DRB of the UE and that is at the PDCP layer, on the receive side, peering to that of the UE. Then, the data packet is delivered to the SDAP layer peering to that of the UE for processing.

Referring to FIG. 6, a protocol stack of the UE includes the following from top to bottom: an SDAP layer peering to that of the home access gateway, a PDCP layer peering to that of the home access gateway, an Adapt layer oriented to the second link, L2 oriented to the second link, and L1 oriented to the second link. A protocol stack on an interface corresponding to the second link between the CPE and the UE includes the following from top to bottom: an Adapt layer oriented to the second link, an L2 layer oriented to the second link, and an L1 layer oriented to the second link. A protocol stack on an interface corresponding to the first link between the CPE and the home access gateway includes the following from top to bottom: an Adapt layer oriented to the first link, L2 oriented to the first link, and L1 oriented to the first link. A protocol stack of the home access gateway includes the following from top to bottom: an SDAP layer peering to that of the UE, a PDCP layer peering to that of the UE, an Adapt layer oriented to the first link, L2 oriented to the first link, and L1 oriented to the first link. For specific protocol layers corresponding to the link layer L2 and the physical layer L1, refer to the descriptions of the protocol structure shown in FIG. 5. Details are not described herein again. Similarly, for related content of other protocol layers (including a function of the Adapt layer oriented to the second link, and content that is of the function of the adaptation layer and that is implemented by using another existing protocol layer), refer to the corresponding descriptions in the protocol structure shown in FIG. 5.

Based on the protocol architecture shown in FIG. 6, processing of the home access gateway on a downlink data packet of the UE is as follows:

The home access gateway performs SDAP layer processing (refer to the prior art, for example, adding a QFI and mapping the QoS flow of the UE to the radio bearer of the UE) and PDCP layer processing, and performs adaptation processing and processing of the link layer oriented to the first link. The adaptation processing includes QoS mapping processing and/or adding of the adaptation information. The QoS mapping processing may include: When the first link is the first-type link, the home access gateway performs mapping from the QoS flow of the UE to the radio bearer of the CPE, or the home access gateway performs mapping from the radio bearer of the UE to the radio bearer of the CPE. When the first link is the second-type link, the home access gateway performs mapping from the QoS flow of the UE to the first QoS identifier of the first link, or the home access gateway performs mapping from the radio bearer of the UE to the first QoS identifier of the first link. For a specific mapping process, refer to the related descriptions in the foregoing embodiments. Details are not described herein again. The adaptation information includes at least one of the following information: the identifier of the UE, the identifier of the radio bearer of the UE, the identifier of the QoS flow of the UE, the first QoS identifier, the second indication information, and the third indication information. Optionally, some or all of the processes during the adaptation processing may be performed during processing at any one or more of the following protocol layers: the adaptation layer oriented to the first link, the link layer L2 oriented to the first link (where if the link layer includes a plurality of protocol layers, some or all of the processes may be performed at any one of the protocol layers), and the physical layer oriented to the first link. For example, the home access gateway may add the identifier of the UE and the identifier of the radio bearer of the UE at the adaptation layer oriented to the first link, and perform mapping from the radio bearer of the UE to the first QoS identifier; add the first QoS identifier at the link layer oriented to the first link; and so on. Then, the home access gateway delivers the data packet to the physical layer oriented to the first link for processing, and sends the data packet to the CPE over the first link.

Optionally, if some or all of the processes in the adaptation processing are performed by the home access gateway at L2 oriented to the first link (where if the link layer includes a plurality of protocol layers, some or all of the processes may be performed at any one of the protocol layers) and/or L1 oriented to the first link, functions of L2 and/or L1 of a transmission technology actually used by the first link need to be extended.

The CPE receives the downlink data packet sent by the home access gateway, obtains a PDCP PDU of the UE after layer-by-layer receive processing on the data packet in the protocol stack oriented to the first link, and parses the adaptation information carried in the data packet to learn that the data packet needs to be sent to the UE and learn of the radio bearer, of the UE, corresponding to the data packet. Optionally, if the adaptation information includes the identifier of the QoS flow, the CPE may further learn of the QoS flow corresponding to the data packet, and then send the PDCP PDU of the UE to a transmit side for processing. For a processing process on the transmit side of the CPE, refer to the process in which the CPE processes the downlink data packet on the transmit side in the protocol architecture shown in FIG. 5. The CPE sends, to the UE, the data packet obtained after processing of the link layer and the physical layer that are oriented to the second link. For a processing process after the UE receives the data packet, refer to the process in which the UE performing receiving processing on the downlink data packet in the protocol architecture shown in FIG. 5.

Based on the protocol architecture shown in FIG. 6, for understanding of processing and sending of the UE on the uplink data packet, refer to descriptions of the processes in which the UE processes and sends the uplink data packet in the protocol architecture shown in FIG. 5.

The CPE receives the uplink data packet sent by the UE, and obtains a PDCP PDU of the UE after layer-by-layer processing in the protocol stack (namely, the protocol stack oriented to the second link between the CPE and the UE) on a receive side of the CPE. In the layer-by-layer processing process, the CPE may determine the radio bearer, of the UE, corresponding to the data packet, based on a logical channel through which the data packet is received or the identifier that is of the radio bearer of the UE and that is carried in the data packet (for example, carried in an adaptation layer header). Optionally, if the data packet further carries the identifier of the QoS flow of the UE (where for example, the identifier is carried in the adaptation layer header), the CPE may further determine the QoS flow of the data packet.

Further, the CPE performs, on the uplink data packet of the UE, adaptation processing and processing of the link layer oriented to the first link. The adaptation processing includes QoS mapping processing and/or adding of adaptation information. The QoS mapping processing may include: When the first link is the first-type link, the CPE performs mapping from the QoS flow of the UE, the radio bearer of the UE, or the second QoS identifier to the radio bearer of the CPE. When the first link is the second-type link, the CPE performs mapping from the QoS flow of the UE, the radio bearer of the UE, or the second QoS identifier to the first QoS identifier of the first link. For a specific mapping process, refer to the related descriptions in the foregoing embodiments. Details are not described herein again. The adaptation information includes at least one of the following information: the identifier of the UE, the identifier of the radio bearer of the UE, the identifier of the QoS flow of the UE, the first QoS identifier, the second indication information, and the third indication information. Optionally, some or all of the processes during the adaptation processing may be performed during processing at any one or more of the following protocol layers: the adaptation layer oriented to the first link, and the link layer oriented to the first link (where if the link layer includes a plurality of protocol layers, some or all of the processes may be performed at any one of the protocol layers). For example, the CPE may add the identifier of the UE and the identifier of the radio bearer of the UE at the adaptation layer oriented to the first link, and perform mapping from the radio bearer of the UE to the first QoS identifier; add the first QoS identifier at the link layer oriented to the first link; and so on. Then, the CPE delivers the data packet to the physical layer oriented to the first link for processing, and sends the data packet to the home access gateway over the first link.

Optionally, if some or all of the processes in the adaptation processing are performed by the CPE at the L2 layer oriented to the first link (where if the link layer includes a plurality of protocol layers, some or all of the processes may be performed at any one of the protocol layers), functions of the L2 layer of a transmission technology actually used by the first link need to be extended.

The home access gateway receives the uplink data packet from the CPE, obtains a PDCP PDU of the UE after sequentially performing receiving processing of the L1 layer, the L2 layer, and the Adapt layer that are oriented to the first link, determines the UE and the DRB of the UE based on the adaptation information carried in the data packet, then delivers, for processing, the data packet to a PDCP entity that corresponds to the DRB of the UE and that is at the PDCP layer, on a receive side, peering to that of the UE, and then delivers the data packet to the SDAP layer peering to that of the UE for processing.

Figure 7:
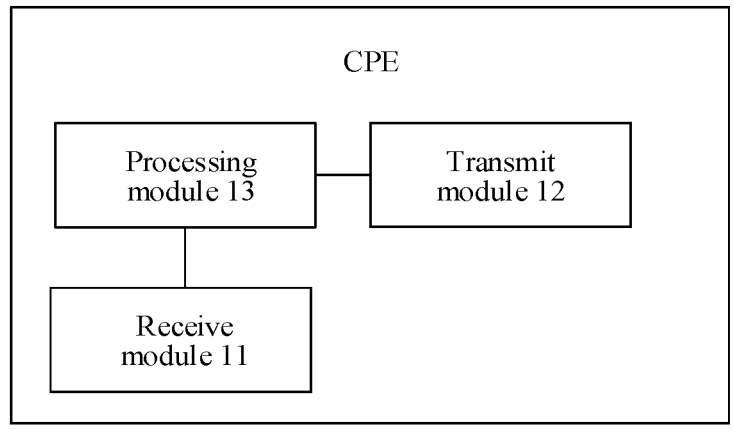
FIG. 7 is a schematic structural diagram of CPE according to Embodiment 3 of this application.

FIG. 7 is a schematic structural diagram of CPE according to Embodiment 3 of this application. As shown in FIG. 7, the CPE includes:

a receive module 11, configured to receive configuration information of a first link and configuration information of a second link that are sent by a home access gateway, where the first link is a link between the CPE and the home access gateway, the second link is a link between the CPE and UE, the configuration information of the first link is used to indicate quality of service QoS information of the first link, and the configuration information of the second link is used to indicate QoS information of the second link;

a transmit module 12, configured to send the configuration information of the second link to the UE; and a processing module 13, configured to determine a QoS parameter of a data packet of the UE based on the configuration information of the first link and the configuration information of the second link, where the transmit module 12 is further configured to send the data packet based on the QoS parameter of the data packet.

In this embodiment, the transmit module 12 is configured to send data, the receive module 11 is configured to receive data, and the processing module 13 is configured to process data. The CPE provided in this embodiment performs, by using the foregoing function modules, the method steps performed by the CPE in Embodiment 1 and Embodiment 2. Their specific implementations and technical effects are similar. Details are not described herein again.

Figure 8:
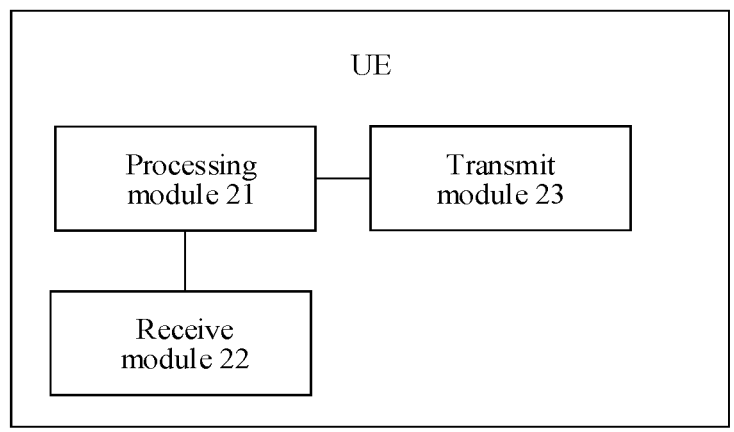
FIG. 8 is a schematic structural diagram of UE according to Embodiment 4 of this application.

FIG. 8 is a schematic structural diagram of UE according to Embodiment 4 of this application. As shown in FIG. 8, the UE includes:

a processing module 21, configured to establish an RRC connection to a home access gateway by using CPE;

a receive module 22, configured to receive configuration information that is sent by the home access gateway and that is of a link between the CPE and the UE, where the configuration information is used to indicate quality of service QoS information of the link between the CPE and the UE, where the processing module 21 is further configured to determine a QoS parameter of a data packet based on the configuration information; and a transmit module 23, configured to send the data packet to the CPE based on the QoS parameter of the data packet.

In this embodiment, the transmit module 23 is configured to send data, the receive module 22 is configured to receive data, and the processing module 21 is configured to process data. The UE provided in this embodiment performs, by using the foregoing function modules, the method steps performed by the UE in Embodiment 1 and Embodiment 2. Their specific implementations and technical effects are similar. Details are not described herein again.

Figure 9:
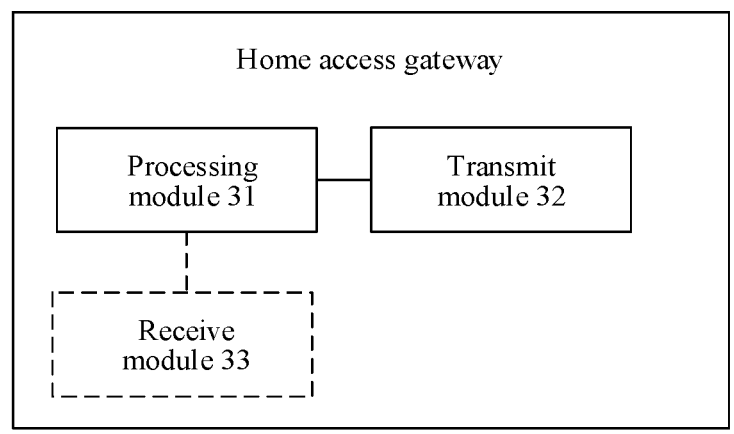
FIG. 9 is a schematic structural diagram of a home access gateway according to Embodiment 5 of this application.

FIG. 9 is a schematic structural diagram of a home access gateway according to Embodiment 5 of this application. As shown in FIG. 9, the home access gateway includes:

a processing module 31, configured to establish an RRC connection to UE by using CPE;

a transmit module 32, configured to send configuration information of a first link and configuration information of a second link to the CPE, where the first link is a link between the CPE and the home access gateway, the second link is a link between the CPE and UE, the configuration information of the first link is used to indicate quality of service QoS information of the first link, and the configuration information of the second link is used to indicate QoS information of the second link, where the processing module 31 is further configured to determine a QoS parameter of a data packet of the UE based on the configuration information of the first link; and the transmit module 31 is further configured to send the data packet based on the QoS parameter of the data packet.

In this embodiment, the transmit module 31 is configured to send data. Optionally, the home access gateway further includes a receive module 33. The receive module is configured to receive data, and the processing module 32 is configured to process data. The home access gateway provided in this embodiment performs, by using the foregoing function modules, the method steps performed by the home access gateway in Embodiment 1 and Embodiment 2. Their specific implementations and technical effects are similar. Details are not described herein again.

It may be understood that the transmit module and the receive module in the foregoing embodiments may be combined into a transceiver module to implement similar functions. Details are not described herein. The transmit module, the receive module, or the transceiver module may be a radio transceiver which completes the corresponding functions by using an antenna. The transmit module, the receive module, or the transceiver module may alternatively be an interface or a communications interface. The processing module in the embodiments may be implemented by a processor that has a data processing function.

Figure 10:
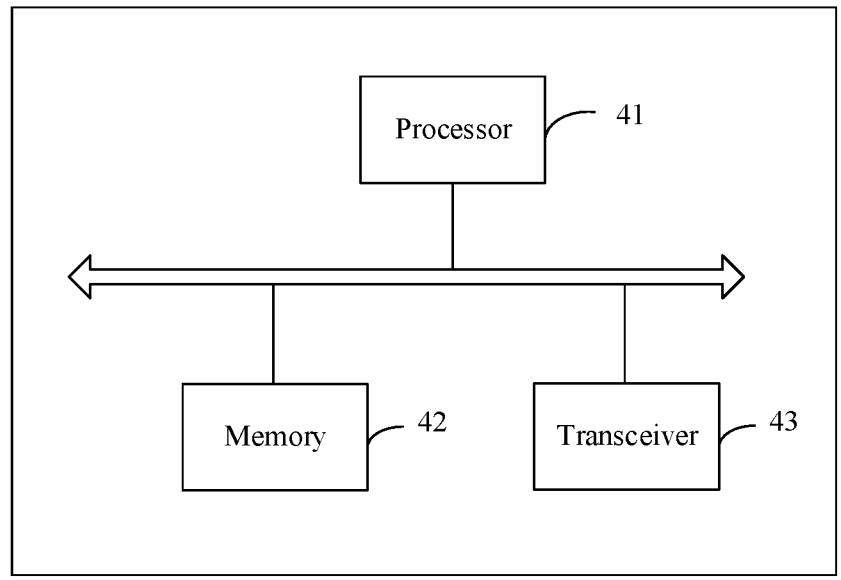
FIG. 10 is a schematic structural diagram of CPE according to Embodiment 6 of this application.

FIG. 10 is a schematic structural diagram of CPE according to Embodiment 6 of this application. As shown in FIG. 10, the CPE includes a processor 41, a memory 42, and a transceiver 43. The memory 42 is configured to store an instruction. The transceiver 43 is configured to communicate with another device. The processor 41 is configured to execute the instruction stored in the memory 42, to enable the CPE to perform the method steps performed by the CPE in Embodiment 1 and Embodiment 2. Their specific implementations and technical effects are similar. Details are not described herein again.

Figure 11:
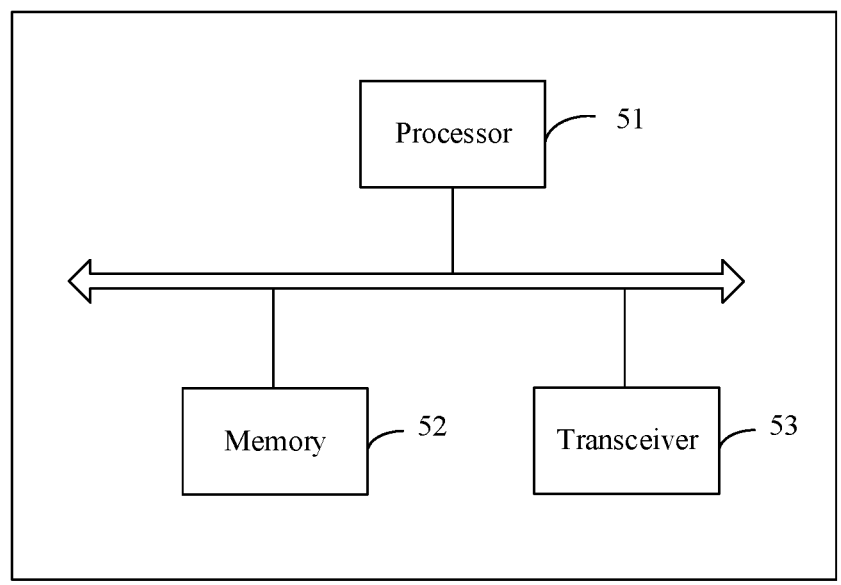
FIG. 11 is a schematic structural diagram of UE according to Embodiment 7 of this application.

FIG. 11 is a schematic structural diagram of UE according to Embodiment 7 of this application. As shown in FIG. 11, the UE includes a processor 51, a memory 52, and a transceiver 53. The memory 52 is configured to store an instruction. The transceiver 53 is configured to communicate with another device. The processor 51 is configured to execute the instruction stored in the memory 52, to enable the UE to perform the method steps performed by the UE in Embodiment 1 and Embodiment 2. Their specific implementations and technical effects are similar. Details are not described herein again.

Figure 12:
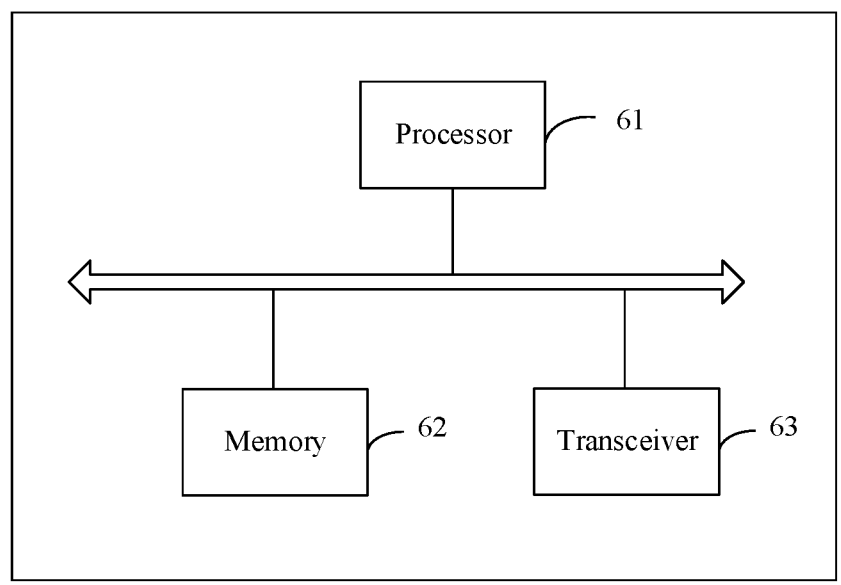
FIG. 12 is a schematic structural diagram of a home access gateway according to Embodiment 8 of this application.

FIG. 12 is a schematic structural diagram of a home access gateway according to Embodiment 8 of this application. As shown in FIG. 12, the home access gateway includes a processor 61, a memory 62, and a transceiver 63. The memory 62 is configured to store an instruction. The transceiver 63 is configured to communicate with another device. The processor 61 is configured to execute the instruction stored in the memory 62, to enable the home access gateway to perform the method steps performed by the home access gateway in Embodiment 1 and Embodiment 2. Their specific implementations and technical effects are similar. Details are not described herein again.

Embodiment 9 of this application provides a computer-readable storage medium, applied to CPE. The computer-readable storage medium stores an instruction, and when the instruction is executed by a computing apparatus, the CPE is enabled to perform the method steps performed by the CPE in Embodiment 1 and Embodiment 2. Their specific implementations and technical effects are similar. Details are not described herein again.

Embodiment 10 of this application provides a computer-readable storage medium, applied to UE. The computer-readable storage medium stores an instruction, and when the instruction is executed by a computing apparatus, the UE is enabled to perform the method steps performed by the UE in Embodiment 1 and Embodiment 2. Their specific implementations and technical effects are similar. Details are not described herein again.

Embodiment 11 of this application provides a computer-readable storage medium, applied to a home access gateway. The computer-readable storage medium stores an instruction, and when the instruction is executed by a computing apparatus, the home access gateway is enabled to perform the method steps performed by the home access gateway in Embodiment 1 and Embodiment 2. Their specific implementations and technical effects are similar. Details are not described herein again.

The processor in the embodiments may be a general purpose processor, a digital signal processor (DSP), an application-specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by means of a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in a memory, and a processor reads instructions in the memory and completes the steps in the foregoing methods in combination with hardware of the processor.

The bus in this application may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

What is claimed is:

1. A customer premises equipment (CPE), comprising at least one processor and a memory coupled to the at least one processor and storing programming instructions for execution by the at least one processor, wherein the programming instructions instruct the at least one processor to perform operations comprising:
    receiving configuration information of a first link and configuration information of a second link that are sent by a home access gateway, wherein the first link is a link between the CPE and the home access gateway, the second link is a link between the CPE and user equipment (UE), the configuration information of the first link is used to indicate quality of service (QoS) configuration information of the first link, and the configuration information of the second link is used to indicate QoS configuration information of the second link wherein the CPE is a relay user equipment and the first link and the second link are wireless;
    sending the configuration information of the second link to the UE;
    determining a QoS parameter of a data packet of the UE based on the configuration information of the first link and the configuration information of the second link; and
    sending the data packet based on the QoS parameter of the data packet.

2. The CPE according to claim 1, wherein when the first link is a first-type link and the second link is a second-type link, the configuration information of the first link comprises at least one of the following information: an identifier of the UE, QoS configuration information of the UE, and QoS configuration information of the CPE, and the configuration information of the second link comprises the QoS information of the second link;
    the first-type link comprises a communications link established based on any one of a long term evolution (LTE) system, an LTE in unlicensed spectrum system, new radio (NR) system, a universal mobile telecommunications system (UMTS) system, and a global system for mobile communications (GSM) system; and the second-type link is a communications link established based on any one of a wireless local area network (WLAN), Bluetooth, ZigBee, the Ethernet, a point-to-point protocol (PPP), a point-to-point protocol over Ethernet PPPoE, an asynchronous transfer mode (ATM), code division multiple access (CDMA), and CDMA2000;
    the QoS configuration information of the UE comprises at least one of the following information: an identifier of a radio bearer of the UE, a QoS parameter of the radio bearer of the UE, uplink endpoint information of a first connection transmission tunnel corresponding to a data radio bearer (DRB) of the UE, an identifier of a QoS flow of the UE, a QoS parameter of the QoS flow of the UE, and a mapping relationship between the radio bearer of the UE and the QoS flow of the UE;
    the QoS configuration information of the CPE comprises at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the QoS flow of the CPE and the radio bearer of the UE, and a mapping relationship between the radio bearer of the CPE and the QoS flow of the UE; and
    the QoS information of the second link comprises at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, wherein the second QoS identifier is used to identify a QoS granularity of the second link.

3. The CPE according to claim 2, wherein the determining a QoS parameter of a data packet of the UE based on the configuration information of the first link and the configuration information of the second link comprises:
receiving the data packet sent by the UE, wherein the data packet comprises the identifier of the UE and the second QoS identifier; determining the radio bearer, of the UE, corresponding to the data packet, based on the second QoS identifier comprised in the data packet and the mapping relationship between the second QoS identifier and the radio bearer of the UE; or
determining the QoS flow, of the UE, corresponding to the data packet, based on the second QoS identifier comprised in the data packet and the mapping relationship between the second QoS identifier and the QoS flow of the UE, and determining the radio bearer, of the UE, corresponding to the data packet, based on the mapping relationship between the radio bearer of the UE and the QoS flow of the UE; and
determining the radio bearer, of the CPE, corresponding to the data packet, based on the radio bearer, of the UE, corresponding to the data packet and the mapping relationship between the radio bearer of the CPE and the radio bearer of the UE; or
determining the radio bearer of the CPE or the QoS flow, of the CPE, corresponding to the data packet, based on the radio bearer, of the UE, corresponding to the data packet and the mapping relationship between the QoS flow of the CPE and the radio bearer of the UE, wherein
a QoS parameter of the radio bearer or the QoS flow corresponding to the data packet is the QoS parameter of the data packet.

4. The CPE according to claim 3, wherein the data packet sent by the CPE to the home access gateway comprises at least one of the following information: the identifier of the radio bearer of the UE, the identifier of the UE, and the uplink endpoint information of the first connection transmission tunnel corresponding to the data radio bearer (DRB) of the UE, wherein the identifier of the radio bearer of the UE is added by the UE or the CPE, and the identifier of the UE and the uplink endpoint information of the first connection transmission tunnel corresponding to the DRB of the UE are added by the CPE.

5. The CPE according to claim 2, wherein the determining a QoS parameter of a data packet of the UE based on the configuration information of the first link and the configuration information of the second link comprises:
receiving the data packet sent by the UE, wherein the data packet comprises the identifier of the UE and the second QoS identifier; and
determining the radio bearer, of the CPE, corresponding to the data packet, based on the second QoS identifier comprised in the data packet and the mapping relationship between the second QoS identifier and the radio bearer of the CPE, wherein a QoS parameter of the radio bearer, of the CPE, corresponding to the data packet is the QoS parameter of the data packet; or
determining the QoS flow, of the CPE, corresponding to the data packet, based on the second QoS identifier comprised in the data packet and the mapping relationship between the second QoS identifier and the QoS flow of the CPE, wherein a QoS parameter of the QoS flow, of the CPE, corresponding to the data packet is the QoS parameter of the data packet.

6. The CPE according to claim 2, wherein the determining, by the CPE, a QoS parameter of a data packet of the UE based on the configuration information of the first link and the configuration information of the second link comprises:
receiving, by the CPE, the data packet sent by the home access gateway, wherein the data packet comprises the identifier of the UE, the identifier of the radio bearer of the UE, and/or the identifier of the QoS flow of the UE; and
determining, by the CPE, the second QoS identifier corresponding to the data packet, based on the identifier that is of the radio bearer of the UE and that is comprised in the data packet and the mapping relationship between the second QoS identifier and the radio bearer of the UE; or
determining, by the CPE, the second QoS identifier corresponding to the data packet, based on the identifier that is of the QoS flow of the UE and that is comprised in the data packet and the mapping relationship between the second QoS identifier and the QoS flow of the UE, wherein
a QoS parameter corresponding to the second QoS identifier corresponding to the data packet is the QoS parameter of the data packet.

7. The CPE according to claim 2, wherein the determining a QoS parameter of a data packet of the UE based on the configuration information of the first link and the configuration information of the second link comprises:
receiving the data packet sent by the home access gateway; and
when the data packet comprises the identifier of the UE, determining the second QoS identifier corresponding to the data packet, based on the radio bearer of the CPE that carries the data packet and the mapping relationship between the second QoS identifier and the radio bearer of the CPE, wherein a QoS parameter corresponding to the second QoS identifier corresponding to the data packet is the QoS parameter of the data packet; or
when the data packet comprises the identifier of the UE, determining the second QoS identifier corresponding to the data packet, based on the identifier that is of the QoS flow of the CPE and that is comprised in the data packet and the mapping relationship between the second QoS identifier and the QoS flow of the CPE, wherein a QoS parameter corresponding to the second QoS identifier corresponding to the data packet is the QoS parameter of the data packet; or
when the data packet comprises the identifier of the UE and the identifier of the radio bearer of the UE, determining the second QoS identifier corresponding to the data packet, based on the identifier that is of the radio bearer of the UE and that is in the data packet and the mapping relationship between the second QoS identifier and the radio bearer of the UE, wherein a QoS parameter corresponding to the second QoS identifier corresponding to the data packet is the QoS parameter of the data packet; or
when the data packet comprises the identifier of the UE and the identifier of the QoS flow of the UE, determining the second QoS identifier corresponding to the data packet, based on the identifier that is of the QoS flow of the UE and that is in the data packet and the mapping relationship between the second QoS identifier and the QoS flow of the UE, wherein a QoS parameter corresponding to the second QoS identifier corresponding to the data packet is the QoS parameter of the data packet; or when the data packet comprises downlink endpoint information of the first connection transmission tunnel corresponding to the DRB of the UE, determining the UE needing to receive the data packet and the DRB of the UE that carries the data packet, based on the downlink endpoint information of the first connection transmission tunnel corresponding to the DRB of the UE, and determining the second QoS identifier corresponding to the data packet, based on the mapping relationship between the second QoS identifier and the radio bearer of the UE, wherein a QoS parameter corresponding to the second QoS identifier corresponding to the data packet is the QoS parameter of the data packet.

8. The CPE according to claim 2, wherein when the second link is a second-type link, the data packet that is sent by the UE and that is received by the CPE comprises second indication information, and the second indication information is used to indicate that data comprised in the data packet is control plane signaling or user plane data.

9. The CPE according to claim 1, wherein when the first link and the second link each are a first-type link, the configuration information of the first link comprises at least one of the following information: an identifier of the UE, QoS configuration information of the UE, and QoS configuration information of the CPE, and the configuration information of the second link comprises an identifier of the UE and QoS configuration information of the UE;
the first-type link comprises a communications link established based on any one of a long term evolution (LTE) system, an LTE in unlicensed spectrum system, new radio (NR), a universal mobile telecommunications system (UMTS) system, and a global system for mobile communications (GSM) system;
the QoS configuration information of the UE comprises at least one of the following information: an identifier of a radio bearer of the UE, a QoS parameter of the radio bearer of the UE, uplink endpoint information of a first connection transmission tunnel corresponding to a data radio bearer (DRB) of the UE, an identifier of a QoS flow of the UE, a QoS parameter of the QoS flow of the UE, and a mapping relationship between the radio bearer of the UE and the QoS flow of the UE; and
the QoS configuration information of the CPE comprises at least one of the following information: an identifier of a radio bearer of the CPE, a QoS parameter of the radio bearer of the CPE, an identifier of a QoS flow of the CPE, a QoS parameter of the QoS flow of the CPE, a mapping relationship between the QoS flow of the CPE and the radio bearer of the CPE, a mapping relationship between the radio bearer of the CPE and the radio bearer of the UE, a mapping relationship between the QoS flow of the CPE and the radio bearer of the UE, and a mapping relationship between the radio bearer of the CPE and the QoS flow of the UE.

10. The CPE according to claim 9, wherein the determining a QoS parameter of a data packet of the UE based on the configuration information of the first link and the configuration information of the second link comprises:
receiving the data packet sent by the UE, wherein the data packet comprises the identifier of the UE;
determining the radio bearer of the UE that carries the data packet;
determining the radio bearer, of the CPE, corresponding to the data packet, based on the radio bearer of the UE that carries the data packet and the mapping relationship between the radio bearer of the CPE and the radio bearer of the UE; or when the data packet comprises the identifier of the QoS flow of the UE, determining the radio bearer, of the CPE, corresponding to the data packet, based on the identifier of the QoS flow of the UE and the mapping relationship between the radio bearer of the CPE and the QoS flow of the UE; or determining the QoS flow, of the CPE, corresponding to the data packet, based on the radio bearer of the UE that carries the data packet and the mapping relationship between the QoS flow of the CPE and the radio bearer of the UE, and determining, the radio bearer, of the CPE, corresponding to the data packet, based on the QoS flow, of the CPE, corresponding to the data packet and the mapping relationship between the radio bearer of the CPE and the QoS flow of the CPE, wherein
a QoS parameter of the radio bearer, of the CPE, corresponding to the data packet is the QoS parameter of the data packet; and
before the sending the data packet based on the QoS parameter of the data packet, the method further comprises: adding, by the CPE, at least one of the following information to the data packet: the identifier of the UE, the identifier of the radio bearer of the UE, and the uplink endpoint information of the first connection transmission tunnel corresponding to the DRB of the UE.

11. The CPE according to claim 9, wherein the determining a QoS parameter of a data packet of the UE based on the configuration information of the first link and the configuration information of the second link comprises:
receiving the data packet sent by the home access gateway, wherein the data packet comprises the identifier of the UE and the identifier of the radio bearer of the UE; and
determining that the QoS parameter of the radio bearer corresponding to the identifier that is of the radio bearer of the UE and that is comprised in the data packet is the QoS parameter of the data packet.

12. The CPE according to claim 9, wherein the determining a QoS parameter of a data packet of the UE based on the configuration information of the first link and the configuration information of the second link comprises:
receiving the data packet sent by the home access gateway; and
when the data packet comprises the identifier of the UE, determining the radio bearer, of the UE, corresponding to the data packet, based on the radio bearer of the CPE that carries the data packet and the mapping relationship between the radio bearer of the CPE and the radio bearer of the UE; or
when the data packet comprises downlink endpoint information of the first connection transmission tunnel corresponding to the DRB of the UE, determining the DRB of the UE that carries the data packet on the second link, based on the downlink endpoint information of the first connection transmission tunnel corresponding to the DRB of the UE; or
when the data packet comprises the identifier of the UE and the identifier of the QoS flow of the UE, determining the radio bearer, of the UE, corresponding to the data packet, based on the identifier of the QoS flow of the UE and the mapping relationship between the QoS flow of the UE and the radio bearer of the UE, wherein a QoS parameter of the radio bearer, of the UE, corresponding to the data packet is the QoS parameter of the data packet.

13. The CPE according to claim 1, wherein before the receiving configuration information of a first link and configuration information of a second link that are sent by a home access gateway, wherein the instructions when executed by the processor, further causing the CPE to:
send a first request message to the home access gateway, wherein the first request message is used to request to establish a first connection, the first connection is a connection between the CPE and the home access gateway, the first connection is carried on the first link, and the first request message comprises an identifier of the CPE; and
receive a first response message sent by the home access gateway, wherein the first response message comprises an identifier of the home access gateway and an identifier of a cell needing to be activated.

14. The CPE according to claim 13, wherein the sending a first request message to the home access gateway comprises:
sending the first request message to the home access gateway based on first configuration information obtained in advance, wherein the first configuration information is used to trigger establishment of the first connection; or
sending the first request message to the home access gateway when receiving information that is sent by the UE and that indicates that the UE has a requirement for connecting to the home access gateway; or
sending the first request message to the home access gateway when the CPE receives a specific tagged packet sent by the UE.

15. The CPE according to claim 1, the instructions when executed by the processor, further causing the CPE to:
send a discovery signal to the UE, wherein the discovery signal is used by the UE to discover the CPE, the discovery signal comprises first indication information, the first indication information is used to indicate that the CPE supports providing the UE with a connection to a first-type network, and supports providing the UE with mobility management and QoS management in the first-type network, and the first-type network comprises any one of the LTE system, the LTE-U system, the NR, the UMTS system, and the GSM system.

16. A user equipment, comprising at least one processor and a memory coupled to the at least one processor and storing programming instructions for execution by the at least one processor, wherein the programming instructions instruct the at least one processor to perform operations comprising:
establishing a radio resource control RRC connection to a home access gateway by using customer premises equipment CPE;
receiving configuration information that is sent by the home access gateway and that is of a link between the CPE and the UE, wherein the configuration information is used to indicate quality of service QoS configuration information of the link between the CPE and the UE, wherein the CPE is a relay user equipment and the link is wireless;
determining a QoS parameter of a data packet based on the configuration information; and
sending the data packet to the CPE based on the QoS parameter of the data packet.

17. The user equipment according to claim 16, wherein when the link between the CPE and the UE is a first-type link, the configuration information comprises an identifier of the UE and/or QoS configuration information of the UE, and the first-type link comprises a communications link established based on any one of a long term evolution (LTE) system, an LTE in unlicensed spectrum system, new radio (NR), a universal mobile telecommunications system (UMTS) system, and a global system for mobile communications (GSM) system;
the QoS configuration information of the UE comprises at least one of the following information: an identifier of a radio bearer of the UE, uplink endpoint information of a first connection transmission tunnel corresponding to a data radio bearer (DRB) of the UE, a QoS parameter of the radio bearer of the UE, an identifier of a QoS flow of the UE, a QoS parameter of the QoS flow of the UE, and a mapping relationship between the radio bearer of the UE and the QoS flow of the UE; and
the determining a QoS parameter of a data packet based on the configuration information comprises:
determining that a QoS parameter of the radio bearer or the QoS flow, of the UE, corresponding to the data packet is the QoS parameter of the data packet.

18. The user equipment according to claim 16, wherein when the link between the CPE and the UE is a second-type link, the second-type link is a communications link established based on any one of a wireless local area network (WLAN), Bluetooth, ZigBee, the Ethernet, a point-to-point protocol (PPP), a point-to-point protocol over Ethernet PPPoE, an asynchronous transfer mode (ATM), code division multiple access (CDMA), and CDMA2000;
the configuration information comprises the QoS information of the link between the CPE and the UE, and the QoS information of the link between the CPE and the UE comprises at least one of the following information: a second QoS identifier, a QoS parameter corresponding to the second QoS identifier, a mapping relationship between the second QoS identifier and the radio bearer of the UE, a mapping relationship between the second QoS identifier and the QoS flow of the UE, a mapping relationship between the second QoS identifier and the radio bearer of the CPE, and a mapping relationship between the second QoS identifier and the QoS flow of the CPE, wherein the second QoS identifier is used to identify a QoS granularity of the second link;
the determining a QoS parameter of a data packet based on the configuration information comprises:
determining the second QoS identifier corresponding to the data packet, based on the radio bearer, of the UE, corresponding to the data packet and the mapping relationship between the second QoS identifier and the radio bearer of the UE; or determining the second QoS identifier corresponding to the data packet, based on the QoS flow, of the UE, corresponding to the data packet and the mapping relationship between the second QoS identifier and the QoS flow of the UE; and
determining that a QoS parameter corresponding to the second QoS identifier corresponding to the data packet is the QoS parameter of the data packet; and
before the sending the data packet to the CPE based on the QoS parameter of the data packet, the method further comprises:
adding to the data packet, the second QoS identifier corresponding to the data packet.

19. The user equipment according to claim 18, wherein the data packet sent by the UE comprises second indication information, and the second indication information is used to indicate that data comprised in the data packet is control plane signaling or user plane data.

\* \* \* \* \*

UNITED STATES PATENT AND TRADEMARK OFFICE
CERTIFICATE OF CORRECTION

PATENT NO. : 11,516,862 B2
APPLICATION NO. : 16/926711
DATED : November 29, 2022
INVENTOR(S) : Yuanping Zhu et al.

It is certified that error appears in the above-identified patent and that said Letters Patent is hereby corrected as shown below:

On the Title Page

Item [57], Line 10, delete "QoS" and insert -- (QoS) --.

In the Specification

Column 1, Line 6, after "application" insert -- is --.

Column 1, Line 9, delete "2018," and insert -- 2018. --.

In the Claims

Column 76, Line 33, in Claim 2, delete "PPPoE," and insert -- (PPPoE), --.

Column 81, Line 60, in Claim 16, delete "QoS" and insert -- (QoS) --.

Column 82, Line 31, in Claim 18, delete "PPPoE," and insert -- (PPPoE), --.

Signed and Sealed this
Thirty-first Day of January, 2023

Katherine Kelly Vidal
*Director of the United States Patent and Trademark Office*